United States Patent
MacIsaac

(10) Patent No.: US 7,377,522 B2
(45) Date of Patent: May 27, 2008

(54) VEHICLE WITH MOVABLE AND INWARDLY TILTING SAFETY BODY

(76) Inventor: William L. MacIsaac, 7911 - 40th Ave. West, Everett, WA (US) 98275

( * ) Notice: Subject to any disclaimer, the term of this patent is extended or adjusted under 35 U.S.C. 154(b) by 394 days.

(21) Appl. No.: 10/667,105

(22) Filed: Sep. 18, 2003

(65) Prior Publication Data

US 2005/0275181 A1    Dec. 15, 2005

Related U.S. Application Data

(60) Provisional application No. 60/412,045, filed on Sep. 18, 2002.

(51) Int. Cl.
*B60G 17/005* (2006.01)

(52) U.S. Cl. ............................. 280/5.507; 280/5.506; 280/5.513

(58) Field of Classification Search ............ 280/5.506, 280/5.507, 5.509, 5.513, 5.521, 89.751, 124.105, 280/124.106, 124.107, 124.134, 124.135

See application file for complete search history.

(56) References Cited

U.S. PATENT DOCUMENTS

| | | | |
|---|---|---|---|
| 3,089,710 A | | 5/1963 | Fiala |
| 3,598,385 A | * | 8/1971 | Parson, Jr. .................... 267/30 |
| 3,711,113 A | * | 1/1973 | Stammreich ............... 280/5.51 |
| 4,041,878 A | | 8/1977 | Toran |
| 4,550,926 A | | 11/1985 | MacIsaac |
| 4,573,702 A | | 3/1986 | Klem et al. |
| 4,854,603 A | * | 8/1989 | Scaduto ............... 280/124.107 |
| 5,004,257 A | | 4/1991 | MacIsaac |
| 5,048,858 A | * | 9/1991 | Luger .................. 280/124.136 |
| 5,310,200 A | | 5/1994 | MacIsaac |
| 5,580,089 A | | 12/1996 | Kolka et al. |
| 5,620,199 A | * | 4/1997 | Lee .......................... 280/5.521 |
| 5,716,067 A | * | 2/1998 | van der Knaap et al. ....................... 280/93.511 |
| 5,821,434 A | * | 10/1998 | Halliday ................. 73/862.541 |
| 5,873,586 A | | 2/1999 | Krimmell et al. |
| 6,056,303 A | * | 5/2000 | van der Knaap et al. 280/124.1 |
| 6,113,119 A | | 9/2000 | Laurent et al. |
| 6,170,838 B1 | * | 1/2001 | Laurent et al. .......... 280/5.508 |
| 6,244,190 B1 | | 6/2001 | Sembtner et al. |
| 6,267,387 B1 | * | 7/2001 | Weiss ........................ 280/5.52 |
| 6,467,783 B1 | * | 10/2002 | Blondelet et al. ..... 280/124.106 |
| 6,585,275 B1 | * | 7/2003 | Carlstedt et al. ...... 280/124.106 |
| 6,702,307 B2 | * | 3/2004 | Becker et al. ........ 280/124.141 |

(Continued)

FOREIGN PATENT DOCUMENTS

EP    0 908 368 A    4/1999

(Continued)

*Primary Examiner*—Toan To
(74) *Attorney, Agent, or Firm*—Christensen O'Connor Johnson Kindness PLLC

(57) ABSTRACT

A suspension system for a vehicle (50c) having a body (52c) and a plurality of wheel support assemblies (56c, 58c) includes a tie structure (60c) interposed between the body and the wheel support assemblies. A first interconnection system (68c) interconnects the tie structure to the wheel support assemblies, and the second interconnection system (302) interconnects the tie structure and the body. The second interconnection system includes a plurality of link structures (304, 320) pivotally connected at one end to the tie structure, and pivotally connected at the opposite end to the body. Such link structures are oriented relative to the tie structure to extend towards a common point along a longitudinal axis (33B) of the tie structure.

99 Claims, 37 Drawing Sheets

U.S. PATENT DOCUMENTS

| | | | |
|---|---|---|---|
| 6,793,228 B2 * | 9/2004 | Zadok | 280/124.134 |
| 6,863,288 B2 * | 3/2005 | Van Den Brink et al. | 280/124.103 |

FOREIGN PATENT DOCUMENTS

| | | | |
|---|---|---|---|
| FR | 967 710 A | 11/1950 |
| FR | 2 400 147 A | 3/1979 |
| FR | 2 833 233 A1 | 12/1996 |
| GB | 840583 | 7/1960 |
| GB | 965667 | 8/1964 |
| GB | 1 213 795 | 11/1970 |
| GB | 2 344 796 A | 6/2000 |
| JP | 11-078457 A | 3/1999 |
| WO | WO 89/00512 A1 | 1/1989 |
| WO | WO 92/16387 A1 | 10/1992 |
| WO | WO 02/058949 | 8/2002 |

* cited by examiner

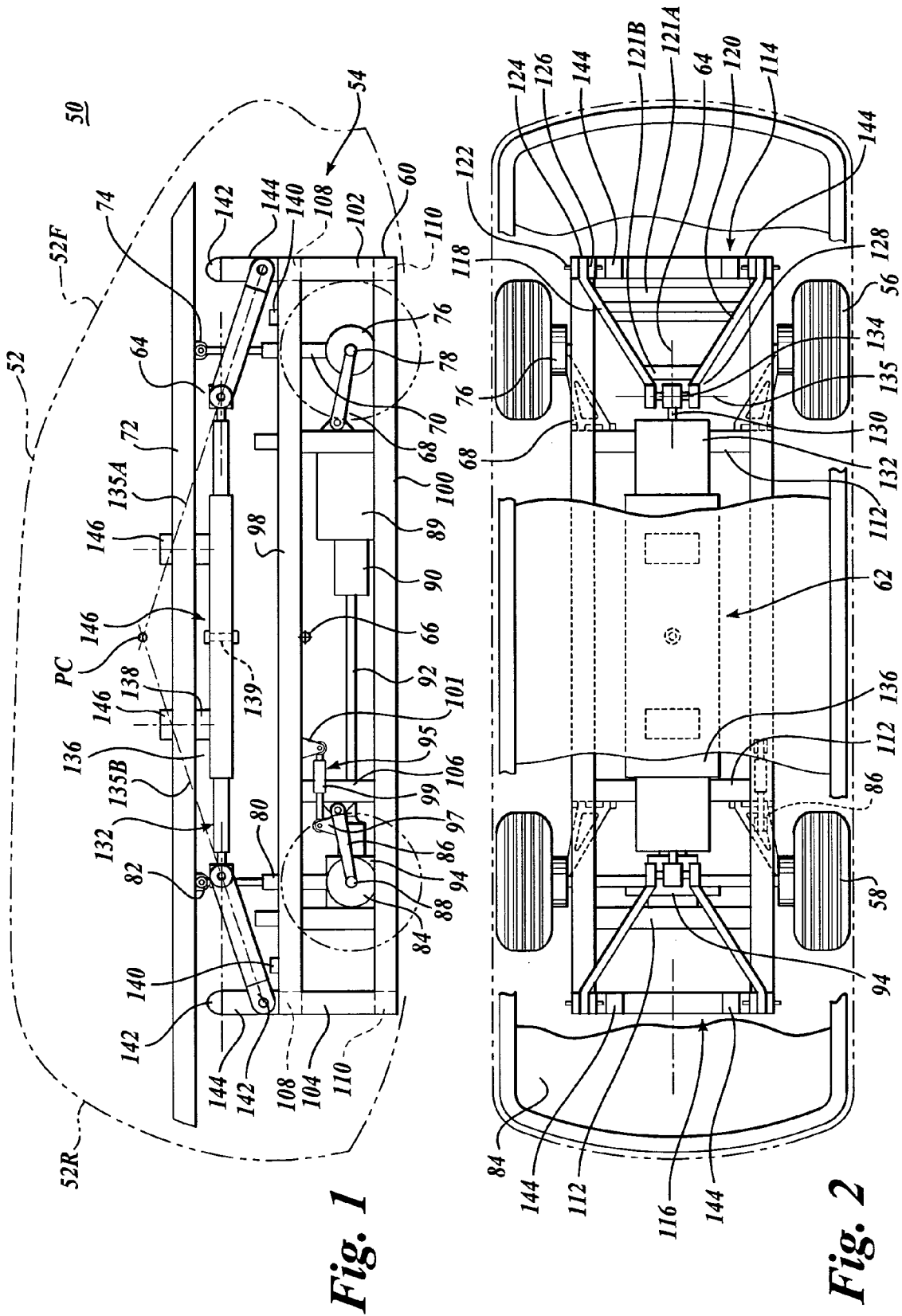

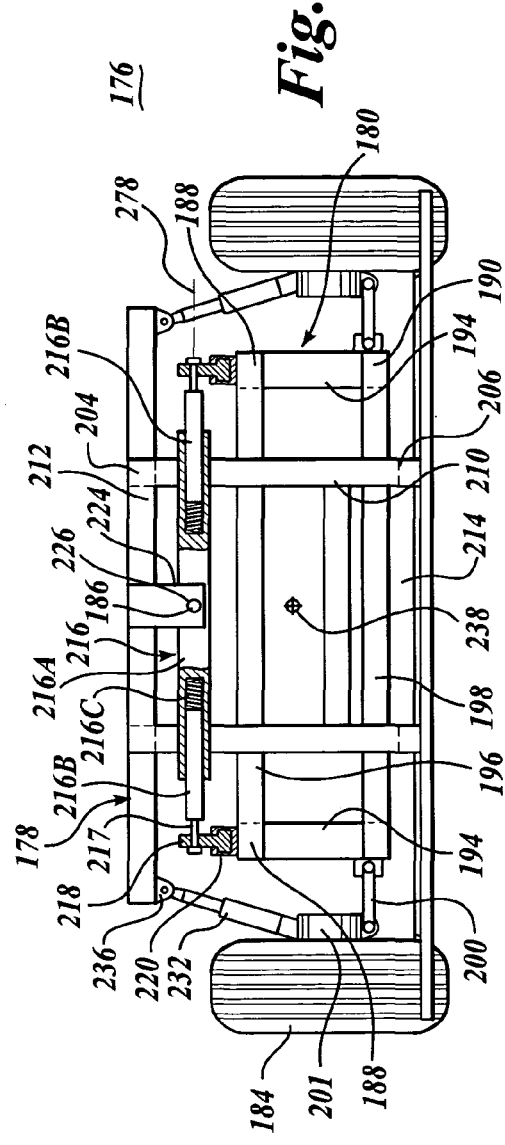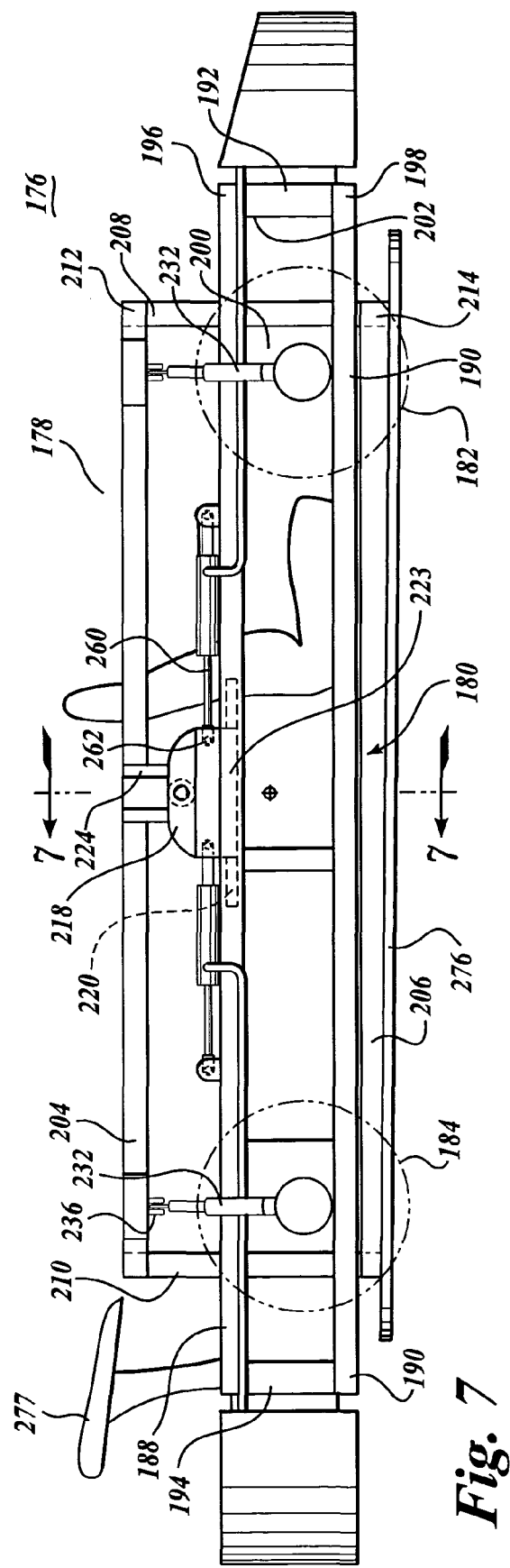

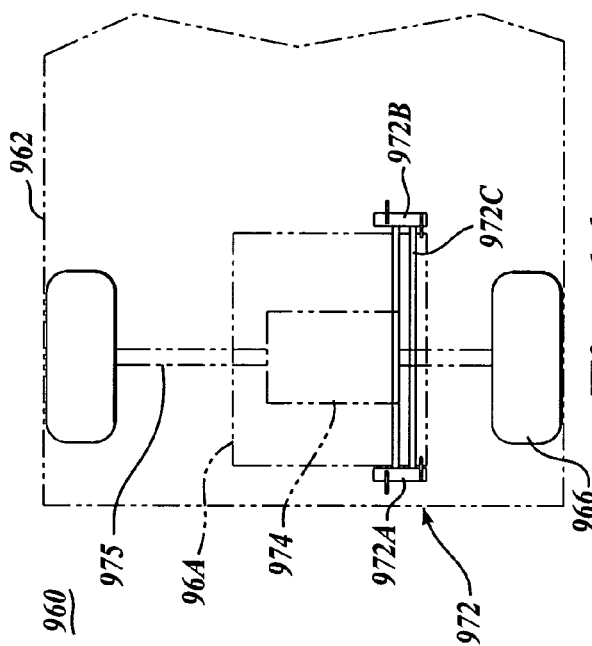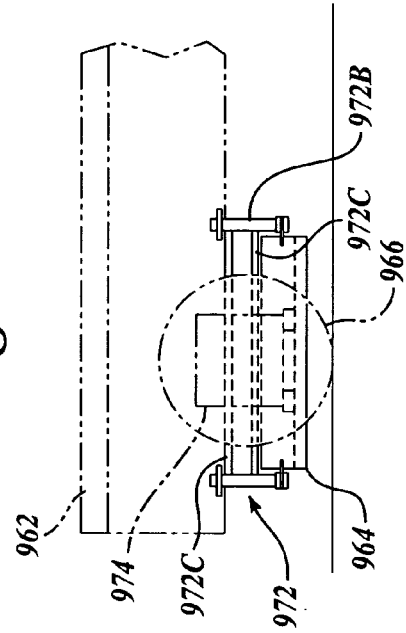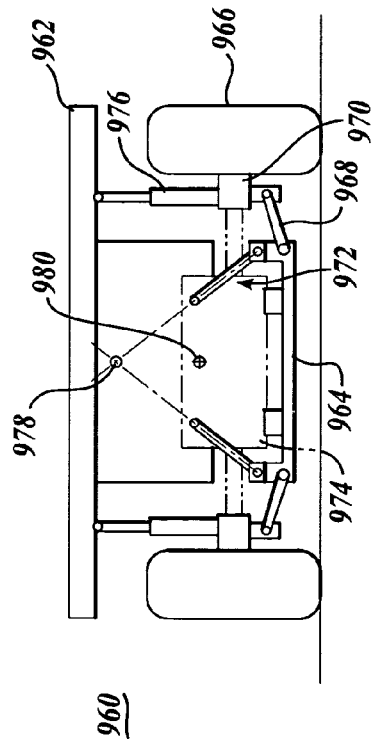

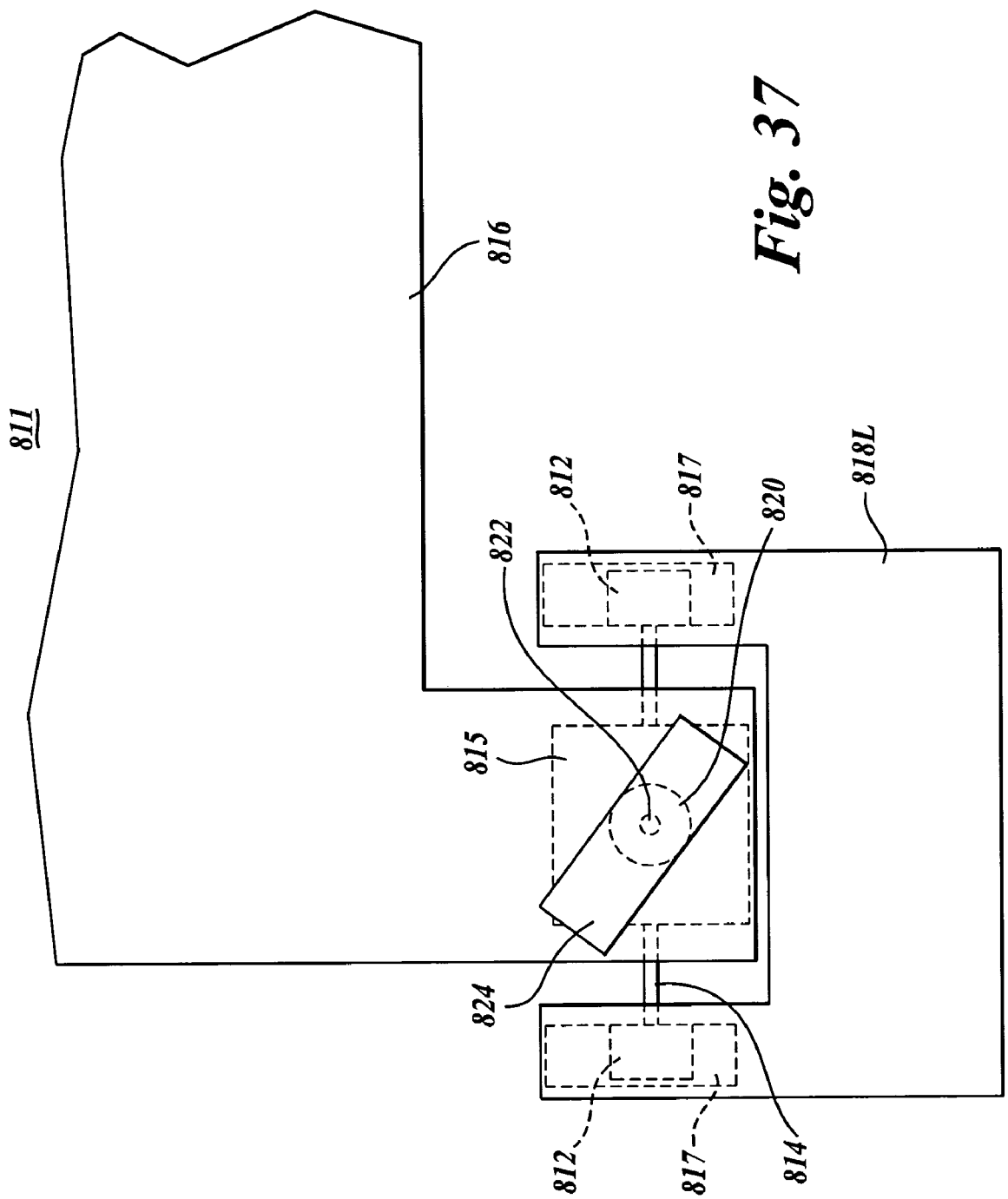

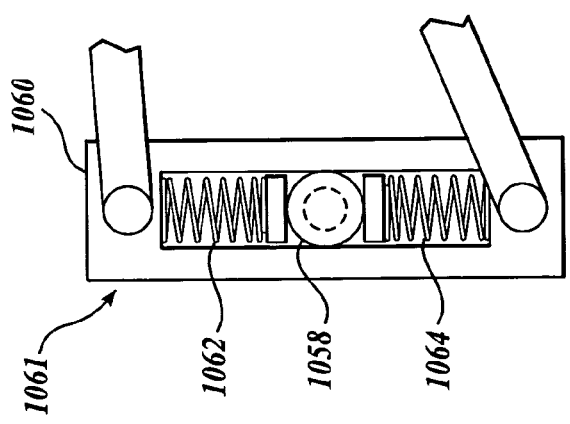
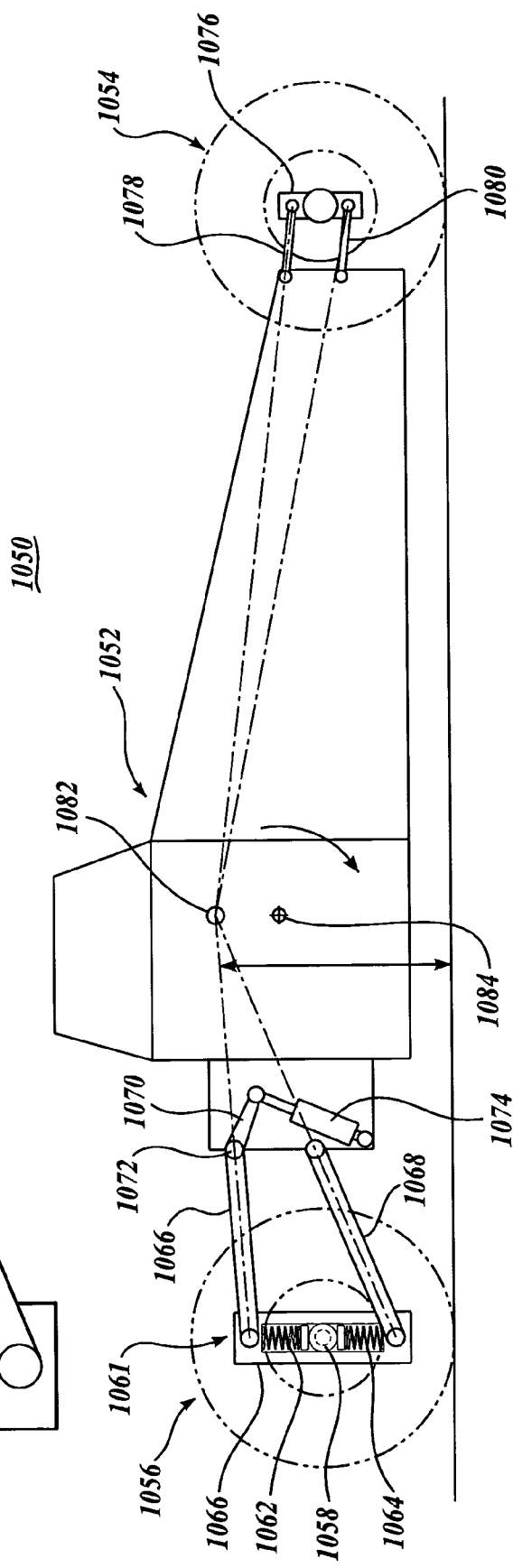

VEHICLE WITH MOVABLE AND INWARDLY TILTING SAFETY BODY

CROSS-REFERENCE TO RELATED APPLICATION

This application claims the benefit of U.S. Provisional Application No. 60/412,045, filed Sep. 18, 2002.

TECHNICAL FIELD

The present invention relates to suspension systems for vehicles, and more particularly to suspension systems that counteract the lateral forces imposed on a vehicle during cornering and/or the longitudinal forces imposed on a vehicle during braking and acceleration.

BACKGROUND OF THE INVENTION

When negotiating a curve with a typical automotive-type vehicle, the resulting centrifugal forces tend to roll the vehicle body and associated chassis (hereinafter jointly referred to as "body") about its roll center relative to the underlying suspension system, and also displace the body and suspension system laterally outwardly relative to the radial center of the curve, tending to cause the vehicle to pivot about its outer wheels. This latter tendency is commonly known in the motor vehicle art as the "jacking effect." During braking and acceleration, the resulting longitudinal forces acting on a typical automotive-type vehicle tend to pitch the body about its pitch center relative to the underlying suspension system and also tend to displace the body and suspension system forwardly during braking and rearwardly during acceleration to cause the vehicle to pivot about its front or rear wheels, respectively. This is known as the "pitching effect.".

The locations of the roll center and pitch center are functions of the construction of the vehicle body and the configuration of the vehicle suspension system. In a conventional vehicle, the center of gravity of the vehicle is located above the roll center and pitch center. Since the centrifugal forces caused by cornering and the longitudinal forces caused by accelerating and braking act through the center of gravity of the vehicle, the magnitude of the couple tending to cause the body to roll about its roll center is a function of the magnitude of the centrifugal force and the vertical distance separating the center of gravity from the roll center, and the magnitude of the couple tending to cause the body to pitch about its pitch center is a function of the magnitude of the longitudinal force and the vertical distance separating the center of gravity from the pitch center. These vertical distances are commonly known as the "roll couple" and "pitch couple," respectively.

In a typical vehicle, as the body rolls outwardly about its roll center, it tends to compress the outer suspension springs (relative to the radial center of the curve about which the vehicle is traveling) thus increasing the weight on the outer wheels while simultaneously unloading the inward suspension springs, thereby reducing the weight on the inside wheels. As a result, the cornering traction of the vehicle is reduced. Also, as the body pitches forwardly about its pitch center during braking, it tends to compress the forward springs, thus increasing the weight on the forward wheels while simultaneously unloading the rearward springs, thereby reducing the weight on the rearward wheels. This resulting imbalance in the weight being carried by the forward and rearward wheels decreases the maximum braking capacity of the vehicle. The foregoing loading changes on the vehicle wheels caused by cornering and braking will occur simultaneously when the vehicle's brakes are applied while cornering, thereby potentially causing even greater imbalance on the weights on the vehicle wheels than caused by cornering alone or braking alone. This imbalance may result in the loss of substantially all of the traction of one or more wheels.

The lateral force tending to cause a vehicle to pivot about its outer wheels, i.e., jacking effect, acts through the portion of the vehicle known as the roll reaction center. The longitudinal forces tending to cause a vehicle to pitch about its forward or rearward wheels acts through the pitch reaction center. In a conventional vehicle, the roll reaction center coincides with the roll center and the pitch reaction center coincides with the pitch center. As a result, the magnitude of the jacking effect is a function of the magnitude of the centrifugal force and the elevation of the roll reaction center above the ground, and the magnitude of the pitching effect is a function of the magnitude of the longitudinal braking/acceleration force and the elevation of the pitch reaction center above the ground. With respect to the effect of cornering forces on a vehicle, the height of the roll reaction center above the ground is commonly known as the jacking couple, and with respect to the effect of braking and acceleration forces on the vehicle, the height of the pitch reaction center above the ground is commonly known as the pitching couple.

In conventional vehicles, attempts have been made to design the suspension system to minimize the heights of the roll reaction center and pitch reaction center, thereby to reduce the jacking effect and pitching effect. Placement of the roll reaction center and the pitch reaction center at a low elevation, however, results in the center of gravity of the body being located at a substantial distance above the roll center and pitch center, thereby increasing the magnitude of the roll couple and pitch couple. The increase in the roll couple and pitch couple results in decreased stability of the vehicle, especially since in typical suspension systems the body roll and jacking effect and the body pitch and pitching effect are all cumulative, reducing the braking, acceleration and cornering ability of the vehicle.

Conventional vehicles also do not have any significant accommodation for absorbing the energy of a vehicle crash so as to reduce the likelihood of injury to passengers. As a consequence, all too often passengers are seriously injured, or even killed, during vehicle collisions, some of which do not occur at very high speeds.

SUMMARY OF THE INVENTION

The present invention seeks to reduce the detrimental effects on vehicle handling caused by braking, by acceleration, by simultaneous cornering and braking, and by simultaneous cornering and acceleration. The present invention constitutes an improvement of the vehicle suspension system disclosed in applicant's prior U.S. Pat. No. 4,550,926 which simply concerns suspension systems for counteracting cornering forces imposed on vehicles. Enhanced vehicle handling is achieved by the present improved suspension system, in which not only do the roll couple and jacking couple oppose each other, thereby causing the body roll to counteract the jacking effect, but also the pitch couple and the pitching couple oppose each other, thereby causing the body pitch to counteract the pitching effect, thus improving the cornering traction of the vehicle, the braking traction of the vehicle, the acceleration traction of the vehicle (especially in a front-wheel-drive-vehicle), the simultaneous cornering and braking traction of the vehicle, and the simultaneous cornering and acceleration traction of the vehicle. To this end, the vehicle suspension system of the present invention is joined to the vehicle body to pivot about transverse and longitudinal axes located above the center of gravity of the vehicle body so that the cornering forces acting through the center of gravity tilt the body about the longitudinal axis inwardly into the curve and so that simultaneously the longitudinal braking or acceleration forces acting through the center of gravity tilt the body about the transverse axis toward the rear or front, respectively, of the vehicle.

To this end, in a first generalized form of the present invention, the suspension system includes wheel mounting members located on opposite sides of the front and rear of the vehicle body. Load control devices in the form of suspension springs may be used to support the weight of the body on the wheel mounting members. The wheel mounting members include hub carriers on which the vehicle wheels are mounted. A tie structure extends along the lower portion of the vehicle to span between the front-wheel mounting members and the rear-wheel mounting members. The tie structure is interconnected to the body about transverse and longitudinal axes located at elevations above the center of gravity of the vehicle so that when cornering and at the same time braking or accelerating, the resultant forces imposed on the body acting through the center of gravity cause the body to tilt downwardly about the axes relative to the tie structure in the direction opposite to the direction of the resultant forces acting on the body by virtue of the cornering and the braking or acceleration of the vehicle.

The tie structure is interconnected to the vehicle support means by suspension arms. Load control devices are utilized with the suspension arms to permit controlled relative movement therebetween. The suspension arms and load control devices together permit the tie structure and thus the longitudinal roll axis and the transverse pitch axis to shift relative to the vehicle support means in a controlled manner in the direction of the resultant forces imposed on the body during cornering, braking and acceleration, thereby to preclude the roll axis, the pitch axis or the combined pitch and roll axis of the vehicle to serve as the roll reaction center, pitch reaction center or the combined roll and pitch reaction center of the vehicle. As a result, the jacking effect and pitching effect on the vehicle are reduced.

The capacities of the load control devices used to support the vehicle body on the wheel mounting members and the load control devices utilized at the interconnection of the tie structure to the wheel mounting members are selected so that the movement of the tie structure is less than the movement of the body. In particular, the capacities of the load control devices are selected to cause the roll stiffness and pitch stiffness of the tie structure to be greater than the roll stiffness and pitch stiffness of the body. As a result, not only does the vehicle body roll and pitch in the opposite direction in comparison to a conventional vehicle thereby maintaining more even loading on the vehicle whole, but also simultaneously the jacking effect and pitching effect are reduced.

In another generalized form of the present invention, the vehicle includes a body that is mounted on an underlying tie structure and/or frame to allow the body to move relative to the underlying tie structure and/or frame during an impact or crash. During the crash, an exterior force is applied to the body, whereupon the body is allowed to shift in a controlled, limited manner relative to the underlying frame and/or tie structure. A slide mechanism may be interposed between the body and the underlying frame/tie structure to permit such relative movement. Also, the slide mechanism may be constructed to permit the body to pitch and/or roll relative to the tie structure.

As a further aspect of the present invention, the vehicle seats may be adapted to move or shift in a controlled manner upon a collision or crash of the vehicle. The seats may be mounted on slide mechanisms to allow a passenger to continue to move somewhat in the direction that the passenger was moving just before the crash and then come to a controlled stop, rather than to an abrupt stop which may occur if the vehicle seats were not moveable.

In another aspect of the present invention, the vehicle bumpers or other portions of the vehicle may be at least partially filled with a fluid so that when the bumper impacts against another vehicle or structure during a crash, fluid will be expelled from the bumper in a controlled manner thereby to absorb a significant portion of the crash energy. The fluid from the bumpers could be expelled into the environment or could be directed to components of a slide system which when receiving the fluid from the compressing bumper, could cause the body to move relative to the frame/tie structure in a controlled manner in reaction to the crash occurring. Thus, a less abrupt force is imposed on the vehicle passengers, thereby reducing injury caused during the crash.

In a further aspect of the present invention, rather than employing a tie structure that extends along the entire lower portion of the vehicle to span between the front wheel members and the rear wheel mounting members, the tie structures may instead be located in separate sections at the front and rear of the vehicle or separately adjacent each of the wheel hub carriers of the vehicle. Such individual tie structure components may be vertically elongate and may be interconnected to the hub carrier by parallel arms or other means and also may be interconnected to the body by parallel, vertically spaced-apart arms or other means that are aligned with the roll center of the vehicle so that, when cornering, the forces tending to jack the vehicle pass through the roll center and the tie structure connecting arms.

In a further aspect of the present invention, the vehicle does not utilize a tie structure per se, but rather, a strut or slide assembly or other component integrated into, mounted on, or carried by the wheel hub carrier, serves as the tie structure. In this situation, the body may be supported on the hub carriers through the use of body springs. Relatively stiff struts, spring/slide assemblies, etc., are coupled between the hub carrier structure and the body at an orientation so that a line extending through the slide/spring assembly extends to the roll center of the body. Thus, during cornering, the jacking forces acting on the vehicle act through the roll center and thus are imposed on the slider/spring assembly, which then allows control of lateral movement of the body in a direction outwardly of the center of the curve while at the same time, because the center of gravity is below the roll center of the vehicle, the body tilts inwardly into the curve.

In a further aspect of the present invention, an "active" suspension system may be utilized between the body and the wheel hub carriers. Such active suspension system may include powered actuators and sensors that sense cornering forces as well as braking and acceleration forces thereby to shift the body somewhat laterally outwardly during cornering, forwardly during braking, and rearwardly during acceleration, so that the roll center does not serve as a roll reaction center when cornering and/or so that the pitch center does not serve as a pitch reaction center during braking or accelerating, thereby reducing the jacking effect and/or the pitching effect on the vehicle.

BRIEF DESCRIPTION OF THE DRAWINGS

FIG. 1 is a side elevational view of an embodiment of the present invention;

FIG. 2 is a top view of FIG. 1 with portions broken away;

FIG. 7 is a side elevational view of FIG. 6;

FIG. 8 is a front elevational view of FIGS. 6 and 7;

FIGS. 14, 15 and 16 illustrate a further embodiment of the present invention in front elevational, side elevational and top view;

FIG. 37 is a fragmentary top view showing a further embodiment of the present invention;

FIG. 42 is a side elevational view of a further embodiment of the present invention;

FIG. 43 is an enlarged fragmentary view of FIG. 42;

DETAILED DESCRIPTION OF THE PREFERRED EMBODIMENTS

Figure 3:
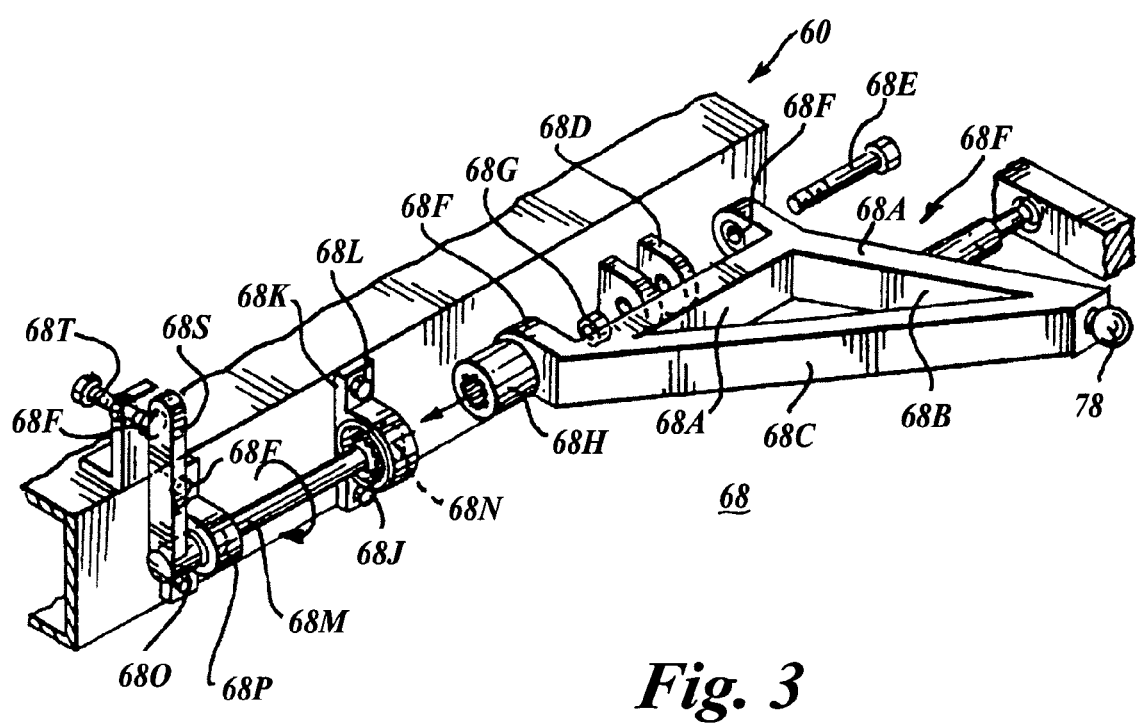
FIG. 3 is an enlarged fragmentary view of the portion of the suspension system of the embodiment of FIGS. 1 and 2.

Referring initially to FIGS. 1 and 2, a vehicle 50 having a body 52 is shown as mounted on the suspension system 54 of the present invention, which in turn is supported on forward wheel assemblies 56 and rearward wheel assemblies 58. An elongated tie structure 60 is interposed between the vehicle body 52 and the wheel assemblies 56 and 58. The tie structure 60 may extend longitudinally along the lower elevation of the vehicle 50 and is interconnected to the body 52 through a slide assembly 62 to enable the body to slide longitudinally relative to the tie structure as well as pivot about a longitudinal axis 64 which is located at an elevation above the center of gravity 66 of the vehicle 50. The tie structure 60 is also connected to the wheels 56 and 58 by pivot arm assembles 68.

As used in the present application, the term "body" is intended to include a relatively rigid structure that may include a chassis, frame and/or the body thereof, and any additional supports and members attached thereto for accommodating the suspension system of the present invention.

The body 52 has a forward portion 52F and a rearward portion 52R. The body 52 may be constructed with a conventional body shell and an underlying chassis, may be in the form of a unibody having an integral chassis, or may be constructed in other manners without departing from the spirit or scope of the present invention.

At the front of the vehicle 50, as shown in FIG. 1, the suspension system 54 includes load support and control devices in the form of combination spring/shock absorber assemblies 70 for supporting the vehicle body 52. The upper ends of the spring/shock absorber assemblies 70 are coupled to a body structure member 72 utilizing a ball joint connection 74. The lower ends of the spring/shock absorber assemblies 70 are interconnected to forward hub carriers 76 of the wheel assemblies 56. The forward hub carriers are connected to the forward end portions of the tie structure 60 by pivot arm assemblies 68 through ball joints 78 located at the distal ends of the pivot arm assemblies. Spring/shock absorber assemblies, such as assemblies 70, are well known in the art and are commonly referred to as MacPherson struts. MacPherson struts are widely used in conjunction with both front-wheel and rear-wheel drive vehicles.

Referring to FIG. 3, at the forward corners the tie structure 60 is connected to the hub carriers 76 by the pivot arm assemblies 68. Each pivot arm assembly includes a generally triangular-shaped pivot arm 68A composed of a longitudinal member 68B, a transverse member 68C1, and a diagonal member 68C, which cooperatively form the triangular shape. The pivot arm may be adapted to pivot relative to the forward end of tie structure 60 about a transverse axis. To this end, the end of each pivot arm longitudinal member 68B extends beyond the transverse member 68C1 to be closely receivable between a pair of mounting ears 68D extending longitudinally from the forward end of the tie structure 60. A pivot pin 68E extends through the center of a bushing 68F pressed within a bore formed in the end of the longitudinal member 68B, as well as through close-fitting through-bores formed in the mounting ears 68D. A nut 68G or other appropriate type of fastener may be engaged with the pin 68E to retain the pivot arm 68A between the two mounting ears 68D.

A cylindrical stub shaft 68H extends transversely from an extension 68I of the pivot arm diagonal member 68C that extends beyond the transverse member 68C1 in the same manner in which the longitudinal member 68B of the pivot arm extends beyond the transverse member 68C1. The stub shaft 68H may engage within a close-fitting bushing 68J pressed within a bore formed in a mounting bracket 68K, which is secured to the adjacent face of the tie structure end member. The mounting bracket 68K, which may be composed of a standard, commercially available pillow block, is mounted on the tie structure member by any appropriate means, such as by hardware members 68L, extending through openings formed in the flange portions of the mounting bracket and into engagement with the end of the tie structure. It will be appreciated that, by this construction, the pivot arm 68A is adapted to freely pivot about its transverse axis.

Each pivot arm assembly 68 also includes a spring-type directional control device in the form of a torsion bar 68M having a splined end 68N for anti-rotational engagement with the correspondingly splined interior of a stub shaft 68H. The opposite end of the torsion bar extends through the close-fitting bushing 68O pressed within a mounting bracket 68P. The mounting bracket 68P is secured to the adjacent face of the tie structure 60 by any appropriate method, for instance, by hardware members 68Q extending through holes formed in the flange portions of the mounting bracket 68P to threadably engage the tie structure. As with mounting bracket 68K, the mounting bracket 68P may be composed of a standard, commercially available pillow block.

The torsion bar 68M may be adjusted to impose no appreciable load when the vehicle is at rest and in a level orientation. This is accomplished by adjusting the position of a bearing plate 68R relative to the free end of a cantilevered swing arm 68S extending upwardly from the end of the torsion bar 68M, which extends beyond the mounting bracket 68P. The lower end of the swing arm 68S is fixedly attached to the torsion bar 68M by any appropriate method, for instance, by use of splines (not shown) or weldments (not shown). The bearing plate 68R is carried by the lead end of a lead screw 68T, or similar member, extending forwardly from the tie structure 60. It will be appreciated that the location of the bearing plate is adjusted by rotation of the lead screw 68T.

As in any motor vehicle, the forward wheels 56 of vehicle 50 are steerable. Such steering may be carried out by any number of conventional steering systems which may include typical steering arms (not shown) extending from the forward hub carriers 76 to interconnect with a transfer steering rod assembly (not shown). The steering rod assembly may extend outwardly from a rack and pinion assembly (not shown) mounted on the tie structure 60. Typically, the interconnection between the steering rod assemblies and the rack and pinion assembly permits the steering rod to pivot in response to the up-and-down and other movement to the front wheels relative to the tie structure. Typically, this is made possible by utilizing ball joints between the steering rod assemblies and the hub carriers, as well as between the steering rod assemblies and the rack and pinion assembly.

At the rear of the vehicle 50, the suspension system 54 includes load supporting and control devices in the form of combination spring/shock absorber assemblies 80 for supporting a rear portion 52R of the vehicle body. The rear spring/shock absorber assemblies 80 may be similar in construction and installation to the forward spring/shock absorber assemblies 70. In this regard, the upper ends of the rear spring/shock absorber assemblies 80 are secured to overhead portions of the body 52 at rear locations of the body structure member 72 through the use of ball joints 82. The lower ends of the spring/shock absorber assemblies 80 are coupled to and carried by rear hub carriers 84 of the rear wheel assemblies 58.

The rear hub carriers 84 are connected to the distal, rearward ends of pivot arm assemblies 86 by ball joints 82. The pivot arm assemblies 86 may be similar in construction and operation to pivot arm assembly 68, described above. The rear wheels 58 may be powered by vehicle engine 89 mounted on the tie structure. Alternatively, the engine and associated drive train may be mounted on the body instead of the tie structure. In a manner typical of conventional vehicles, a transmission 90 may be interposed between engine 88 and a rearwardly extending drive shaft 92. The rearward end of the drive shaft is coupled to a differential 94. Transverse axial shafts 96 extend outwardly from opposite sides of the differential 94 to drive the rear wheel assemblies 58.

Optionally, a dampening system may be used in conjunction with the rear pivot arm assemblies 86, as well as the front pivot arm assemblies 68. In this regard, a dampening system 95 is shown in FIG. 1 in conjunction with rear pivot arm assembly 86. The dampening system 95 includes a bracket 97 fixed to and extending laterally from pivot arm of the pivot arm assembly 86 to be coupled to the distal end of a dampener/shock absorber 99, which in turn is coupled to a bracket 101 depending downwardly from tie structure longitudinal side member 98. It will be appreciated that by this construction the pivoting movement of the pivot arm assembly is dampened to a degree desired.

As shown in FIGS. 1 and 2, the tie structure 60 of the present invention may be generally in the form of a rectangular box type structure that extends longitudinally along the lower elevations of vehicle 50 between the hub carriers of the forward and rearward wheels 56 and 58. In one embodiment of the present invention the tie structure may be composed of elongated top and bottom side members 98 and 100 extending along both sides of the vehicle 50 and spaced vertically apart by forward and rearward vertical members 102 and 104, as well as by forward and rearward intermediate vertical members 106. The forward ends of the longitudinal members 98 and 100 may be transversely connected by upper and lower crossmembers 108 and 110. These same crossmembers may be utilized at the rear end of the tie structure 60. A plurality of intermediate crossmembers 112 may be utilized for reinforcing purposes. Additional reinforcing members (not shown) may be added to the tie structure 60, if needed. The tie structure 60 may be constructed from many appropriate materials, such as tubing or channel stock. Moreover, the tie structure may be constructed in other configurations without departing from the spirit or scope of the present invention.

The slide system 62 extends longitudinally between body 52 and tie structure 60, and is supported above the tie structure by forward and rearward assemblies 114 and 116 that may be in the form of A-arms or other structure. As shown in FIGS. 1 and 2, the arm assembly 114 includes opposed arm Sections 118 and 120 interconnected with crossarms 121A and 121B to form a rigid assembly structure. The forward end portion of arm Sections 118 and 120 are pivotally pinned at the lower forward ends to the corner portions of the upper section of the tie structure 60. A cross pin 122 captures the forward lower end portion of the arm Sections 118 and 120 between parallel, spaced-apart mounting ears 124 and 126 extending upwardly from the tie structure 60. From the connection location with the tie structure 60, the arm Sections 118 and 120 extend upwardly and inwardly to couple with a gimbal assembly 128 mounted on the forward end of a stub shaft 130 projecting forwardly from slide 132 of the slide assembly 62. A cross shaft 134 connects the adjacent ends of arm Sections 118 and 120 to the gimbal assembly 128. In this manner, the slide 132 together with the body is capable of tilting about longitudinal axis 64 (defined by stub shaft 130 and gimbal 128) relative to arm assembly 114. In addition, the slide 132, together with the body, is capable of pitching movement relative to the arm assembly 114 at an axis 135 extending transversely through the gimbal assembly 128 to pitch about a pitch center PC defined by the intersection of lines 135A and 135B extending from arm assemblies 114 and 116 as shown in FIG. 1.

The rear arm assemblies 116 may be constructed similarly to the forward arm assemblies 114. Thus, the construction of the rearward arm assembly 116 will not be repeated here. Also, it is to be understood that rather than using front and rear arm assemblies, the slide system would be supported by arm assemblies that are coupled to side portions of the tie structure 60.

The slide assembly 62 includes an elongate, rectangular, slide member 132 extending through and capable of sliding relative to an exterior longitudinal collar-type slideway 136 that may encase the entire, or at least a portion of, the slide 132 extending between the forward arm 114 and rearward arm assemblies 116. The slideway 136 may be attached to vehicle body 52 by attachment brackets 138 or by other convenient technique.

As will be appreciated, the slide system 62 enables the body 52 to move longitudinally relative to the tie structure 60. For example, if the body 52 impacts against another vehicle or other structure, this relative movement between the body and tie structure enables the body to move relative to the tie structure in the direction that the impact load is applied to the body, i.e., away from the impact location. This may advantageously result in reduced crash forces imposed on passengers in the vehicle (especially if the vehicle seats are adapted to move relative to the body 52, in a manner for example, disclosed below) and less damage to the vehicle since some of the energy of the impact is expended in moving the slide 132 relative to the slideway 136.

The slideway may be nominally held in position relative to the slide 132 by a shear pin 139. If a crash occurs, as described above, the shear pin 139 will break, allowing relative movement of the body 52 and tie structure 60. In addition, a selected friction load may be applied between the slide 132 and the slideway 136 to help absorb the force applied to the vehicle during a crash. Moreover, such friction load can be designed to increase linearly or nonlinearly with the distance of relative travel between the slide 132 and the slideway 136. Also, other techniques may be used to nominally position the slideway 136 relative to the slide, such as through the use of springs or other resilient members (not shown).

It is to be understood that vehicle 50 may be constructed without the slide system 62 and still provide significant advantages over conventional automobiles and other vehicles.

It will be appreciated that in the embodiment of the present invention shown in FIGS. 1 and 2, as well as in other embodiments of the present invention, if the body moves significantly due to a crash or other large impact load, the connections between the spring/shock absorber assemblies 70 and 80 with the body and/or hub carriers are designed to break away. Such break away connection can be designed to not cause significant damage to the spring/shock absorber assemblies, so that they can be re-used.

Also, it will be appreciated that portions of the body may be constructed with crushable body panels or parts that absorb at least some of the energy during a crash. This could result in less overall damage to the vehicle and less injury to the passengers, as opposed to a conventional vehicle.

In another aspect of the present invention, when the vehicle 50 is cornering, the centrifugal force imposed on the body 52 acts at the center of gravity 66, which is below the elevation of gimbals 128, resulting in the outward lateral movement of the center of gravity, thereby causing the body to tilt about the longitudinal axis 64 or roll center at the gimbals 128, rather than imposing a jacking effect on the vehicle. As a result, the body 52 is tilted inwardly about axis 64 in the direction towards the center of the curve along which the vehicle 50 is traveling. The body, as thus tilted, thereby compresses the inside springs 70 and 80 and causes extension of the outside springs. In addition, by the inward tilting of the body, a relatively larger load is retained on the inside wheel assemblies of the vehicle 50, rather than being shifted substantially to the outside wheel assemblies of the vehicle in the manner of a conventional vehicle. This enables vehicle 50 to maintain better traction when negotiating a corner than a conventional vehicle.

In addition, when the vehicle 50 negotiates a corner, the centrifugal forces acting on the body 52 and the tie structure 60 cause the outward pivot arm assemblies 68 and 86 to pivot about the tie structure to wind up the torsion bars 68M, thereby to allow the outward side of the tie structure to lower somewhat. Simultaneously, the centrifugal forces acting on the body 52 and the tie structure 60 tend to cause the inward pivot arm assemblies to pivot in the opposite direction about the tie structure, thereby allowing the inward side of the tie structure to raise upwardly somewhat relative to the body.

This outward roll of the tie structure is significantly less than the inward roll of the body noted above.

During the rolling movement of the tie structure, the rate of force transfer through the tie structure is reduced since it acts over an extended period of time rather than substantially instantaneously. As a consequence, the jacking effect imposed on the vehicle 50 is reduced. The jacking effect is what tends to raise the inside wheels and roll the vehicle about its outside wheels during cornering. As a result, the effective roll reaction center of the vehicle is at an elevation below the elevation of the pivot axis 64. The roll reaction center is the elevation point through which the lateral forces act to cause the jacking effect.

The combination spring/shock absorbers 70 and 80 may be sized so that the roll stiffness of the tie structure is higher than the roll stiffness of the body. Thus, the amount by which the tie structure rolls outwardly during cornering is significantly less than the amount by which the body at the same time tilts inwardly, so that the net effect is to maintain the body in an inwardly tilted orientation relative to the tie structure, even though the tie structure is rolling somewhat in the outward direction, as described above. Also, the body 52 is permitted to move relatively further than the tie structure 60, but the body movement stops relative to the tie structure before the tie structure movement stops.

Still referring to FIGS. 1 and 2, stop or limit members 140 may be imposed between the arms 118 and 120 and the tie structure 60 to limit the angular movement of the arms, at least in the direction toward the tie structure. Such stops 140 may be composed of resilient blocks mounted to the underside of the A-arms to press against the adjacent portion of the tie structure when the A-arm pivots about its connection to the tie structure towards the tie structure. The resilient block may be configured to impose a progressively higher rate of resistance with increased deformation of the blocks, thereby providing a rising rate of resistance materials for blocks exhibiting these characteristics, including natural or synthetic rubber. Of course, numerous other systems could be utilized to limit the tilt or movement of the A-arms toward (and also away from) the tie structure, as desired.

In addition to, or in lieu of, stops 140 between arms 118 and 120 and the tie structure 60, stops may also be employed to limit the amount of roll or pitch of the body relative to the tie structure. In this regard, roll and/or pitch stops 142 may be mounted on the upper end of posts or similar structures 144 extending upwardly from the forward and rearward ends of the tie structure. It is believed desirable to incorporate the body stops 142 so that the roll of the body terminates before the roll of the tie structure terminates during cornering. It is desirable to allow the shifting of the tie structure to occur over a time period longer than it takes for the body roll or pitch to be completed, thereby to reduce, to the extent possible, the rate of centrifugal force transfer between the body and tie structure, since during this shifting movement the full jacking effect caused by the centrifugal force imposed on the vehicle during cornering is not brought to bear on the vehicle.

It will also be appreciated that the present invention advantageously helps keep the body relatively level when a wheel hits a hole or depression or hits a bump in the road. For example, if a front wheel 56 hits a pothole, the corresponding portion of the tie structure lowers. Since the roll center is above the center of gravity, the body will swing up about the roll center at the location that the tie structure lowers. As such, the body tends to stay relatively level, even when the wheel and associated portion of the tie structure drop due to the pothole. It will be appreciated that if the wheel assembly hits a bump, the tie structure will raise and the body will tend to lower relative to the raised portion of the tie structure, thereby tending to keep the body relatively level.

Although the interconnections between the ends of the slide system 62 and the tie structure 60 are illustrated in FIGS. 1 and 2 as accomplished through the use of forward and rearward arm assemblies 114 and 116, the arm assemblies may be replaced with alternative structures. For example, the arms 118 and 120 may extend parallel to each other, in which case the transverse shaft 134 of the gimbal 128 may be lengthened to accommodate this different configuration of the arms.

Although the vehicle 50 has been described and illustrated as accommodating longitudinal movement between the body 52 and the tie structure 60, the body may also be adapted to shift sideways relative to the tie structure. In this regard, the attachment brackets 138 used to attach the body to the slide assembly may be replaced with a transverse slide assembly permitting transverse movement of the body relative to the tie structure. Such transverse slide assembly can be of many constructions, including rods that slide within collars, slides that slide within a slideway, etc.

Although the vehicle 50 has been described above as employing an engine 89 that drives the rear wheels 58, in addition, or as an alternative, electric motors may be incorporated within the wheel assemblies 56 and/or 58 to provide motive force to the vehicle. The electric motors may be of many constructions, for example as shown and described in U.S. Pat. No. 5,438,228, which is incorporated herein by reference. It is to be understood that other electric motor configurations may be utilized without departing from the spirit or scope of the present invention.

Body 52 may be detachably mounted to the tie structure 60. In this regard, fasteners or connectors, such as threaded connectors 146, may be used to secure body structural member 72 to the slide assembly brackets 138. Detachably attaching the body to the tie structure results in numerous advantages. For instance, if the body is damaged, it can be easily removed and replaced. In addition, multiple body configurations could be utilized with a particular tie structure and chassis. Thus, the vehicle owner can convert the vehicle into different uses or for example as a passenger vehicle, enclosed load carrying vehicle, or an open box load carrying vehicle, perhaps similar to a pickup truck. To accommodate a detachable body, electrical connections can be incorporated between the body and the tie structure that automatically connect the electrical lines when the body is mounted on the tie structure and correspondingly automatically disconnect the electrical lines when the body is detached from the tie structure. In addition, the steering of the vehicle can be accomplished through electrical servo motors, linear actuators, etc., rather than through mechanical linkages. In this manner it will not be necessary to separately connect and disconnect steering linkages that may extend between the body and the tie structure, the vehicle frame or the hub carrier. Also, if servo motors, etc., are used, a conventional steering wheel can be replaced with a "steering stick," perhaps similar to the control stick of aircraft.

Figure 4:
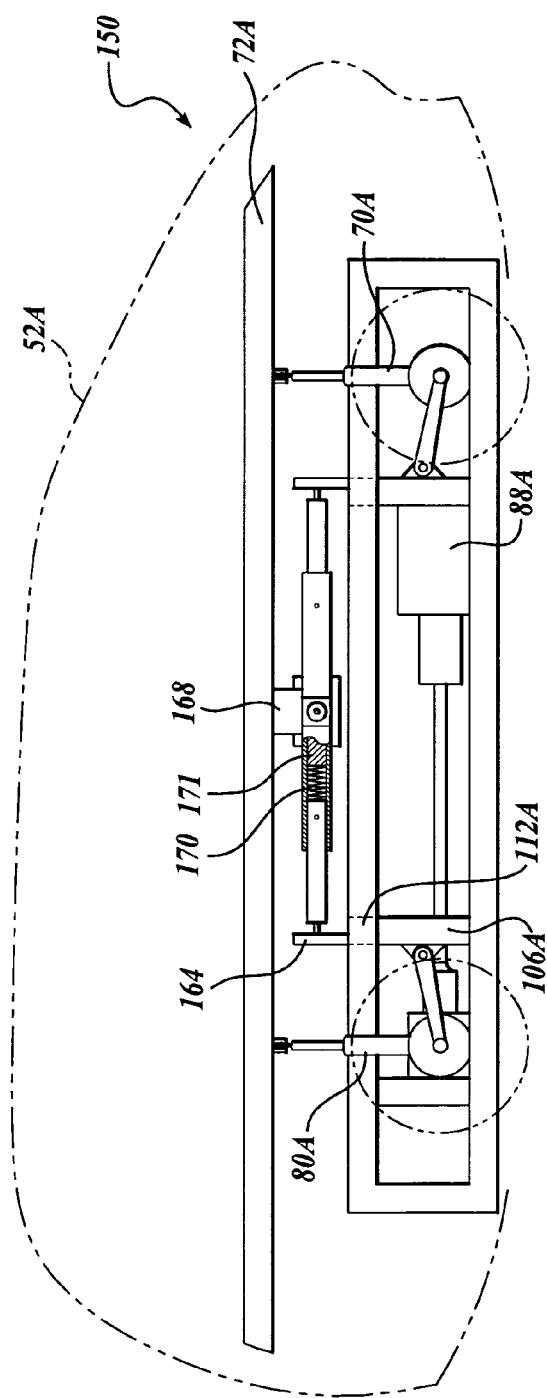
FIG. 4 is a side elevational view of another embodiment of the present invention.
Figure 5:
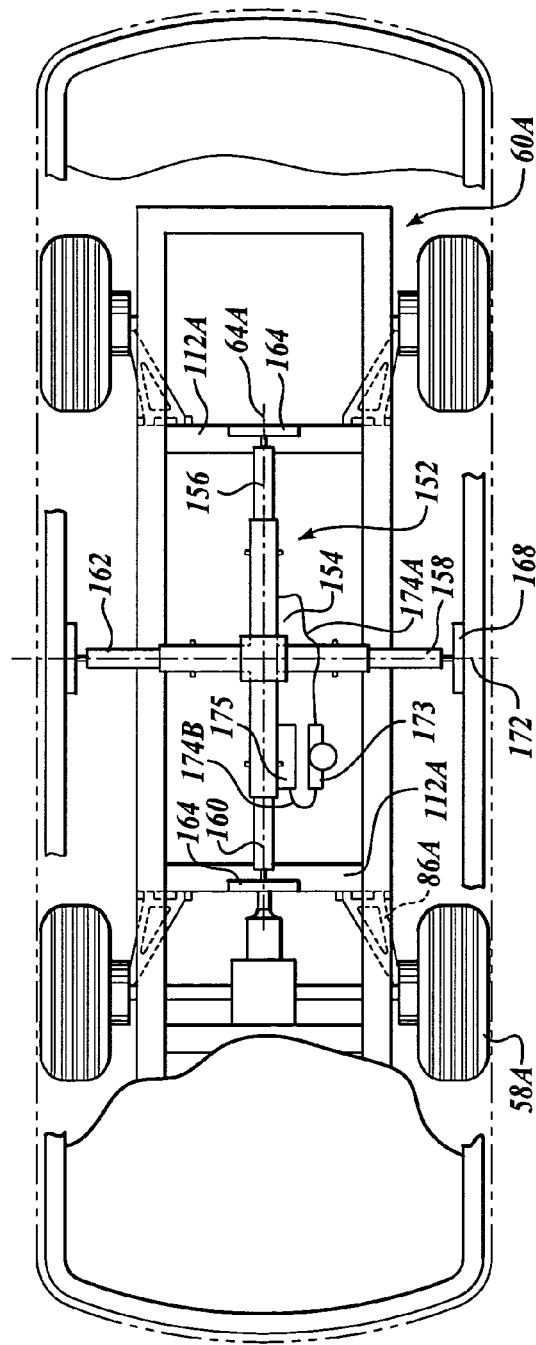
FIG. 5 is a top view of FIG. 4 with portions broken away.

Another embodiment of the present invention is illustrated in FIGS. 4 and 5. In this embodiment, vehicle 150 was constructed similarly to vehicle 50 of FIGS. 1, 2 and 3, but with the exception of a slide system 152. Thus, like parts in FIGS. 3 and 4 are numbered the same as in FIGS. 1, 2, and 3, but with the addition of the suffix "A.".

The slide system 152 may be constructed with a cross-shaped slide collar housing 154 for receiving therein four separate slides 156, 158, 160 and 162 extending from the slide housing 154 in the forward, right hand, rearward and left hand directions, respectively, relative to the direction of the vehicle 150. The outward ends of the slides 156 and 160 may be attached to brackets 164 and 166, respectively, extending upwardly from transverse intermediate crossmembers 112A of the tie structure 60A. The outward ends of the lateral slides 158 and 162 may be attached to brackets 168 extending downwardly from body structural member 72A. A compressible member 170 may be positioned between the inward ends of each of the slides 156, 158, 160 and 162 and a stop 171 disposed inwardly of the adjacent end of the slides. The compression member 170 may place a nominally outward load on the slides, which load can be overcome if a sufficiently high relative force is imposed between the vehicle body 52A and the tie structure 60A. The compressible member 170 can be composed of various structures, such as a compression spring, crushable material, etc. Perhaps one advantage of the use of a compression spring as the compressible member is that after relative movement takes place between the body 52A and the tie structure 60A, the body can be returned to a nominal position relative to the tie structure.

It will be appreciated that the body 52A is capable of moving both longitudinally and laterally relative to the tie structure 60A, thereby to accommodate loads imposed on the body in both the longitudinal and transverse directions. Moreover, with the present invention, the body is capable of tilting relative to the tie structure 604 about longitudinal axis 64A extending concentrically relative to slides 156 and 160. Also, the body is capable of pitching relative to the tie structure 60A about the transverse axis 172 extending concentrically with the transverse slides 158 and 162.

It will be appreciated that during normal operation of vehicle 150, the slide system may be designed to not come into play. The vehicle body is able to roll about longitudinal axis 64A, and pitch about transverse axis 172 without the body moving relative to the tie structure 60A through the slide system 152. In other words, the roll and pitch stiffness of the body due to springs 70A and 80A is less than lateral and/or longitudinal displacement stiffness of the body due to compression members 170.

Alternatively, the slide assembly 152 may be designed to function during the normal operation of the vehicle. For example, the slide assembly 152 may be designed to shift longitudinally or laterally during the normal operation of the vehicle.

Rather than it being "passive," the slide system 152 may be powered to actively shift the body 52A relative to the tie structure 60A. In this regard, compressible member 170 of the slide system 152 may be replaced by fluid, for instance, hydraulic fluid, that may be delivered to and extracted from selected locations in the housing 154 by a fluid pump 173 in fluid flow communication with the housing 154 by lines 174A and 174B. A fluid reservoir 175 may be utilized with the fluid pump to store extra fluid as well as the return fluid from the housing 154. Although the fluid pump 173 is illustrated as being in fluid flow communication with the housing 154 in the fore and aft directions, the fluid pump 173 can also be used to shift the body 52A in the lateral direction.

It will be appreciated that the slide system 152, as well as other slide systems of the present invention, might be conveniently and advantageously incorporated into a preexisting vehicle. Of course, some modifications to the vehicle likely would be required so that the slide system 152 can be interposed between the existing vehicle body and existing vehicle chassis/frame. Perhaps it is more likely that adaptation of a slide system 152 into an existing vehicle might be easier to accomplish if the vehicle has a body with a separate underlying frame rather than being of a unibody construction.

Portions of the body 52A may be constructed from crushable material to absorb some of the energy from an impact force imposed on the vehicle. Such body portions may be designed to be easily removable from the vehicle to facilitate replacement thereof. It will be appreciated that by a combination of constructing the body 52A with crushable material and utilizing the slide system 152, described above, the vehicle can be made to better protect passengers during a crash, and also reduce the overall damage caused to the vehicle.

Figure 6:
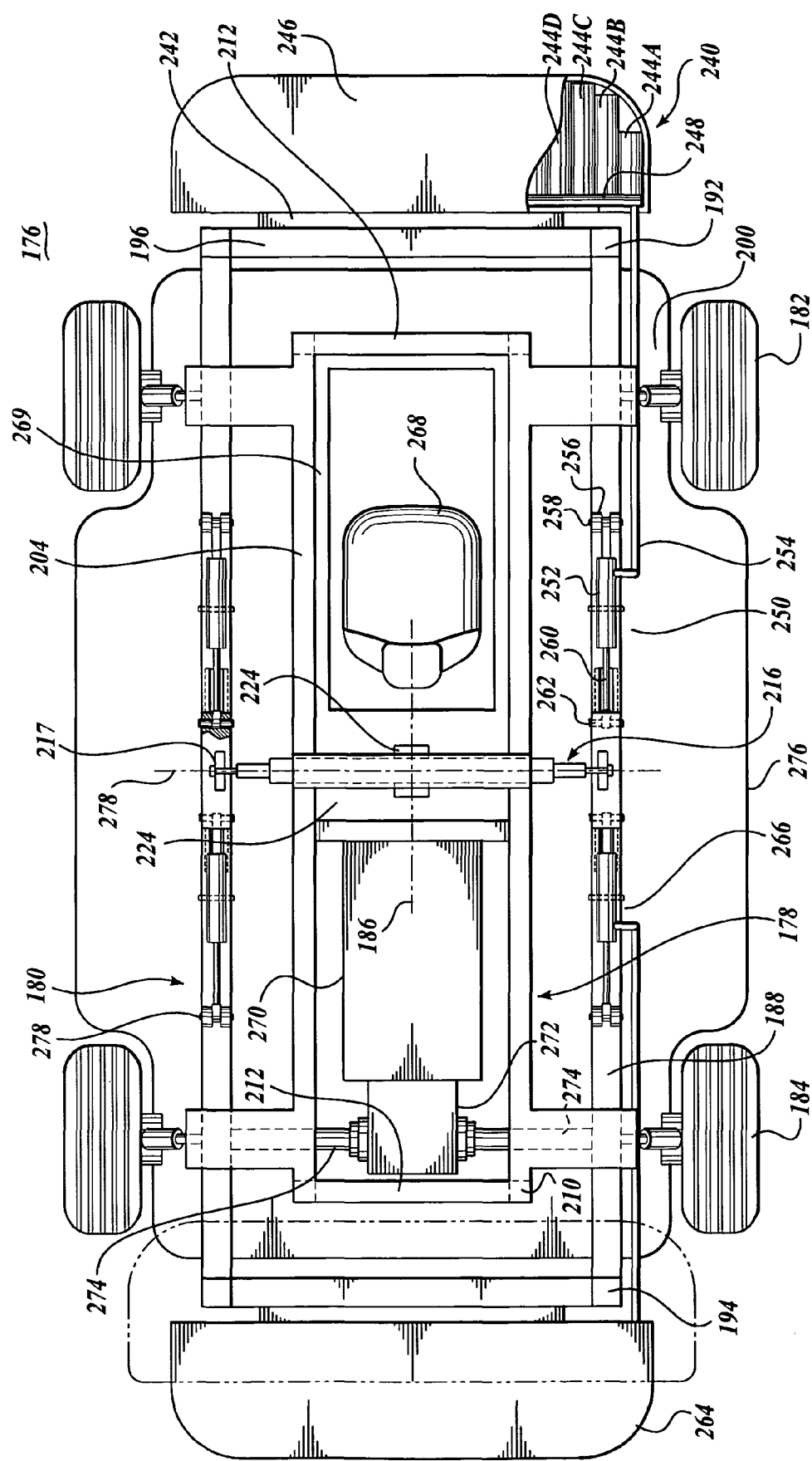
FIG. 6 is a top view of a further embodiment of the present invention.

FIGS. 6, 7 and 8 disclose a further embodiment of the present invention wherein a vehicle 176 is shown as having a body structure 178 positioned within the perimeter of a tie structure 180. The vehicle is mounted on forward and rearward wheel assemblies 182 and 184. As in the prior embodiments of the present invention, described above, the body structure 178 is capable of longitudinal and lateral movement relative to the tie structure 180 and is also capable of tilting relative to the tie structure about a longitudinal axis 186. Also, as discussed more fully below, the body is capable of pitching about a transverse axis 278 relative to the tie structure.

The tie structure 180 shown in FIGS. 5, 6, and 7 may be shaped and constructed somewhat similarly to the tie structures 60 and 60A noted above. In this regard, the tie structure may be in the form of a rectangular box-type structure that extends longitudinally along the lower elevations of the vehicle 176. The tie structure may be composed of elongated top and bottom side beams 188 and 190 extending along both sides of the vehicle, and spaced vertically apart by forward and rearward vertical members 192 and 194 as well as intermediate vertical members (not shown). The forward ends of the side beams 188 and 190 may be transversely connected by upper and lower crossmembers 196 and 198. The same types of crossmembers may be utilized at the rear end of the tie structure 180. One or more intermediate crossmembers (not shown) may be utilized for reinforcing purposes. Such crossmembers may extend through the body 178. Additional reinforcing members (also not shown) may be added to the tie structure, as needed. Such reinforcing members may also extend through the body. It is to be understood that the tie structure 180 may be constructed from many appropriate materials, such as tubing or channel stock. Moreover, the tie structure may be constructed in other configurations without departing from the spirit or scope of the present invention.

The tie structure 180 may be supported by wheel assemblies 182 and 184 through the use of torsion assemblies 200. The inboard ends of the torsion bar assemblies 200 may be connected to the tie structure 180 in a manner similar to that illustrated and described above in relation to FIGS. 1, 2 and 3. The outboard ends of the torsion bar assemblies 200 may be connected to the lower portions of wheels hub assemblies 201 through the use of ball joint assemblies in a well-known manner.

The body structure 178 is illustrated in FIGS. 6-8 as being of a generally tubular or similar construction and positioned partially within the perimeter of the tie structure. The body structure may include a rectangular box-type structure composed of upper and lower side beams 204 and 206 extending along opposite sides of the body and vertically spaced apart by forward and rearward vertical members 208 and 210. Additional vertical members (not shown) may be utilized intermediate the forward and rearward vertical members. The forward and rearward ends of the longitudinal upper and lower side beams 204 and 206 may be transversely connected by upper and lower crossmembers 212 and 214.

The body structure 178 can be covered by a body shell (not shown) in the manner of race cars. Ideally, the body shell is easily removable from the body structure.

The body structure 178 may be connected to the tie structure 180 through the use of an intermediate slide assembly 216 that spans across an intermediate portion of the tie structure at or near the fore and aft center of the vehicle. The slide assembly 216 may include a transverse central bar member 216A having blind bores formed in the ends thereof for slidably receiving plunger rods 216B therein. A compression spring or other resilient device 216C may be interposed between the blind ends of the bores formed in the bar 216A and the adjacent, inward ends of the rods 216B, thereby to impose a nominal outward load on the rods. A pivot pin 217 may extend outwardly from the ends of the rods 216B to engage within close-fitting through-holes formed in slide plate assemblies 218, which slidably engage with a slideway 220 positioned along the top of the tie structure upper side beams 188. The slide plate block 218 may have a bottom transverse slide section that closely engages within and is slideable relative to the slideway 220. The slide plate assemblies may also include upright plate portions that extend upwardly from transverse slide section to pass through a narrow slot or entrance formed in the upper section of the slideway 220 (at the upper portion of side beams 188), to an elevation corresponding to the end portion of slide assembly 216. It will be appreciated that other alternative constructions for slide plate assemblies 218 and slideway 220 may be utilized without departing from the spirit or scope of the present invention. Also, the slide plate assembly 218 may be nominally positioned relative to the length of slideway 220 by any convenient means, such as by use of compression or extension springs or shear pins (not shown).

The body structure 178 may be coupled to the immediate slide assembly 216 by use of a bracket 224 that extends downwardly from the central upper portion of the body to be pinned to the intermediate slide assembly by a longitudinal pin 226 that is longitudinally aligned with roll axis 186. This construction allows the body structure 178 to roll relative to the intermediate slide assembly 216 and tie structure 180 about the roll axis 186. The body structure 178 is supported and stabilized relative to the hub assemblies 201 by strut assemblies 232 that extend upwardly from the hub assemblies for connection to upper portions of the body by use of standard connection joints, such as ball joints 236.

The present invention as illustrated in FIGS. 6-8 includes a system for achieving relative longitudinal movement between the tie structure 180 and the body 178 upon impact loads applied to the tie structure with the distance of relative movement proportional, or otherwise related, to the magnitude of the impact load. This system includes a forward bumper assembly 240 mounted against the forward end of the tie structure 180 by mounting bracket 242. The forward bumper assembly 240 may include a plurality of telescoping, forwardly extending tubular members 244A, 244B, 244C, 244D, etc., disposed within an outer, flexible cover structure 246. The telescoping members 244 may be designed to contract or compress when the bumper assembly 246 impacts against another vehicle or other object in a controlled manner so as to dissipate some of the force of the impact.

The interior of the bumper 246 may be filled with a fluid that can be used to enhance the structural integrity of the bumper assembly. The fluid within the bumper assembly 240 may also be utilized to shift the body 178 relative to the tie structure 180 when the bumper assembly impacts against another vehicle or other object. To this end, an elongate manifold 248 extends at least partially along the width of the bumper, at the rearward portion thereof. The manifold 248 is in fluid flow communication with the fluid within the bumper assembly 240. The manifold 248 may be in the form of a tubular member or of other appropriate construction.

The manifold 248 is in fluid flow communication with fluid actuators 250 which are illustrated in FIGS. 6-8 as being in the form of a fluid cylinder. The actuators 250 each includes a cylinder portion 252 in fluid flow communication with the bumper assembly 240 through a fluid pipe or a line 254. The cylinders 252 are pinned to the upper side beams 188 of the tie structure 180 by a pair of parallel, spaced apart mounting ears 256 extending upwardly from the upper surfaces of the beams 188 to receive the adjacent ends of the cylinders 252 therebetween. Close-fitting pins 258 extend through aligned openings formed in the mounting ears 256 and in the adjacent end of the cylinder 252 to pivotally couple cylinders 252 to the mounting ears. A piston rod 260 is extendible outwardly of the opposite end of the cylinder 252. The forward or free end of the rod 260 is pinned to the forward portion of slide plate 218 for the use of a pivot pin 262.

The vehicle 176 also may include a rear bumper assembly 264 that may be constructed essentially identically or at least somewhat similarly to the forward bumper assembly 240. As with the forward bumper assembly 240, the rearward bumper assembly 264 may also function as a bladder for fluid used to shift the body structure 178 relative to the tie structure 180 during a crash or application of an input load to the tie structure. To this end, the rear bumper assembly 264 may be in fluid flow communication with rearward fluid actuators 266, that may be constructed essentially identically or similarly to the forward fluid actuators 250. As such, the details of the construction of the rear bumper assembly 264 and rear fluid actuators 266 will not be repeated here.

As an alternative, the fluid actuated system, described above, may be replaced with a mechanical linkage system (not shown). The mechanical linkage system can be configured so that if an impact load is applied to the front and rear bumper assembly 240, 264, the body can be shifted away from the location of the impact relative to the bumper.

A seat assembly 268 for the vehicle driver/occupant is located in the forward portion of the body 178. Although the vehicle 176 is illustrated as configured for limited occupancy, for instance for racing, the vehicle may be reconfigured to carry a plurality of passengers. In this regard, the body 178 may be widened relative to the width of the tie structure so as to occupy substantially the entire width between the side beams 188 and 190 of the tie structure.

Figure 12:
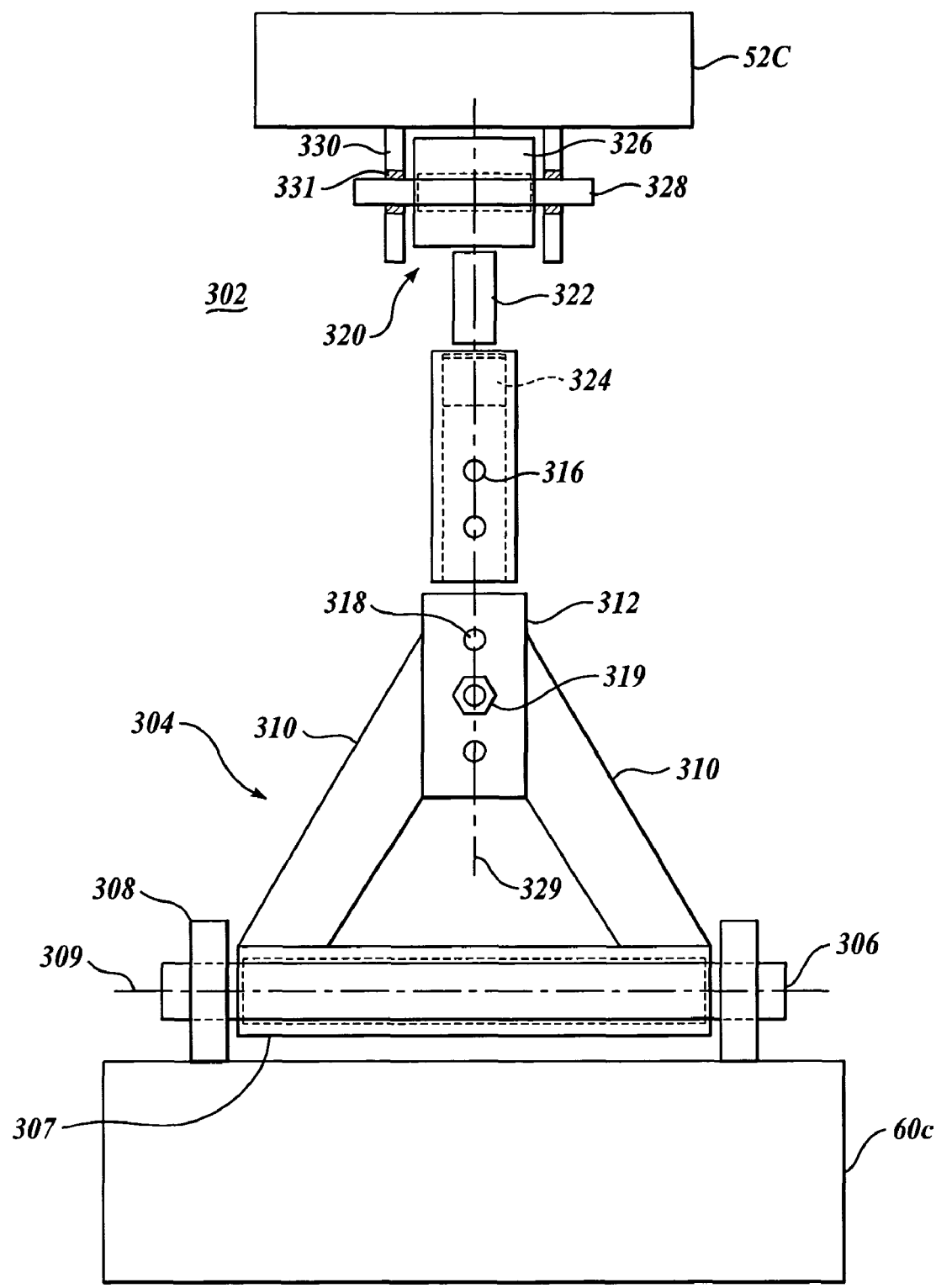
FIG. 12 is an enlarged fragmentary view of portions of the embodiment shown in FIGS. 10 and 11.

The seat assembly may be mounted on a slide system to move under impact in the manner of the seat assemblies shown in FIG. 12. Also, the assembly 268 may be enclosed in a surrounding cockpit 269, which in turn may be mounted on a slide assembly (not shown) to protect the driver and allow the cockpit to continue to move in the direction of travel of the vehicle despite the impact force applied to the vehicle.

A propulsion engine 270 is illustrated as disposed within the rear portion of the body 178. The engine 270 may be coupled to a transaxle 272 to transmit the engine power to rear wheel assemblies 184 through drive axles 274 that extend transversely outwardly from each side of the transaxle to drivingly engage the rear wheel assemblies 184 in a manner well known in the art. Universal joints, constant velocity joints or other connectors may be utilized between the transaxle 272 and the drive axles 274 as well as between the drive axles and the rear wheel assemblies 182 in a manner well known in the art to accommodate relative movement between the transaxle and the rear wheel assemblies. Moreover, rather than carrying the weight of the engine 270 in the body 178, the engine can instead be mounted on the tie structure 180.

As a further aspect of the present invention, an air foil/ground effect structure 276 is mounted on the underportion of the body 178. The air foil or ground effect structure ideally spans between the wheel assemblies 182 and 184 in the side-to-side direction and beyond the wheel assemblies in the fore and aft direction as illustrated in FIGS. 6-8. The ground effect structure may be a singular structural member or composed of a plurality of members that cooperatively form the ground effect structure. Also, the ground effect structure may be oriented (tilted downwardly in the forward direction) relative to the ground to cause a partial vacuum to be created under the vehicle, thereby to impart a downward load on the vehicle when traveling at a sufficiently high speed. This downward load on the body is transferred to the tie structure and from there to the forward and rearward wheel assemblies 182 and 184.

The ground effect structure 276 may also serve to "close off" the lower front portion of the vehicle 176 to also help create a partial vacuum beneath the vehicle. Also, during use, the pitch of the body may serve to keep the body relatively level with respect to the ground and also maintain a constant distance between the underside of the body and the ground. Also, the ground effect structure 276 may be constructed to be somewhat adjustable in orientation to alter the amount of downward load created, in a manner well known in the art.

Rather than being carried by the body 178, the ground effect structure can be connected to the tie structure, so that the downward load created during vehicle travel is imposed on the tie structure rather than on the body. Of course this load is carried through the tie structure connections with the wheel assemblies. Alternatively, a separate air foil 277 may be mounted on the upper portions of the tie structure to impart a downward load thereon. In a known manner, the angle of attack of the air foil may be adjustable so as to vary the downward force generated by the air foil.

In use, if the vehicle 176 hits or is hit by another vehicle or object at, for instance, the front of the vehicle, the body 178 may shift rearwardly relative to the tie structure 180, a distance in proportion to the level of impact sustained. In this regard, fluid within the forward bumper assembly 240 may flow out therefrom through lines 254 as the bumper assembly is deformed and thereby reduced in volume. The fluid flowing from the bumper assembly through lines 254 is routed to linear actuators 250, thereby to extend the piston rods 260 thereof outwardly therefrom, which in turn pushes the slide plates 218 rearwardly relative to the tie structure, thereby shifting the body 178 also rearwardly. Flow restrictors may be used in line 254 or in cylinder 252 to control the rate of movement of the body relative to the tie structure. Also, at the same time, the fluid in the rear actuators flows out of the actuators and into the rear bumper assembly or to a separate actuator (not shown). Further, a flow controller can be incorporated into the rear actuators or rear fluid lines to control the flow of fluid between the rear actuators and the associated accumulator or rear bumper 264.

Simultaneously, during breaking, the body may pivot about transverse axis 278 defined by pins 217 due to the braking force being applied to the body at its center of gravity 280, which is at a level below transverse axis 278. As such, a larger downward force is applied to the rear springs of the vehicle 176 than in a conventional vehicle (whereupon braking, the pitching of the vehicle imposes a larger downward force on the front vehicle springs and may substantially unload the rear vehicle springs), thereby providing good contact between the rear wheel assemblies 184 and the ground to improve the braking ability of the vehicle.

In addition, the vehicle 176 is capable of tilting in the inward direction when cornering to compress the inside springs, while at the same time the tie structure 180 is capable of swinging slightly outwardly when cornering, thereby preventing the longitudinal axis 186 of the vehicle from serving as a roll reaction center, i.e., the elevation or point to which the lateral forces act to cause a jacking effect that tends to raise the inside wheels and roll the vehicle about its outside wheels. As a result, as discussed above, the effective roll reaction center of the vehicle is at an elevation below the elevation of the pivot axis 186, resulting in a lower rate of force transfer being imposed on a vehicle during cornering. Thus, the construction of the vehicle 176 can provide the same operating characteristics and advantages provided by the vehicles 50 and 150 when cornering, as discussed above.

Figure 9:
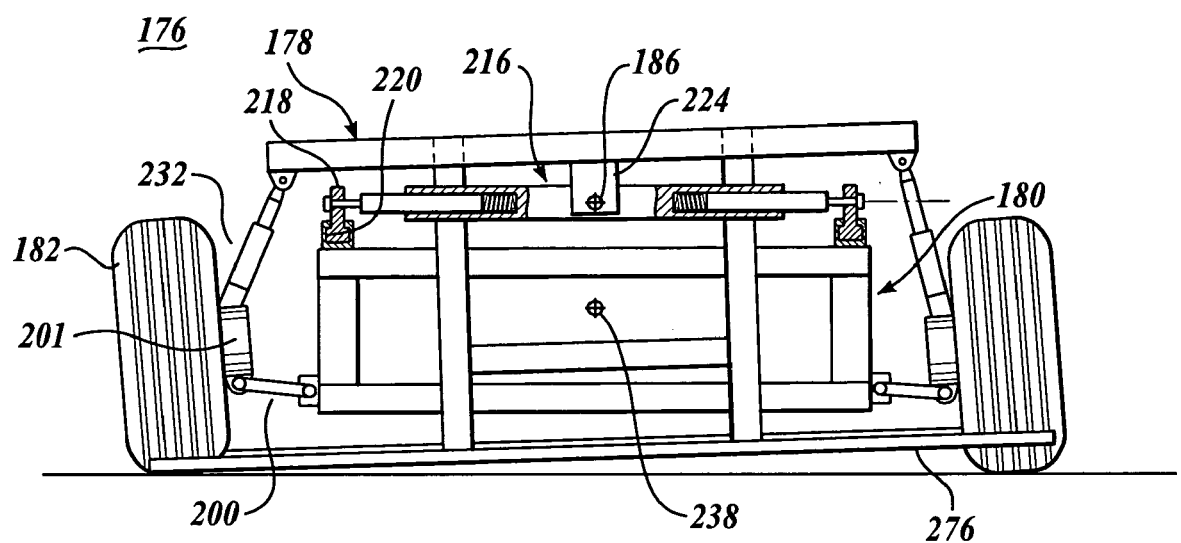
FIG. 9 is a further front elevational view of the embodiment shown in FIGS. 6, 7 and 8 with the body and tie structure tilted as when negotiating a curve.

The embodiments of the present invention, including that of FIG. 9, provide positive dynamic camber to the vehicle. FIG. 9 shows the tie structure 180 tilted outwardly relative to the curve (right hand direction) and the body structure 180 tilted inwardly into the curve (left hand direction) to a greater extent than the outward tilt of the tie structure. As a result of such tilting of the tie structure and body, and the interconnection of the tie structure to the wheel assemblies 182 and 184 and the connection of the strut assemblies 232 to the body above the roll center 186, the wheels are tilted inwardly into the curve, providing positive dynamic camber. As will be appreciated, this improves the traction, turning and cornering abilities of the vehicle.

The body structure 178 is also capable of pitching relative to the tie structure by rotation of the body about transverse pivot axis 278. In this regard, the rods 216B may rotate relative to the center bar portion 216A. Alternatively, the pivot pins 217 extending outwardly from the rods 216B may pivot relative to the slide blocks 218. Since the transverse pivot axis 278 is located above the center of gravity 236, during braking a longitudinal force is imposed on the springs of the vehicle 174 in a forwardly direction at the elevation of the center of gravity 234. In the present invention such longitudinal force will tend to cause the body to pivot about transverse axis 278, so that the rear end of the body tends to lower, while the front end of the body tends to rise, thereby maintaining significant load on the rearward torsion bar assemblies. It will be appreciated that during hard acceleration the opposite effect occurs, thereby maintaining significant loading on the front wheels of the vehicle.

Also, during hard braking, or perhaps during a crash or impact, the body structure 178 is capable of moving longitudinally relative to the tie structure by the sliding of the slide block plates 228 relative to the slideway 220. Such sliding movement can reduce the effect of a crash on the body, and in particular on the occupant(s) of the vehicle. This may be very significant if the vehicle construction shown in FIG. 9 is employed in a racing vehicle.

Rather than relying solely on compression of the bumper assemblies to cause the body 178 to shift relative to the tie structure, a powered system might be employed. In this regard, one or more hydraulic pumps can be utilized to force fluid into and out of linear actuators 254 when it is desired to cause the body 178 to be longitudinally shifted, for instance when accelerometers or other sensors indicate that a crash of the vehicle is occurring or may be imminent. The hydraulic pump can be utilized in conjunction with the bumper assemblies 240 or may be employed in lieu of such bumper assemblies and the associated fluid lines interconnecting the bumper assemblies to the linear actuators.

Figure 11:
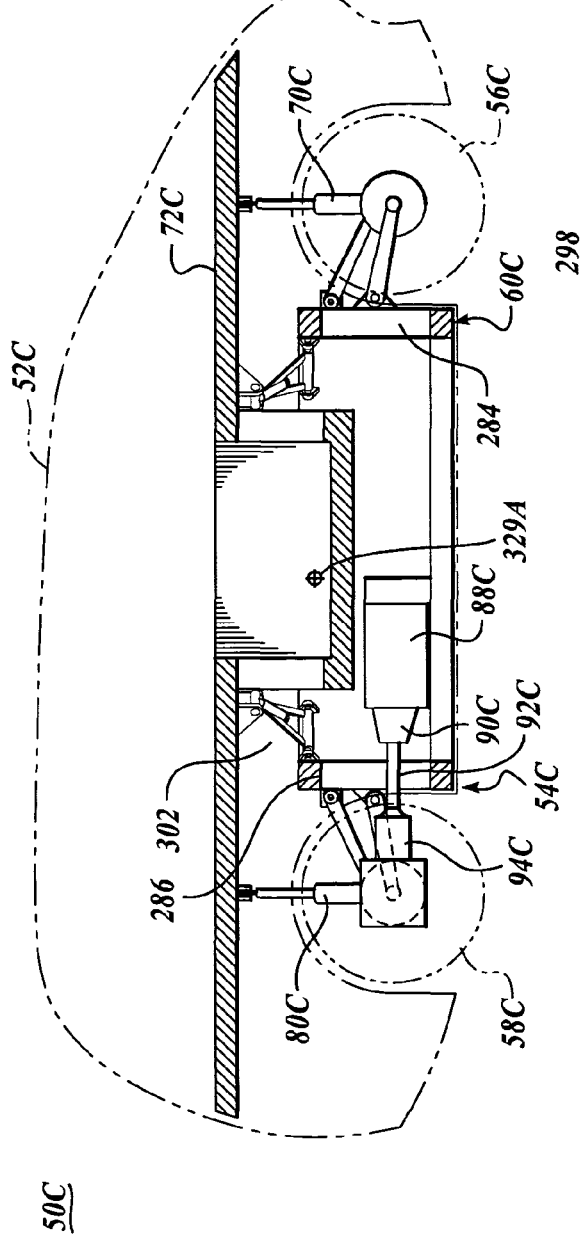
FIG. 11 is a side elevational view of FIG. 10.
Figure 10:
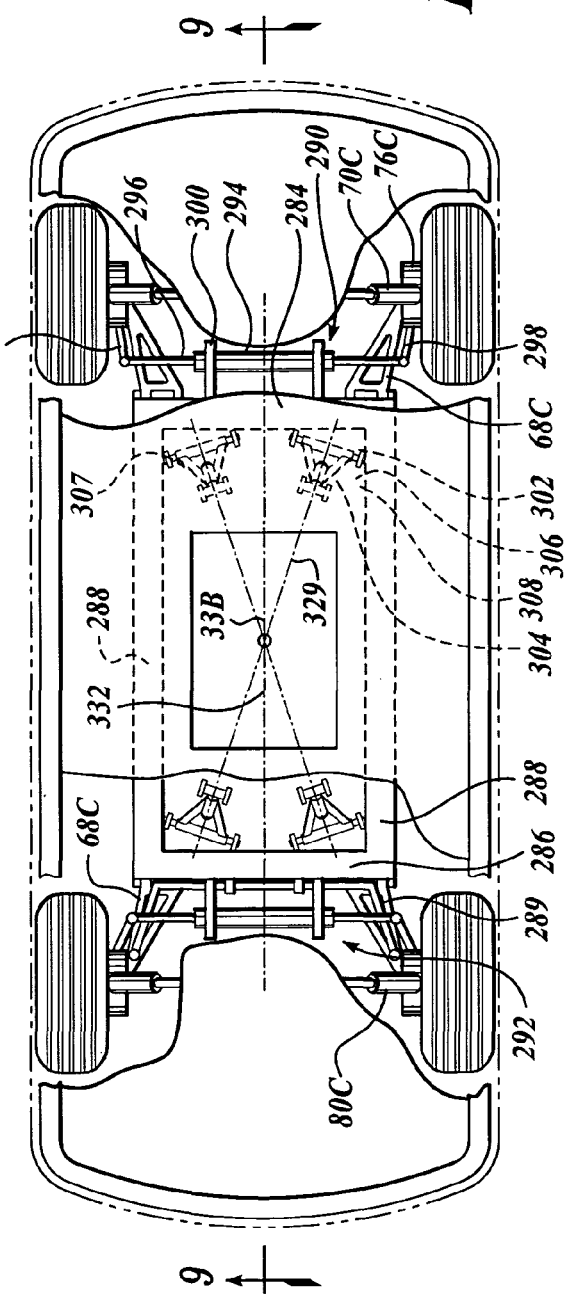
FIG. 10 is a top view of a further embodiment of the present invention.

FIGS. 10 and 11 disclose a further embodiment of the present invention wherein vehicle 50C includes a body 52C mounted on a suspension system 54C, which in turn is supported by forward wheel assemblies 56C and rearward wheel assemblies 58C. A tie structure 60C is interposed between the vehicle body 52C and the wheel assemblies 56C and 58C. The tie structure 60C extends longitudinally along a lower elevation of the vehicle 50C and is interconnected to the body through a plurality of pivoting arm assemblies 302 to enable the body to roll and pitch relative to the tie structure 60C.

As shown in FIGS. 10 and 11, the tie structure may be of generally rectangular construction having forward and rearward panel sections 284 and 286 interconnected by longitudinal side panel sections 288. The tie structure 60C may be constructed by tubular components, plates or other appropriate structural members and materials. The tie structure may be connected to hub carriers 76C of the forward and rearward wheel assemblies 56C and 58C in a manner described above with respect to FIGS. 1, 2, and 3. As such, the construction and operation of the pivot arm assembly 68C will not be repeated here. Also, an anti-roll bar 289 or other device can be used between the pivot arm assemblies and the tie structure of simply between the pivot arms themselves. Such anti-roll bar 289 is shown at the rear of the vehicle. A similar anti-roll bar can be used on the front of the vehicle. Such anti-roll bar includes a central length 289A that is mounted to the rear of the tie structure 60C and end arms 289B that extended rearwardly and outwardly from the central section to be attached to corresponding hub assemblies of rear wheel assemblies 58C.

The body 52C may be supported from the wheel hub assemblies by forward spring/shock absorber assemblies 70C and rearward spring/shock absorber assemblies 80C in a manner similar to that shown in FIGS. 1 and 2. The upper ends of the spring/shock absorber assemblies are connected to a structural member(s) 72C of the body. It will be appreciated that rather than being constructed as a solid unit, the structural member 72C may be of tubular or other type of construction, thereby to minimize its weight while still providing sufficient structural integrity to carry the loads imposed thereon, not only by the static weight of the vehicle 50C, but also to carry the dynamic loads imposed on the vehicle during travel, including during cornering, as well as during acceleration and braking.

As shown in FIG. 10, the suspension system 54C may utilize forward and rearward steering assemblies 290 and/or 292 to steer the forward and rearward wheels. The forward and rearward steering assemblies may be of similar construction, and thus, only the construction of the forward steering assembly will be described with the understanding that the rear steering assembly is of similar construction and operation. The forward steering assembly 290 may include a rack and pinion subassembly 294. The outer ends of the rack 296 are connected to the adjacent hub carrier 76C by steering links 298 in a manner well known in the art. The rack and pinion subassembly 294 is mounted on the forward portion of the tie structure 60C by a pair of forward-extending mounting brackets 300.

It is to be understood that other systems may be used to steer vehicle 50C or the other vehicles of the present invention. For example, steering can be carried out by connecting the steering components electrically rather than using a rack and pinion. In this regard, rather than being connected to a vehicle steering wheel by a mechanical linkage arrangement, a linear actuator may be used to power the rack 296. Moreover, electrical linear actuator may be used to power the steering arms, thereby eliminating the need for a rack.

Referring also to FIG. 12, the body 52C may be mounted to the tie structure 60C by four arm assemblies 302, located at each of the four corner portions of the tie structure 60C. Each of the arm assemblies 302 may include a generally triangularly shaped arm structure 304 coupled to the tie structure by a pivot shaft 306 that closely engages through the interior of a tubular base member 307 to engage aligned clearance holes provided in mounting ears 308 fixed to the tie structure. The pivot shaft 306 defines a pivot axis 309 about which the arm structure 304 is able to pivot relative to the tie structure. The arm structure 304 also includes a pair of arms 310 that extend from the ends of the base 307 towards the apex of the arm structure. The distal apex ends of the arms 310 intersect a tubular collar 312 oriented substantially perpendicularly to cylindrical base member 307 but in planar alignment with the base member so that the central axis of collar 312 is in the same plane as the central axis of base member 307. The collar 312 may be sized to receive a close-fitting cylindrical bushing 314 having a plurality of diametric cross-holes 316 formed along the bushing and spaced apart to correspond with the spacing of corresponding diametric cross-holes 318, provided in collar 312. Crossbolts 319 extend through the bushing cross-holes 316 and through corresponding collar cross-holes 318 to retain the bushing 314 in engagement with collar 312 at a desired relative position therebetween. It will be appreciated that the effective length of the arm structures 304 may be varied depending on which of the cross-holes 316 are in alignment with the cross-holes 318. It will also be understood that the extent of relative engagement between bushing 314 and collar 312 may be controlled by other structures. For instance, the bushing 314 can be formed with external threads (not shown) to mate with internal threads (not shown) formed in collar 312.

One purpose of being able to adjust the effective lengths of the arm assemblies is to change the elevation or other locations on which the arm assemblies can be mounted on the tie structure 60C, which changes the nominal angular orientation of the arms and thus the amount that the body is allowed to roll and pitch relative to the tie structure.

Also, the nominal length of the forward arm assemblies can be changed relative to the rear arm assemblies to move the location of the pitch center of the vehicle fore and aft, as desired. This will affect the relative loading on front and rear wheel assemblies during braking and acceleration.

The arm assembly 302 also includes an end connection knuckle 320, having a stub shaft portion 322 sized to closely and rotatably engage within a radial bearing or bushing 324 disposed within the adjacent end of bushing 314. The stub shaft is allowed to rotate relative to the bushing 324, but not move longitudinally relative to the bushing, being held captive by a snap ring or other well-known means (not shown). The connection knuckle 320 also includes a collar section 326, disposed transversely to stub shaft 322 and having an aperture therein for receiving a crosspin 328 that engages through close-fitting openings formed in mounting ears 330 fixed to the body structural assembly 72C. An elastomeric bushing 331 may be interposed between the crosspin 328 and the mounting bar ears 330 to provide some insulation therebetween. Similar bushings can be used between pivot shaft 306 and mounting ears 308 or at other joint locations of the arm assembly 302.

As shown in FIG. 10, the two forward arm assemblies 302 are oriented in a rearward and inward direction relative to the vehicle 50C, and likewise, the two rearward arm assemblies 302 are oriented in the forward and inward direction. The forward arm assemblies 302 are oriented such that the central axis 329 extending through collar 312 and the apex of the arm assemblies (and perpendicular to pivot shafts 306 and shafts 328) will intersect substantially at the longitudinal centerline 332 of the body 52C and tie structure 60C. The rear arm assemblies 302 are positioned in a similar orientation.

It is to be understood that the arm assemblies can be positioned at angles other than as shown in plan view on FIG. 10, thereby to change the location of the pitch center and/or roll center of the vehicle. For example, the arm assemblies can be positioned so that their central axes all intersect at a common point along the longitudinal center line 332.

The body 52C may be supported relative to the forward and rearward wheel assemblies 56C and 58C by forward spring/shock absorber assemblies 70C and rearward spring/shock absorbers 80C in a manner similar to that shown in FIGS. 1 and 2. As such, the structure and operation of the forward and rearward spring/shock absorber assemblies will not be repeated here.

Also, the vehicle 50C may be driven by an engine 88C through a transmission 90C and drive shaft 92C in a manner similar to that shown in FIGS. 1 and 2. Accordingly, the construction and operation of these components will also not be repeated here.

Rather than being carried by the tie structure 60C, the engine 80C and transmission 90C may be carried instead by the body 72C without departing from the spirit or scope of the present invention. In certain situations, mounting the engine and transmission on the body rather than on the tie structure might be advantageous to the construction and performance of the vehicle. For example, it may be easier to obtain access to the engine and transmission if located on the body rather than on the tie structure. Also, by locating the engine and drive train on the body, a larger portion of the weight of the vehicle rolls about the roll center and pitches about the pitch center during operation of the vehicle. This configuration can result in larger dynamic loading on the vehicle tires.

In operation, as vehicle 50C rounds the corner, the body 52C is capable of tilting relative to the tie structure 60C about a longitudinal axis 332 defined by the intersection of the forward and rearward arm assemblies due to the ability of the arm assemblies to pivot relative to the tie structure and the body in the up and down directions only, as well as the connector knuckle of the arm assembly to rotate about collar 312 along axis 329. Moreover, the elevation of the longitudinal axis 332 corresponds to the elevation in which the axes 329 of the A-arm structures 304 intersect each other, which elevation is above the center of gravity 329A of the vehicle. Accordingly, when the vehicle 50C rounds the corner, the body 52C will pivot about longitudinal axis 332 in the direction inwardly of the curve (towards the center of curvature of the curve), in a manner similar to the embodiment of the present invention described above. Also, as will be appreciated, the arm assemblies 302 enable the body 52C to pitch relative to the tie structure 60C during braking or accelerating in the manner of previous embodiments of the present invention described above.

In addition, when vehicle 50C is cornering, the tie structure 60C is capable of swinging slightly outwardly due to the pivoting of the pivot arm assemblies 68C, thereby reducing the rate of force transfer of the centrifugal force through the tie structure, thereby delaying the time that the jacking effect fully acts on the body. As a result, as described above, the effective roll reaction center of the vehicle 50C is at an elevation below the elevation of longitudinal axis 332, resulting in a lower jacking effect being imposed on the vehicle during cornering. Thus, the construction of vehicle 50C can provide the same advantages when cornering as provided by the vehicles described above, including vehicles 50 and 150.

In addition, it can be appreciated that through the present invention, the arm assemblies 302 can independently move relative to each other. Thus, for example, during cornering, the arm assemblies located on the inside of the vehicle may move to a less steep or lower angle of inclination due to the inward tilting of the body and outward tilting of the tie structure relative to the inclination of the arm assemblies at the outside of the vehicle. Also, the arm assemblies on the inside of the vehicle drop down farther than the outside arms rise up.

It will be appreciated that if the arm assemblies are nominally adjusted to have a lower angle of inclination, more body movement will be achieved per movement of the arms.

It will be appreciated that the arm assemblies 302 may be replaced with other structures, for example, a linear actuator. Such linear actuator can be extended and retracted in a manner similar to extending and retracting the arm assemblies 302, as discussed above. Also, the arm assemblies 302 themselves can be modified so that their lengths can be automatically adjusted, for example, by the use of hydraulic or electric actuators to move the knuckle connector relative to the A-arm structure.

Figure 13:
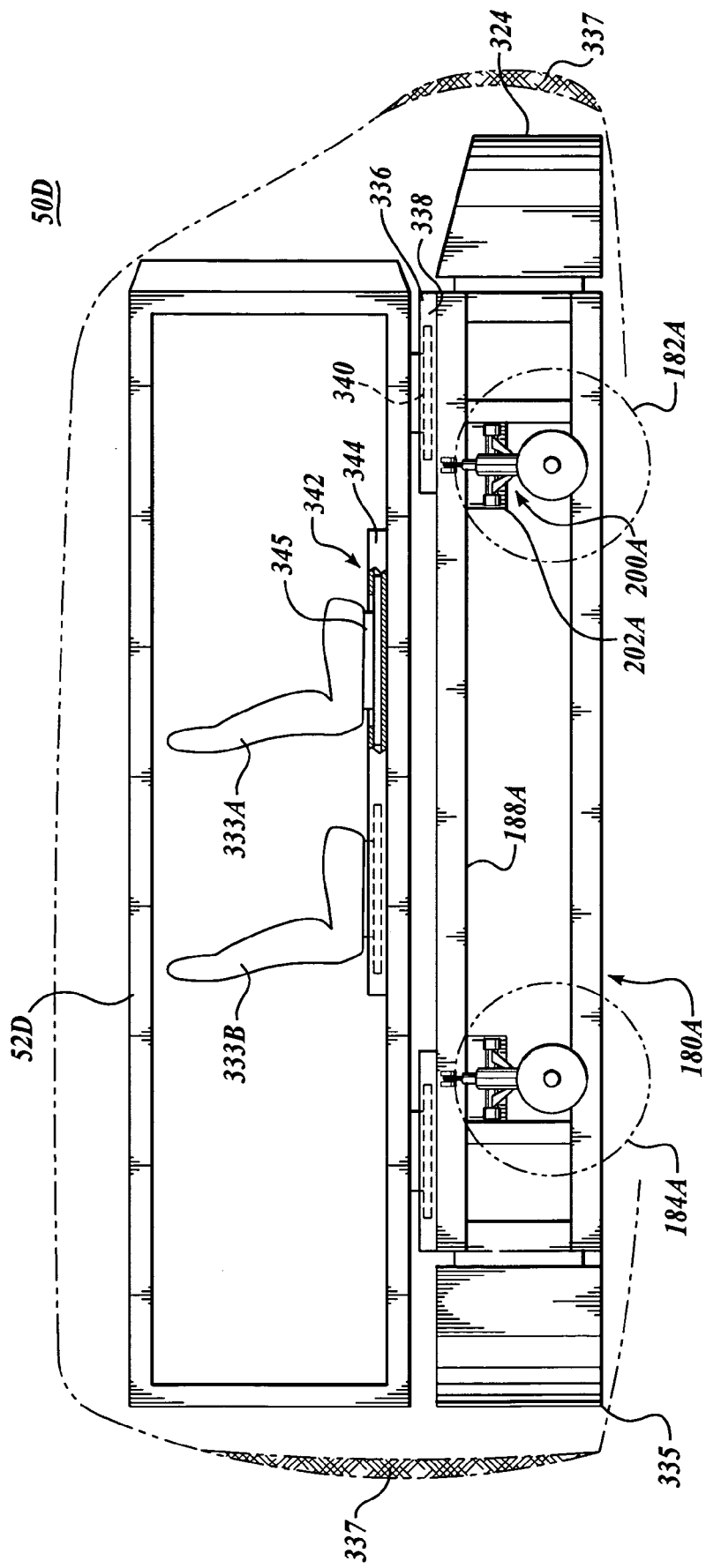
FIG. 13 is a further embodiment of the present invention in side elevational view.

FIG. 13 illustrates a further embodiment of the present invention, wherein a vehicle 50D is designed to allow a body 52D to slide longitudinally relative to the tie structure 180A upon an impact force applied to the vehicle in a direction away from the impact force, for instance, during a collision. In addition, the passenger seats 333A and 333B are designed to slide upon an impact load applied to the vehicle. The tie structure 180A is illustrated as of generally rectangular construction similar to the construction of the tie structure 180 shown in FIGS. 6, 7 and 8. As such, the construction of tie structure 180A will not be repeated here.

The vehicle 50D may include a forward bumper assembly 334 that is shaped similarly to bumper assembly 240 shown in FIGS. 6-8. In this regard, the bumper assembly 334 may be constructed similarly to bumper assembly 240 except that upon impact, the fluid in the bumper assembly may simply be expelled into the ambient air rather than utilized to move the body 52D relative to the tie structure 180A. Likewise, vehicle 50D may include a rear bumper assembly 335 that is constructed and shaped similarly to the rear bumper assembly 264 shown in FIGS. 6-8. The rear bumper assembly 335 can also be designed to expel the fluid therein into the ambient air rather than being utilized to shift the body 52D relative to the tie structure 180A.

It is to be understood that the forward and rearward bumper assemblies 332 and 334 also can be of other constructions. For instance, these bumper assemblies can be composed of crushable or collapsible material or structures to absorb at least some of the energy from collisions or other impact loads imposed on the vehicle. Also, collapsible material 337 may be mounted on body 52D to absorb energy in case of a crash. In FIG. 13, such material is shown at the front and back of the body 52D.

In a manner similar to that shown in FIGS. 6-8, the tie structure 180A is supported by forward and rearward wheel assemblies 182A and 184A with the use of lower control arm assemblies 200A that may be pinned to a mounting bracket 202A carried by the upper side beams 188A of the tie structure. The lower ends of the control arms 200A are coupled to the wheel assemblies 182A and 184A in the same manner as in FIGS. 6-8. Such coupling can be accomplished to enable the forward wheel assemblies 182A to be steerable, in a conventional manner.

Forward and rearward slide assemblies 336 are imposed between the tie structure 180A and the body 52D. The slide assemblies 336 may be of many different constructions, including composed of a slideway 338 mounted on the upper side of tie structure top side beams 188A to slidably receive a slide 340 secured to the underside of body 52D. The slide assemblies 336 may be designed to require a baseline impact load to be imposed on the vehicle 50D before permitting the body to slide relative to the tie structure. This can be accomplished in many well-known manners. If such threshold impact load is imposed on the bumper assemblies 334 or 335, the body 52D is permitted to continue to move somewhat in its same direction of travel rather than coming to an abrupt halt in the manner of a conventional vehicle or before beginning to move away from the impact as in a conventional vehicle. If the impact load is applied to the body, the body can slide relative to the tie structure in the direction away from the impact force. As such, the forces imposed on the vehicle passengers is significantly less than in a conventional vehicle.

It will be appreciated that the slide assemblies 336 may be constructed to allow the body 52D to also move laterally relative the tie structure 180A, for example during a crash or collision. The slide assemblies can include a transverse slideway (not shown) mounted to the body that would allow lateral movement of such slideways relative to slide 340.

In addition to, or in lieu of, the slide assemblies 336, further slide assemblies 342 may be utilized between passenger seats 333A, 333B and body 52D. The slide assemblies 342 can be of many known constructions. For example, a slideway assembly 344 may be mounted on the lower floor of the vehicle body and a slide assembly 345 attached to the lower bottom side of the passenger seats 333A and 333B. As with slide assemblies 336, the slide assemblies 342 can be designed to require a threshold impact load to be imposed on the vehicle before the passenger seats 333A and 333B are permitted to move relative to the body 52D. As noted above, this can be accomplished in many different ways to provide the same advantage provided by slide assembly 336, i.e., to permit the vehicle passengers to continue to move to a certain degree along their same path of travel toward an impact load when the impact load is applied to the vehicle tie structure. In addition, the slide assemblies 342 will enable the passengers to continue to move in their direction of travel if instead of an impact load being applied to the tie structure, such impact load is applied to the body 52D, thereby lessening the impact force imposed on the passengers. This could reduce the injuries caused to the vehicle passengers during a collision or other accident.

It will be appreciated that, rather than mounting the seats 333A and 333B on slide assembly 342, the seats might instead be mounted on a four-bar linkage arrangement or other type of structure to enable the seats to swing relative to the body during a crash or other significant impact load imposed on the vehicle. It will be appreciated that to accomplish such swinging movement, parallel swing arms may extend upwardly from the vehicle floor or downwardly from the vehicle roof, or laterally from the vehicle panels or structures, to support the seats during normal use and also to permit swinging movement of the seats during a crash.

As a further alternative, seats 333A and 333B may be pivotally mounted to the overhead portion of the body 52D. In this regard, a bracket may extend between the rear upper portion of the seats 333A and 333B and the overhead portion of the body 52D.

It is appreciated that the body 52D, shown in FIG. 13, is shown schematically. The body 52D can be of various other shapes without departing from the spirit or scope of the present invention. In this regard, the body 52D might be shaped generally in the manner of the body 52, shown in FIGS. 1 and 2. Moreover, the body 52D may be constructed to be easily removable from the tie structure 180A. In this regard, quick-release connectors can be utilized to connect the body 52D to the tie structure at the slide 340.

It will be appreciated that for the body 52D to move or slide relative to the tie structure, the body may require more structural integrity than in the typical automobile currently being manufactured. As such, it may not be necessary to design the body with crushable panels at the ends or sides thereof, although such crushable panels are an option.

FIGS. 14, 15 and 16 schematically illustrate a further embodiment of the present invention, wherein a vehicle 960 includes a body 962 mounted on an underlying tie structure 964, which is supported by wheel assemblies 966. The tie structure may extend substantially the length of the body 962 or may be composed of a forward section at the forward end of the vehicle and a separate rearward section at the rearward end of the vehicle. The body is capable of rolling relative to the tie structure, which preferably extends longitudinally of the vehicle and transversely across the vehicle at a lower elevation thereof. A lower control arm assembly 968 extends outwardly from a corner of the tie structure to the underside of hub assemblies 970 of the wheel assemblies 966.

FIGS. 14, 15 and 16 illustrate the forward end portion of the vehicle 960. The rearward end portion of vehicle 960 may be constructed similarly thereto. The control arm assembly 968 may be torsionally loaded relative to the tie structure 964 in a manner that is well known in the art, for instance as described above and illustrated in FIG. 3.

Swing arm assemblies 972 extend upwardly from corner locations of the tie structure 964 to pivotally couple to the adjoining portion of body 962. The swing arm assemblies 972 consist of longitudinally separated arms 972A and 972B interconnected by a pair of parallel rods or tubes 972C. The upper end portions of the arms 972A and 972B are pinned to the lower portion of the body 962, with the lower end portions of the arms pinned to side sections of the tie structure 964. As shown in FIG. 14, the swing arm assemblies 972 are sloped towards each other in the upward direction so that lines extending therefrom intersect at the roll center 978 of the vehicle. The swing arm assemblies 972 allow the body 962 to roll relative to the tie structure 964 while restricting relative longitudinal movement between the body and the tie structure. By this construction, the tie structures 964 and swing arm assemblies 972 can be incorporated into existing vehicles or designed into new vehicles without a radical change in design from existing vehicles.

Continuing to refer to FIGS. 14, 15 and 16, the vehicle 960 includes a propulsion engine/motor 974 that is carried by the tie structure 964. A drive train 975 may be interconnected between the motor/engine 974 and the wheel assemblies 966 in a manner well known in the art. Also, the motor/engine may be located near the forward end of the vehicle, near the rearward end of the vehicle, or at a location therebetween. The body 962 may be supported by strut assemblies 976 extending upwardly from hub assemblies 970 for connection to an upper portion of the body 962. The strut assemblies may be designed so that the roll stiffness of the body 962 is not as stiff as the roll stiffness of the tie structure.

With respect to the operation of the vehicle 960, applicant notes that the roll center 978 of the vehicle 981 is at a location defined by the intersection of lines extending longitudinally from swing arms assemblies 972, which is at an elevation substantially above the center of gravity 980 of the vehicle. As such, when the vehicle 960 rounds a corner, a centrifugal force is applied thereto at the center of gravity 980, which is at an elevation below the roll center 978. As such, the body 962 tilts inwardly toward the center curvature of the curve about the roll axis 978. When this occurs, the tie structure simultaneously tilts, to some extent, away from the center of curvature, which tends to cause the roll center 978 to shift outwardly somewhat relative to the center of a curve being negotiated, but not far enough to negate the inward tilting motion of the body 962. The advantage of the tie structure moving outwardly slightly during cornering is that during such movement, the roll center 978 does not serve as a roll center about which centrifugal forces act to tip the vehicle outwardly so that the rate of centrifugal force transfer through the vehicle is reduced. It will be appreciated that the relative outward tilt of the tie structure in relationship to the inward tilt of the body can be altered by controlling the various components of the vehicle suspension system, including the torsion load at the inward ends of the trailing links 968 and the load-carrying capacity and stiffness of the strut assemblies 972.

Vehicle 960 also provides the advantage of positive dynamic camber when cornering. In this regard, as shown in FIG. 14, the body 962 is tilted upwardly at the side thereof toward the outside of the curve while the tie structure is tilted somewhat downwardly relative to the outside of the curve, with the tilt of the tie structure being less than the tilt of the body due to the relative greater stiffness of the torsion load on arm assemblies 968 vis-à-vis the strut assemblies 976. The upward tilt of the body will tend to move the upper portion of the inside wheel inwardly into the curve as well as move the upper portion of the outside wheel inwardly relative to the curve. As a result, both the wheels of the vehicle tend to tilt inwardly relative to the curve providing positive dynamic camber, thereby improving the traction of the vehicle during cornering.

It will also be appreciated that by mounting the motor/engine 974 and corresponding drive train components on the tie structure, less plunge is required for the drive line interconnecting the motor/engine to the drive wheels, in relationship to the plunge required if the motor/engine were mounted on the body. As noted above, vehicle 960 is designed so that the tie structure 964 tilts outwardly to a lesser degree in cornering than does the body 962 tilt inwardly during cornering. Further, by mounting the motor/engine solely on the tie structure, it would be easier to adapt the present invention to existing vehicles.

Figure 17:
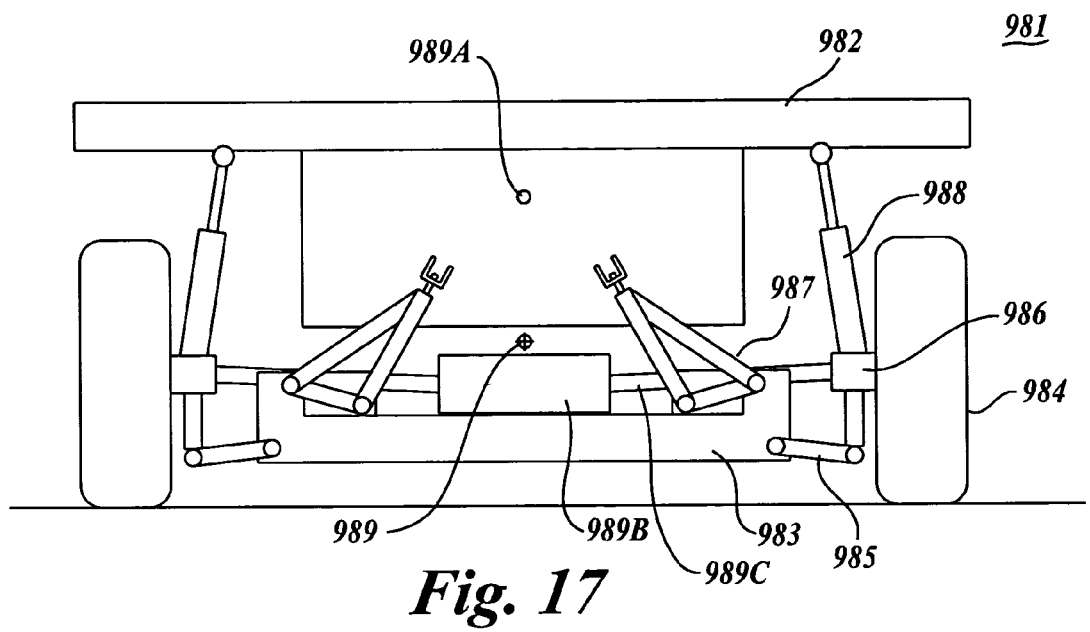
FIG. 17 is a front view of a further embodiment of the present invention.

FIG. 17 diagrammatically illustrates a further embodiment of the present invention wherein a vehicle 981 includes a body 982, mounted on an underlying tie structure 983, which is supported by wheel assemblies 984. As in the embodiment shown in FIGS. 14, 15 and 16, the tie structure 983 may extend substantially the entire length of the body 982, or may be composed of a forward section at the forward end of the vehicle and a rearward section at the rear end of the vehicle. As also in the vehicle 960 shown in FIGS. 14, 15 and 16, in the vehicle 981, the body 982 is capable of rolling relative to the tie structure.

Control arm assemblies 985 extend outwardly from the sides of the tie structure to the underside of hub assemblies 986 of wheel assemblies 984. The control arm assemblies 985 may be torsionally loaded relative to the tie structure 983 in a manner as described above.

Swing arm assemblies 987 extend upwardly from tie structure 983 to pivotally couple through the adjacent portions of body 982. The swing arm assemblies 987, as illustrated, may consist of A-arm assemblies similar to those shown in FIGS. 10, 11 and 12. In this regard, the swing arm assemblies 987 may be positioned to extend upwardly towards the longitudinal center of the body 982 and also the forward swing arm assemblies may extend towards the rear of the vehicle 981, whereas the rear swing arm assemblies may be oriented to slope forwardly towards the forward end of the vehicle 981. In this manner, the swing arm assemblies 987 may allow the body 982 to roll relative to the tie structure 983 and also permit the body to pitch relative to the tie structure in a manner somewhat similar to the vehicle 500 shown in FIGS. 10 and 11.

As in vehicle 960 shown in FIGS. 14, 15 and 16, the vehicle 981 may be constructed so that the stiffness of the control arm assemblies 985 is greater than the stiffness of the strut assemblies 988 used to support the body relative to the wheel assemblies 984. In this manner, when the vehicle is rounding a corner, the centrifugal force is applied thereto at the center of gravity 989, which is at an elevation below the roll center 989A of the vehicle, causing the body to tilt inwardly toward the center of the curve. When this occurs, the tie structure simultaneously tilts, to some extent, away from the center of the curve, thereby tending to cause the roll center 989A to shift outwardly somewhat relative to the center of the curve, but not far enough to negate the inward tilting motion of the body 982. As in other embodiments of the present invention, advantageously the slightly outward movement of the tie structure during cornering prevents the roll center 989A from serving as a roll center about which centrifugal forces act to tip the vehicle outwardly, so that the rate of centrifugal force transfer through the vehicle is reduced. This same advantage applies during vehicle pitching.

Moreover, vehicle 981 also provides the advantage of positive dynamic camber when cornering. In this regard, the vehicle 981 operates in a manner very similar to vehicle 960, described above, and thus such description will not be repeated here.

As a further matter, in vehicle 981, the motor/engine 989B and the corresponding drive train components 989C may be mounted on the tie structure 983 rather than being carried by the body or other parts of the vehicle. As a consequence, the drive train is required to accommodate less relative movement between the engine and the drive wheels than would be required if the motor/engine were mounted on the body.

Figure 18:
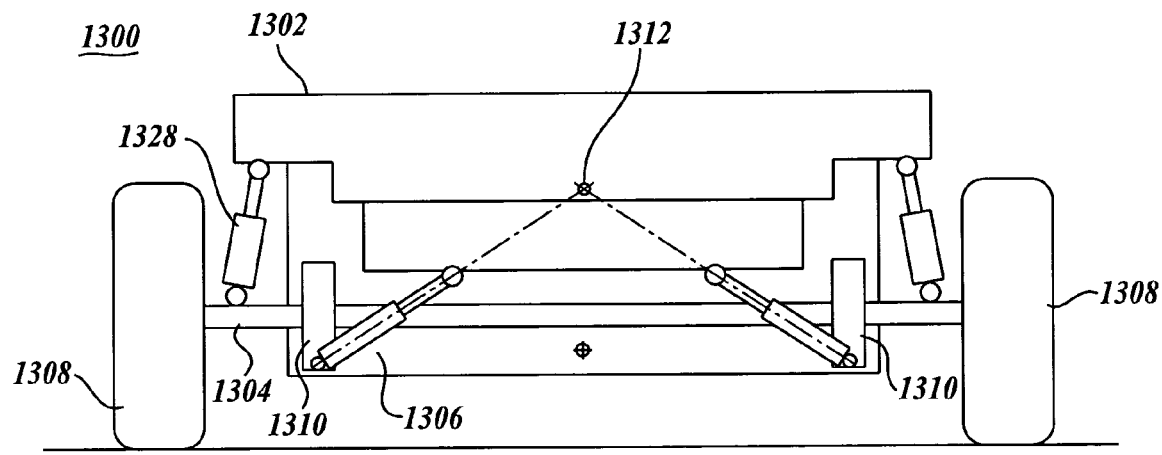
FIG. 18 is a front view of another embodiment of the present invention.

FIG. 18 illustrates another embodiment of the present invention wherein a vehicle 1300 includes a body 1302 supported above an underlying tie structure 1304 by pairs of diagonal control sliders 1306. The tie structure 1304 may be in the form of a solid axle extending transversely between wheel assemblies 1308. Also the lower end of the control sliders 1306 may be mounted below the tie structure/axle 1304 by use of brackets 1310 thereby to lower the pitch center and/or roll center 1312 as low as possible. As in other embodiments of the present invention, the pitch center and/or roll center is defined by the intersection of lines constituting extensions of the control sliders 1306.

Figure 19:
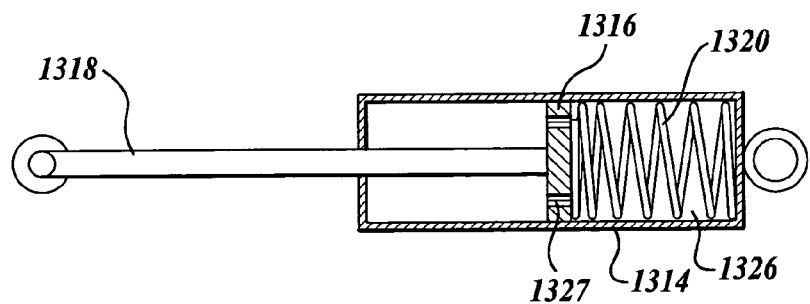
FIG. 19 is an enlarged fragmentary view of a portion of FIG. 18.
Figure 20:
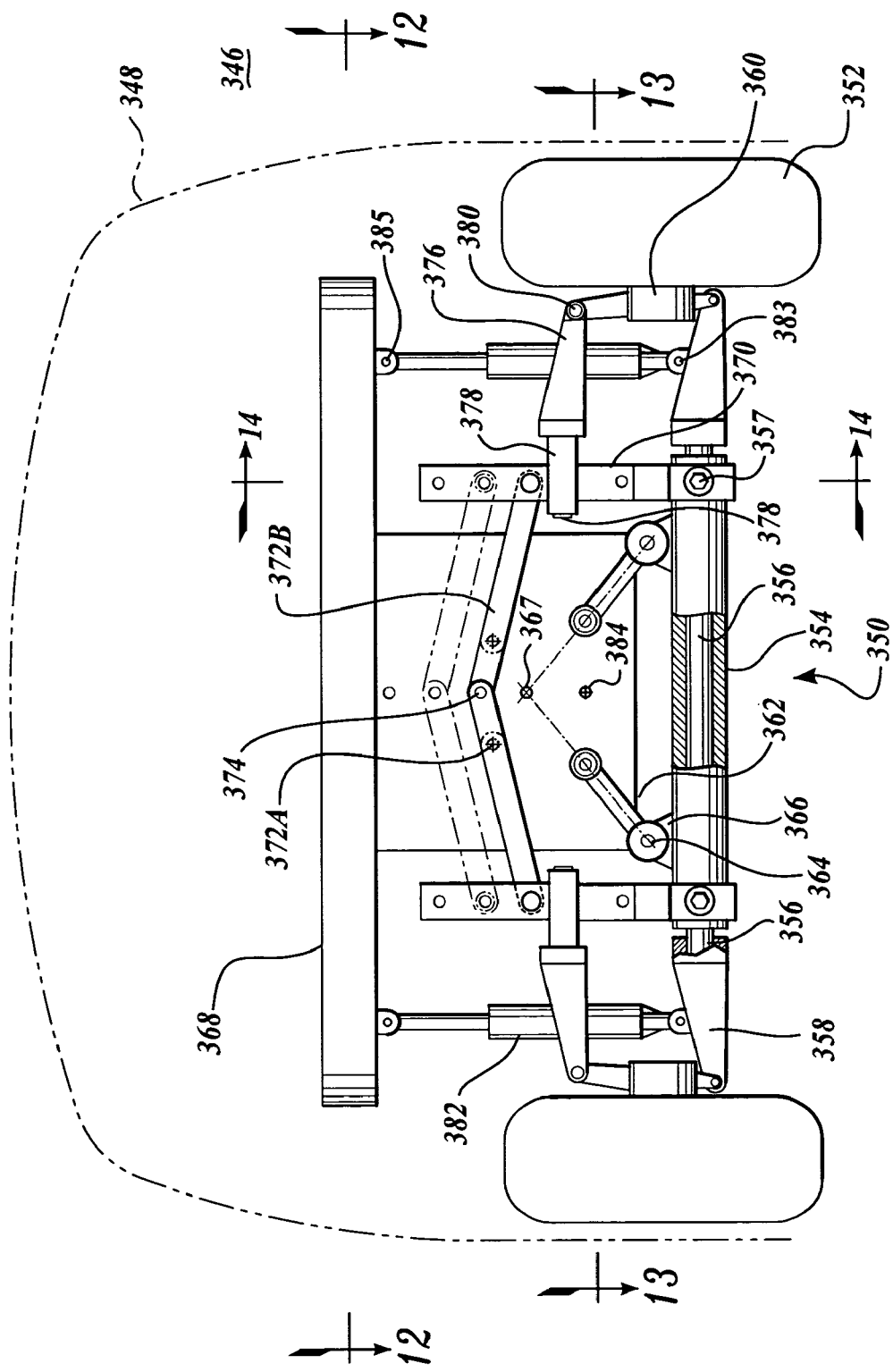
FIG. 20 is a front elevational view of a further embodiment of the present invention.
Figure 21:
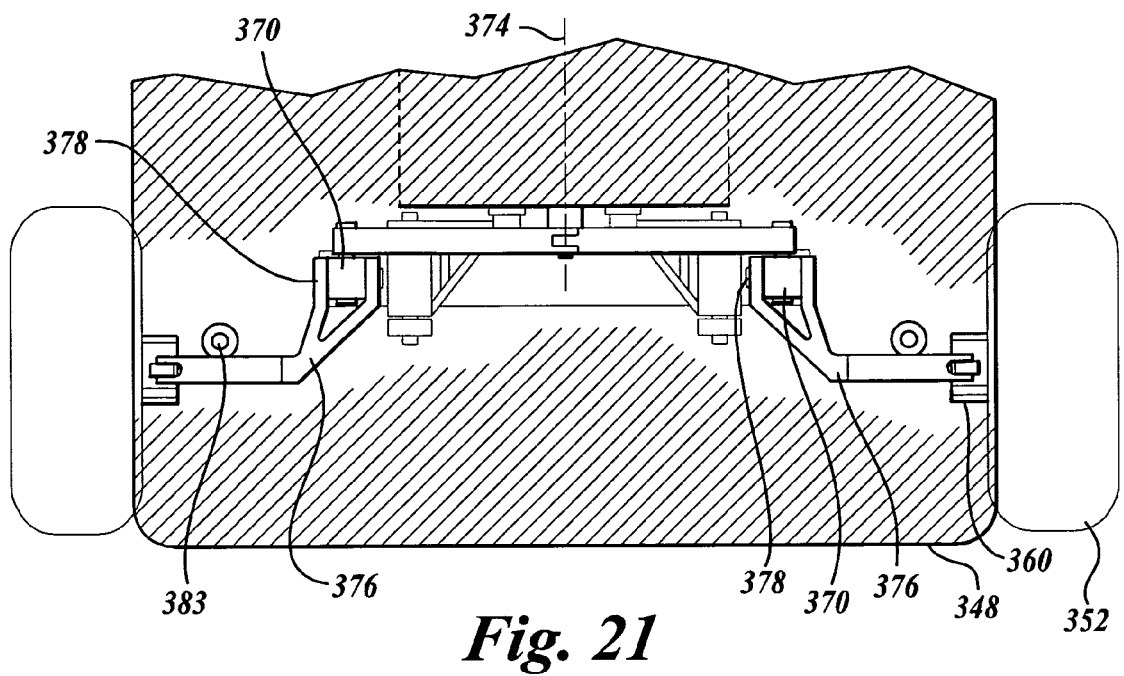
FIGS. 21 and 22 are top cross-sectional views of FIG. 20.
Figure 22:
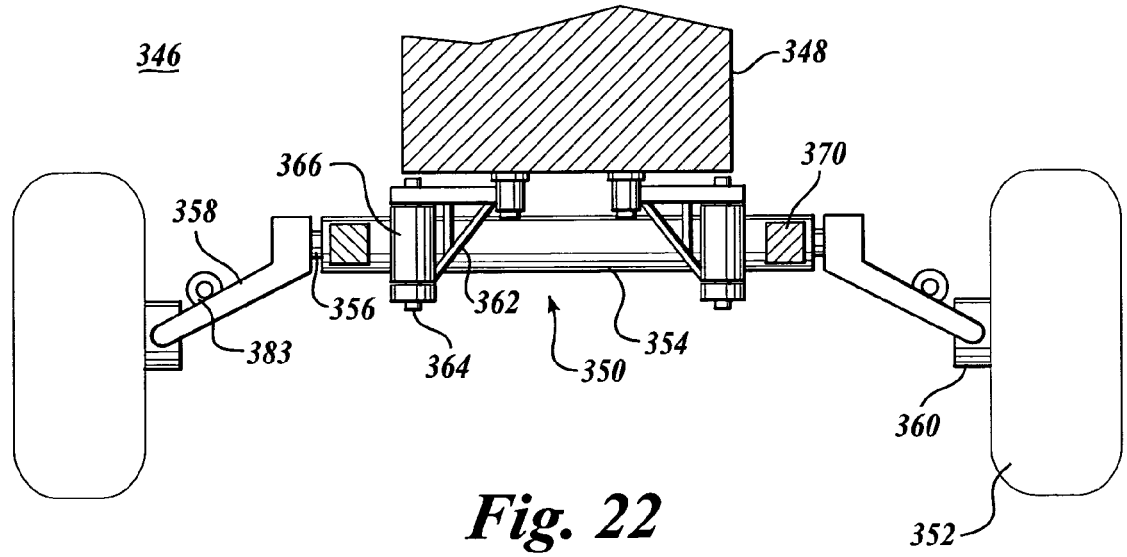
Figure 23:
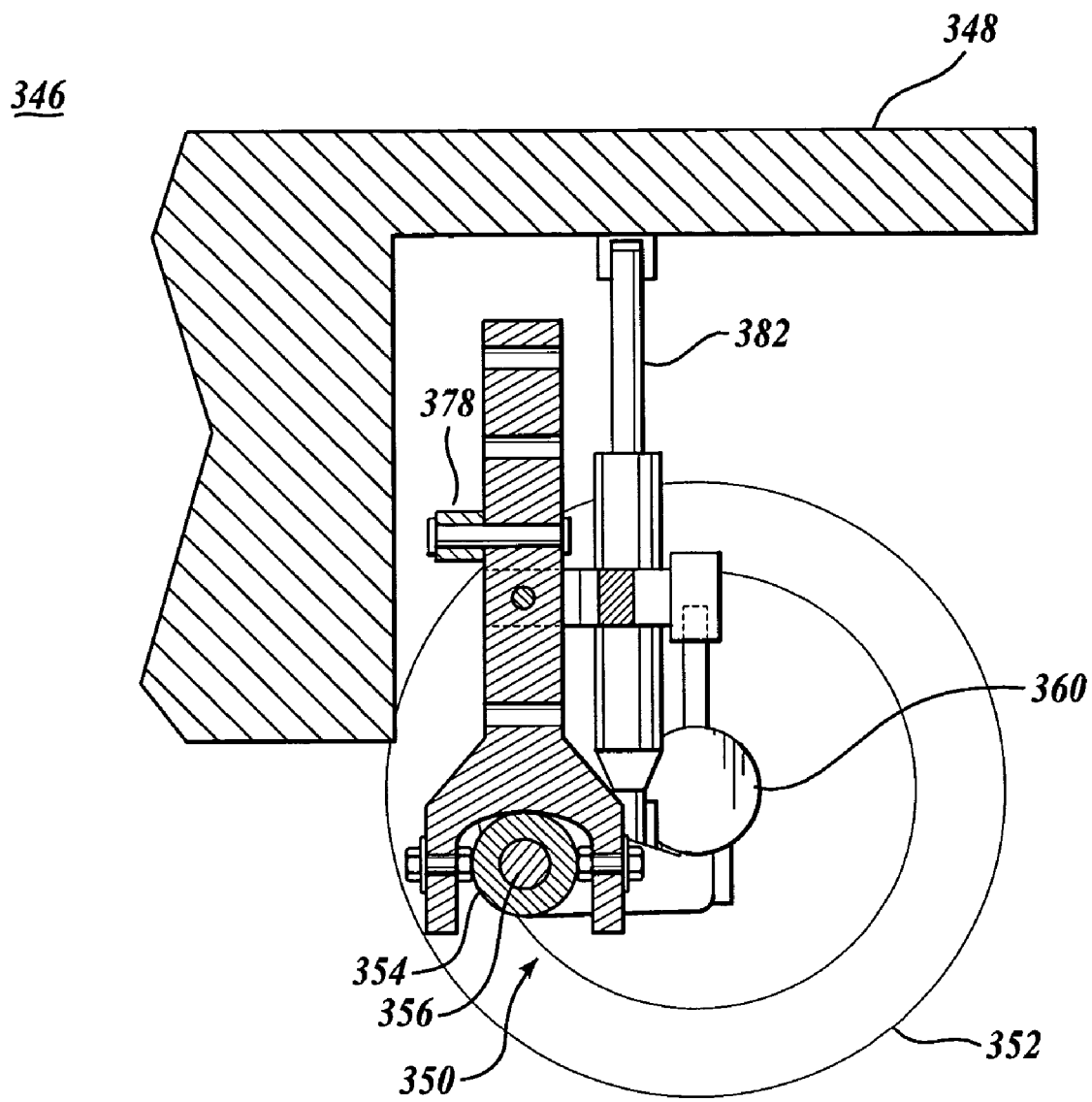
FIG. 23 is an enlarged, fragmentary, elevational view of FIG. 20.

The control sliders 1306 are illustrated in FIG. 19 as constituting an adjustable hydraulic or fluid spring-loaded actuator assembly having a cylinder portion 1314 housing a piston 1316 which is connected to a piston rod 1318 which extends outwardly from the cylinder. A relatively stiff spring 1320 or other type of resilient means loads the piston 1306 against stop 1322 thereby dividing the cylinder 1314 into first and second chambers 1324 and 1326. The chambers 1324 and 1326 may be filled with a fluid that passes from one side of piston 1316 through passages 1327 that limit the speed that the piston may move relative to the cylinder 1314, for instance if one control slider 1306 is unloaded due to its corresponding wheel 1308 hitting a pothole and at the same time the body rolling or pitching. Controlling the rate that the piston 1316 can move within cylinder 1314 will make sure that there will be resistance to such rolling or pitching action.

It will be appreciated that the control sliders 1307 and similar components described herein may be of other constructions. For example, the control sliders may be constructed with a fluid that can be changed in viscosity as desired very quickly if not almost instantaneously, so as to change the operational characteristics of the control sliders, struts or other similar components of the present invention. One example of such fluid construction includes magnetic properties that can be changed or controlled electrically or electronically.

Optionally, linear controllers 1328 may extend between the tie structure and the body to control the tilt and/or pitch of the body. The controllers have a spring rate that is "softer" than the control sliders 1306 to allow the tie structure to react to road bumps without transferring all of the "bumps" to the body. However, the function of the linear controllers 1328 may be carried out by the control sliders 1306. In this regard, the control sliders can be of variable spring rates, perhaps having a softer spring rate when accommodating road discontinuities but having a much stiffer spring rate when the body rolls during cornering or pitches during acceleration or hard braking. Sensors can be utilized on the vehicle to sense road bumps as well as the body roll during cornering and body pitching during braking and acceleration. In response thereto, the characteristics of the control slider 1306 are automatically adjusted so as to react to the particular external force being applied to the vehicle, whether road bumps or corner rolling or pitching due to braking or accelerating. It will be appreciated that by this construction a tie structure such as described above with respect to other embodiments of the present invention, for instance shown in FIG. 17, may not actually be required, thereby simplifying the construction of vehicles made in accordance with the present invention.

FIGS. 20, 21, 22 and 23 illustrate a further embodiment of the present invention, wherein vehicle 346 includes a body 348 mounted on an underlying tie structure 350 supported by wheel assemblies 352. The tie structure 350 includes a lower hollow transverse crossmember 354 having a torsion bar 356 extending therethrough. The outer ends of the torsion bar extend beyond crossmember 354 to rigidly couple to the rearward ends of forward leading arm assemblies 358. The opposite ends of the leading arm assemblies are pivotally coupled to the lower portions of hub assemblies 360 of a wheel assembly 352. The torsion bar 356 allows for controlled relative vertical movement between the tie structure 350 and the wheel assemblies 352, for instance when traveling over a bump or cornering.

The tie structure 350 is connected to the body 348 by a pair of lower swing arm assemblies 362. The swing arm assemblies may be of numerous, different constructions. For example, in FIGS. 20 and 21 the swing arm assemblies 362 are in the form of A-arms having their lower ends coupled to the tie structure crossmember 354 by a pivot pin 364 that is carried by pivot block 366 attached to the tie structure crossmember 354. The upper, opposite ends of the swing arms 362 are pinned to lower portions of a body structural member 368. It will be appreciated that the swing arms 362 keep the body 348 from moving longitudinally relative to the tie structure 350 while allowing the body to move laterally as well as pivot about a longitudinal axis relative to the tie structure 350. Also, the swing arm assemblies are oriented so that they are in alignment with the roll center 367 of the vehicle, which is at an elevation above the center of gravity 384 of the vehicle.

The tie structure 350 further includes upright posts 370 extending upwardly from the tie structure crossmember 354. The lower ends of the posts can be attached to the crossmember 354 by bolts 357 to enable the posts to pivot in the lateral direction above the bolts. The upper ends of the posts 370 are coupled to a central location on the body structural member 368 by a pair of link arms 372A and 372B. The outer ends of the link arms 372A and 372B are pinned to the posts 370 at selective locations along the height of the posts, with the particular location of such pin connection selected for adjusting the camber imposed on the vehicle 346. The center, inward ends of the link arms 372A and 372B are jointly pinned to the body structural member 368 to pivot about a longitudinal axis 374 of the vehicle. As an alternative, the link arms 372A and 372B may be shortened to be pinned to the body structure member 368 at laterally spaced apart locations (not shown).

The upper end portions of the posts 370 are supported by upper leading arms 376. The inward ends of the leading arms 376 are pinned to respective posts 370 by cross pins 378 extending through a transverse opening formed in the posts and through aligned openings of a yoke formed in the trailing arm 376. The outer, forward ends of the upper leading arms 376 are connected to wheel hub assemblies 360 by ball joints 380 in a well-known manner. It will be appreciated that from their connection to posts 370, the upper leading arms 376 extend laterally outwardly, forwardly and downwardly to their connection with corresponding hub assemblies 360.

The body 348 is also supported relative to the tie structure 350 by spring/shock absorber assemblies 382. The lower ends of the spring/shock absorber assemblies are connected to lower leading arms 358 by ball joints 383 in a conventional manner, and correspondingly the upper ends of the spring/shock absorber assemblies are connected to the body structural member 368 also by ball joints 385 in a conventional manner.

In operation, when vehicle 346 rounds a corner, a centrifugal force is applied thereto at the center of gravity 384 which is at an elevation below the elevation of the roll center 367. As such, the body 348 will tilt inwardly toward the center of curvature of the curve about axis 374 and compress the inside spring/shock absorber assemblies. When this occurs, the tie structure simultaneously tilts, to some extent, away from the center of curvature, which tends to cause the longitudinal axis 374 to shift outwardly of the center of curvature somewhat, but not far enough to negate the inward tilting of the body 348. The advantage of the tie structure moving outwardly slightly during cornering is that during such movement the rate of force transfer through the vehicle is less than if the tie structure did not tilt. During such tie structure movement, the longitudinal axis 374 does not serve as the roll reaction center about which the forces would be acting to tip the vehicle outwardly. It will be appreciated that the relative outward tilt of the tie structure in relation to the inward tilt of the body can be altered by controlling the stiffness of the various components of the vehicle's suspension system, including the torsion bar 356 and the spring/shock absorber assemblies 382.

Figure 24:
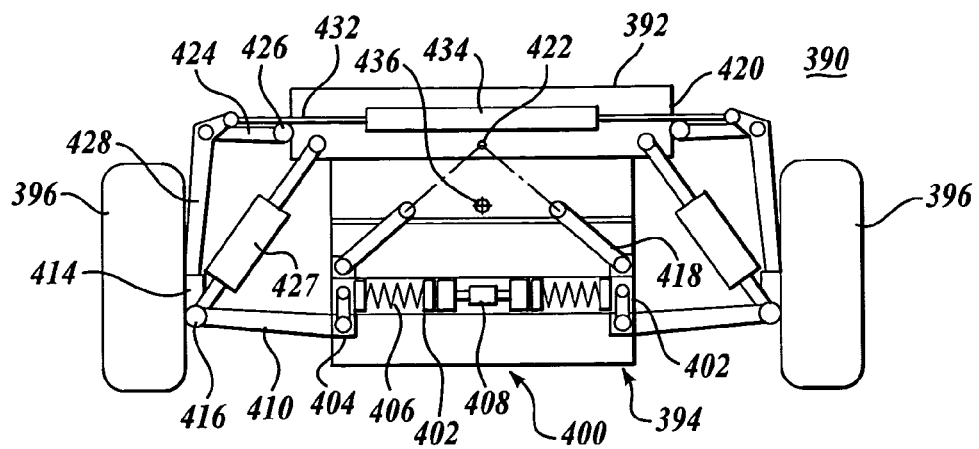
FIGS. 24, 25 and 26 illustrate a further embodiment of the present inventions in front elevational view, top view and fragmentary side elevation view.
Figure 25:
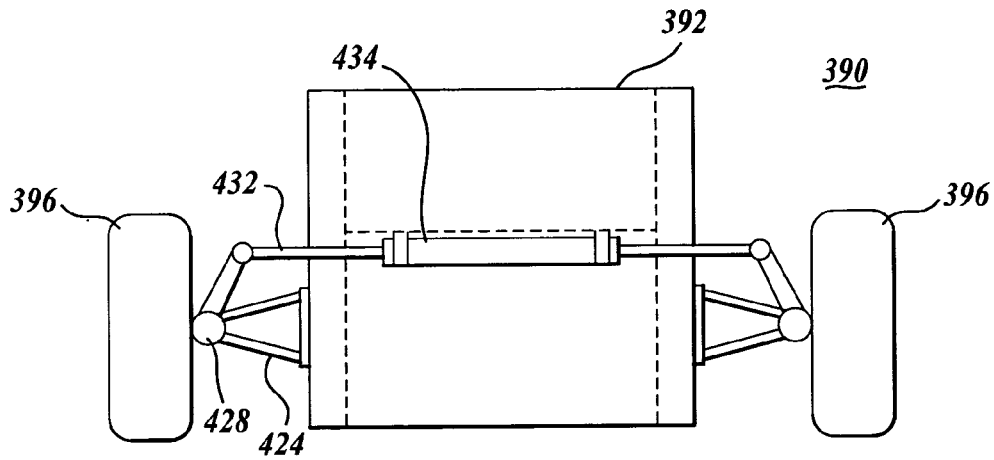
Figure 26:
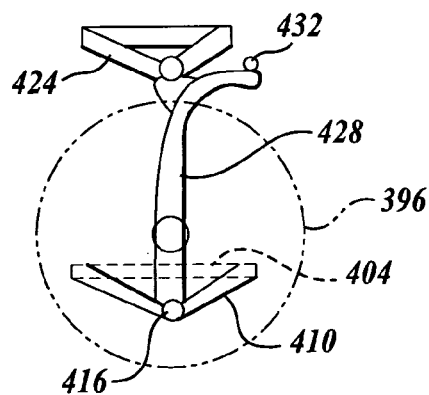

FIGS. 24, 25 and 26 diagrammatically disclose a further embodiment of the present invention wherein a vehicle 390 includes body 392 mounted on/carried by a tie structure 394, which in turn is carried by wheel assemblies 396. The tie structure includes a transverse crossmember subassembly 400 composed in part of a cross tube 402. The inward base portion 404 of a lower A-arm assembly 410 engages within each end portion of the cross tube 402. The base portion 404 is biased in the direction towards the adjacent outward end of the cross tube 402 by a compression spring 406. The inward end of the compression spring presses against a piston 408 which is loaded toward the outer end of the cross tube 402 by any convenient means, for example by hydraulic pressure, linear actuator, etc. The opposite, outward end of the A-arm assembly 410 is coupled to a lower portion of wheel hub assembly 414 through the use of a ball joint 416.

The body 392 is connected to the underlying tie structure 394 by diagonally oriented link arms 418 that are pinned at their lower ends to outward end portions of the cross tube 402. The upper, inward portions of the link arms are pinned to lower portions of body structural member 420. The link arms 418 are oriented so that if extended in the inwardly direction they would intersect at point 422 along the transverse center line of the vehicle 390 corresponding to the roll center of the body. The body 392 is also supported by upper arm assemblies 424 having their lower ends carried by hub assemblies 414 and their upper ends coupled to the body structural member 420 by ball joints 426. Body springs 427 are connected between hub assembly 414 and body 392.

The hub assemblies 414 may be steered by steering arms 428 that are coupled to the hub assemblies. The upper ends of the steering arms 428 extend rearwardly from the hub assemblies and are connected to the outer ends of a rod 432 extending outwardly from a center steering assembly 434 mounted at the upper portion of body structural member 420.

It will be appreciated that the vehicle 390, when negotiated around a corner, responds quite similarly to vehicle 348 shown in FIGS. 20-23. In this regard, when rounding a corner a centrifugal force is laterally applied to the vehicle 390 at the center of gravity 436 which is at an elevation below intersection point 422 of the diagonal links 418, causing the body to tilt about such intersection point inwardly toward the center of the curve to compress the inside springs. Correspondingly, the centrifugal force on the tie structure 394 tends to cause the tie structure to tilt somewhat in the outwardly direction relative to the center of the curve, which in turn tends to cause the crossmember subassembly 400 to tilt outwardly relative to the curve. During such movement of the tie structure, the intersection point 422 does not serve as a roll reaction center. The rate of centrifugal force transfer through the vehicle 390 is reduced relative to if the tie structure were not capable of such movement.

As a further matter, it will be appreciated that the nominal location of the lower A-arms 410 can be varied relative to cross tube 402, thereby to alter the ride height of the vehicle. Also, the nominal location of the lower A-arms 410 relative to the cross tube 402 can be used to vary the relative loads carried by the cross tube and the body springs 427.

The embodiments of the present invention shown in FIGS. 24, 25 and 26 may be modified to provide an "active" suspension system. In this regard, the cross tube 402 and compression spring 406 may be replaced with a linear actuator, for example a hydraulic cylinder assembly (not shown) mounted transversely on tie structure 394. Also, body springs 427 may be replaced with hydraulically actuated suspension cylinders positioned at locations corresponding to the body springs 427. Such suspension cylinders may be controllable to increase or decrease their lengths, thereby to tilt the body 392 as desired, for instance when cornering. A control system (not shown) may be provided for sensing the direction, speed and acceleration of the vehicle 390 in controlling the roll of the vehicle as well as the lateral movement of the tie structure 394 in response to driving conditions, including cornering. For instance, when cornering, the hydraulic cylinders that replace body springs 427, can be controlled to tilt the body inwardly into the curve rather than outwardly in the manner of a typical vehicle. Moreover, also when cornering, the linear actuators that replace the springs 402 may be activated to allow the tie structure to move somewhat laterally outwardly to prevent, at least initially, the roll center 422 of the vehicle from being the point through which the roll couple is generated, tending to tilt the vehicle about its outer wheels 396.

Figure 27:
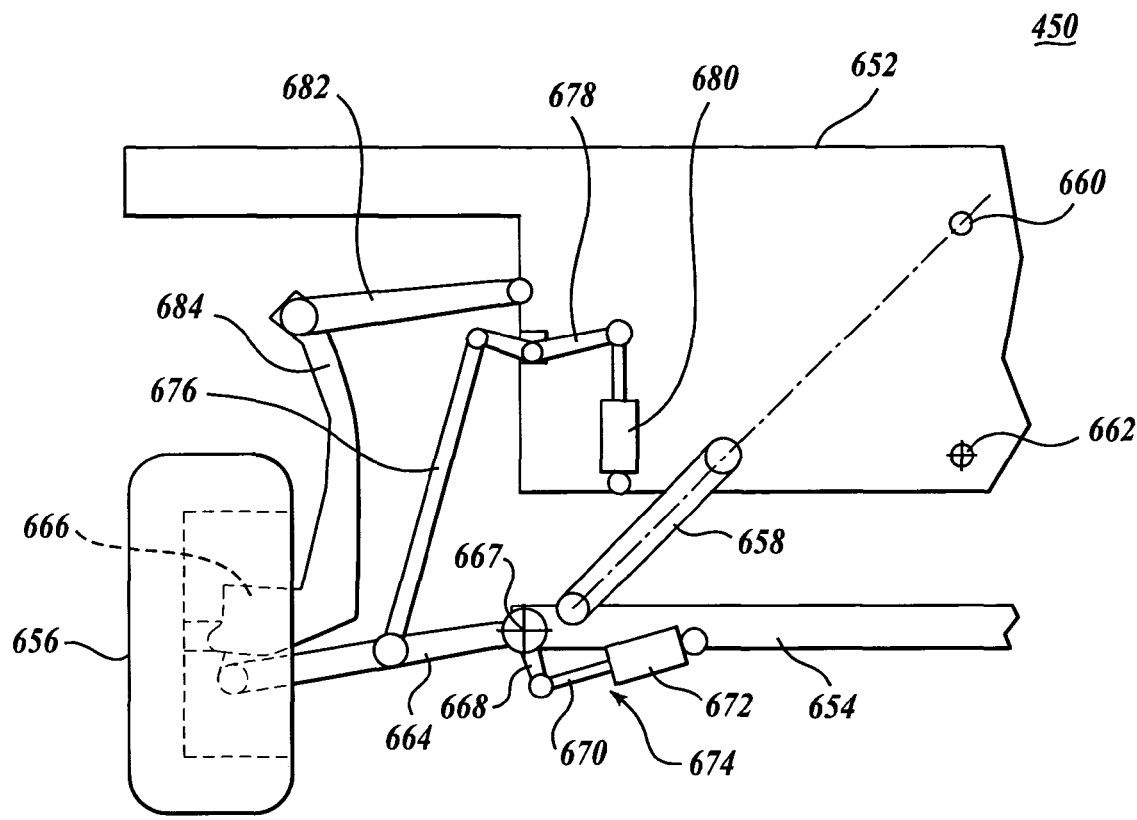
FIG. 27 is a front elevational view of a further embodiment of the present invention.

FIG. 27 schematically discloses a further embodiment of the present invention, wherein a vehicle 650 includes the body portion 652 supported on an underlying tie structure 654 extending across the vehicle between wheel assemblies 656. The tie structure 654 may be of various constructions, including those constructions described herein. The tie structure 654 is interconnected to body 654 by diagonally oriented link arms 658 that are pinned at the lower ends to a tie structure 654 and pinned at their upward, inward ends to the body 652. The link arms 658 are oriented so that if extended in the inward direction they would intersect each other at a point 660 along the transverse centerline of the vehicle 650 corresponding to the roll center of the vehicle, which is located above the roll center of gravity of vehicle 662.

The tie structure 654 is interconnected to the wheel assemblies 656 by trailing arms 664 which are pinned at their outward ends to wheel hub assembly 666 and also pinned at their inward ends to lateral portions of the tie structure. The nominal orientation of the trailing arm 664, as well as the resistance to the pivoting of the trailing arm about its inward end portion, is accomplished by a crank arm 668 that is fixedly attached to the inward end portion of the trailing arm 664 so as to rotate about the inward connection point 667 of the trailing arm 664. The distal end of the crank arm 668 is coupled to the distal end of a rod 670 projecting from the cylinder portion 672 of a double-acting linear control member 674.

A push rod 676 extends upwardly from a pivot connection 677 on a trailing arm 664 to pivotally interconnect with the laterally outward end of a crank arm 678 which is pivotally attached to a lateral portion of the body 652. The opposite end of the crank arm 678 is coupled to a relatively soft linear control member 680, with the opposite end of the linear control member coupled to a location on the body 652.

The body 652 is also supported by an upper trailing arm 682 pinned at its inward end to the body 652 and pinned at its outward end to an upward strut extending upwardly from the wheel hub assembly 666.

It will be appreciated that vehicle 650 operates similarly to other vehicles of the present invention as illustrated and described herein, including vehicle 390 illustrated in FIGS. 24-26. In this regard, during cornering, the centrifugal force on the vehicle 650 acts through the center of gravity 662, which is located below the roll center 660 of the vehicle, thereby causing the body 652 to tilt inwardly into the curve being negotiated. At the same time, the tie structure 654 tilts downwardly in the laterally outwardly direction, thereby causing a similar movement of the body and roll center 660 so that the roll center does not serve as the reaction center of the vehicle, thereby reducing the jacking effect acting on the vehicle.

Figure 28:
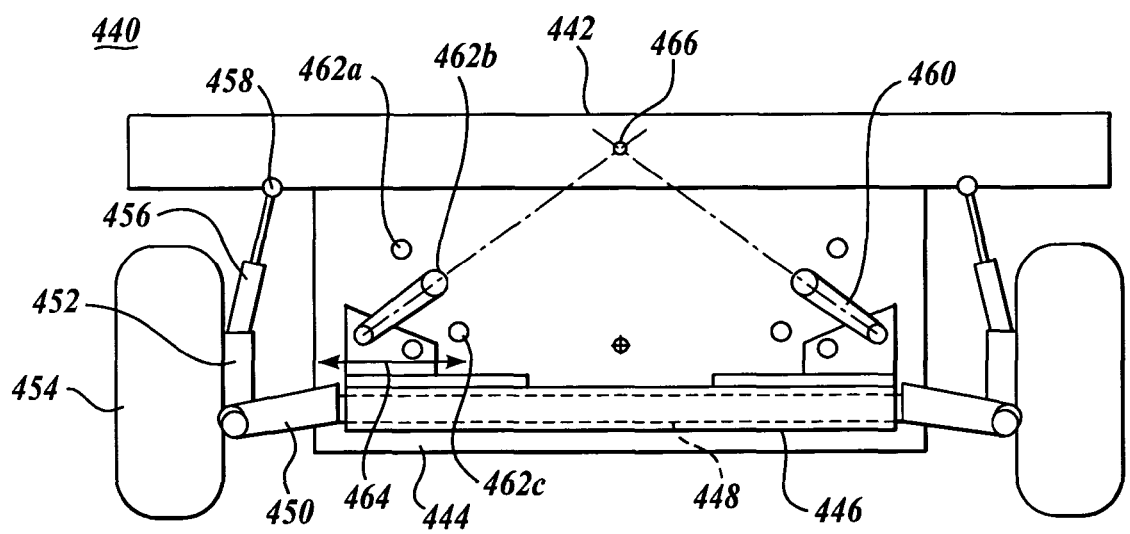
FIG. 28 is another front elevational view of a further embodiment of the present invention.

A further embodiment of the present invention is schematically illustrated in FIG. 28 which includes certain aspects of the present invention shown in FIGS. 20-23. In this regard, the vehicle 440 includes a body having a structural portion 442 supported on an underlying tie structure 444. The tie structure includes a cross tube 446 extending laterally across the vehicle to house a torsion bar 448 extending the full length of the cross tube and extending outwardly therefrom. The end portions of the torsion bar are connected to the inward end portions of leading arm assemblies 450, with the outward ends of the leading arms coupled to hub assemblies 452 of wheel assemblies 454. As discussed above, including with respect to FIGS. 20-23, the torsion bar 440 serves to support the tie structure relative to the wheel assemblies 454 and allow relative vertical movement between the tie structure and the wheel assemblies. Spring/shock absorber assemblies 456 extend upwardly from hub assemblies 452 to interconnect with overhanging portions of the body structural member 442 through the use of ball joints 458.

The body structural portion 442 is interconnected with the tie structure 444 by diagonal link arms 460. The upper ends of the link arms are pinned to the body structural portion 442 at one of a plurality of selected locations 462A, 462B and 462C. The lower, outward ends of the link arms may be pinned at a number of different locations on slide brackets 464 carried by, and may be adapted to slide relative to, cross tube 446 by engaging within slideways 465 extending along the upper portion of the tube 446. Any convenient means can be provided to enable the brackets 464 to be moved along the cross tube 446. In this regard, the brackets 464 may be moved while the vehicle is in operation by a powered system so as to change the location of the roll center of the vehicle in response to road or driving conditions. It also will be appreciated that by changing the position of the upper and lower ends of the link arms 460, the elevation of the roll center 466 of the vehicle may be altered as well as the camber of the vehicle. Moreover, the tie structure 444 may be adapted to be retrofit in different vehicles.

In operation, the vehicle 440 operates in a manner similar to vehicles 346 and 390 discussed above and results in substantially the same advantages provided by such vehicles, including the tilting of the vehicle body inwardly while cornering instead of outwardly in the manner of a traditional vehicle.

Figure 29:
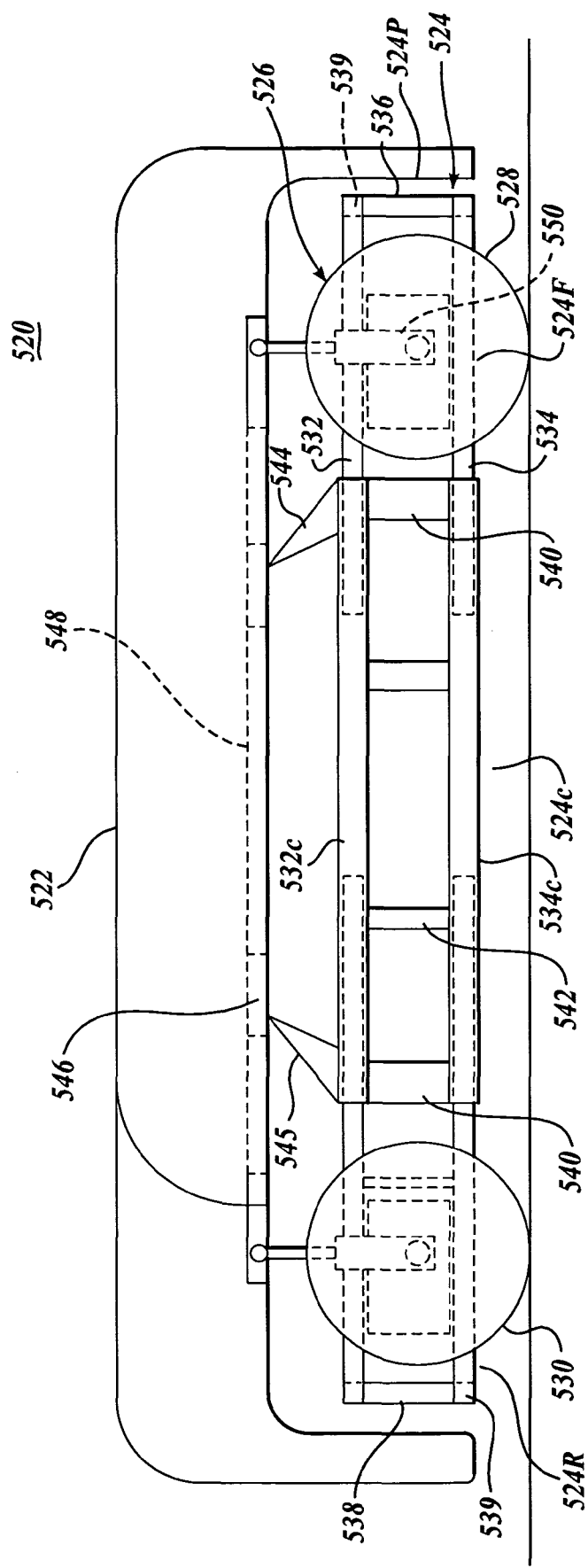
FIG. 29 is a side elevational view of a further embodiment of the present invention.

A further embodiment of the present invention is illustrated in FIG. 29, wherein vehicle 520 may be constructed somewhat similarly to vehicles 50 and 150, described above, but with the following differences. Vehicle 520 includes a body 522 supported by and carried above an underlying tie structure 524 which in turn is supported by wheel assemblies 526. As in the tie structure 60 shown in FIGS. 1 and 2, the tie structure 524 may be generally in the form of a rectangular box-type structure that extends longitudinally along the lower elevations of the vehicle 520 between the hub carriers of the forward and rearward wheels 528 and 530. However, the tie structure 524 differs from the tie structure 60 in that the tie structure 524 includes a forward section 524F and a rearward section 524R that telescopically engage with center section 524C. Both the forward section 524F and rearward section 524R may include top and bottom side members 532 and 534 extending along both sides of the vehicle 520 and spaced vertically apart by forward vertical members 536 and rearward vertical members 538. The top side members 532 and bottom side members 534 are transversely interconnected by crossmembers 539 that may be similar to crossmembers 108 and 110 of FIGS. 1 and 2. Also, as in FIGS. 1 and 2, a plurality of intermediate crossmembers (not shown) such as crossmembers 112 shown in FIGS. 1 and 2 may also be utilized for reinforcing purposes. Further, additional reinforcing members (not shown) may be employed in the construction of the forward tie structure section 24F and rearward tie structure section 24R, as needed. The forward tie structure section 524F and rearward tie structure 524R may be constructed from any appropriate materials, such as tubing or channel stock.

The tie structure center section 524C may be constructed somewhat similarly to the forward tie structure section 524F and rearward tie structure section 524R in that such center tie structure section includes top side members 532C and bottom side members 534C that are vertically interconnected by vertical end members 540 and vertical intermediate members 542. Also, appropriate crossmembers (not shown) may be utilized to transversely interconnect the top side members 532C and bottom side members 534C. The top side members 532C and bottom side members 534C may be tubular or otherwise hollow to telescopically receive the rearward end portions of the top side members 532 and bottom side members 534 of the tie structure forward section 524F as well as the forward end portions of the top side members 532 and bottom side members 534 of the tie structure rearward section 524R. A friction fit, shear pins or other well-known means may be utilized to retain a nominal engagement between the tie structure center section 524C and the forward section 524F and rearward section 524R.

The body 522 may be supported above tie structure 524 by a forward set of pivot arm assemblies 544 mounted on the tie structure center section 534C at laterally spaced-apart locations as well as rearward pivot arm assemblies 545 also mounted on the tie structure center section 524C at laterally spaced-apart locations. Such pivot arm assemblies may be similar in construction to pivot arm assemblies 302, discussed above. The upper ends of the pivot arm assemblies 544 and 545 may be incorporated into a slider 546 that slidably engages within a slideway 548 incorporated into the lower portion of body 522. Slider 546 and slideway 548 may be of various well-known constructions, some of which have been described above.

Spring/shock absorber assemblies 550 extend upwardly from either the hub carriers of wheel assemblies 528 and 530 or from the tie structure 524 to body 522. Such spring/shock absorber assemblies 550 may be similar to spring/shock absorber assemblies described above, including part numbers 70, 80, 232 and 234. The spring/shock absorber assemblies 550 may be designed to carry a select proportion of the weight of the body 522 relative to the portion of such body weight carried by the pivot arm assemblies 544 and 545.

The vehicle 520 may include a drive system 552 preferably located at the center portion of the vehicle, though the drive system could also be positioned at the front or rear of the vehicle, if desired. The drive system may include an internal combustion engine, an electric motor, or other type of power plant. The drive system may also utilize a transmission and drive train for transmitting the drive torque from the transmission to the wheels to be driven. The drive train can be designed to accommodate the relative movement between the tie structure center section and the tie structure forward 524F and/or rearward 524R sections.

Rather than utilizing drive system 552, the vehicle 50 may be powered by electric motors incorporated into the hub assemblies of the forward and rearward wheels. Such motors may be similar to those described above with respect to FIGS. 1 and 2. An example of such electric motors is described in U.S. Pat. No. 5,438,882.

In operation, if the vehicle 520 is involved in an accident or impact load is otherwise imposed on the tie structure 524, for instance at the forward end of the vehicle, the tie structure forward section 524F may telescopically engage further within tie structure center section 524C to absorb some of the impact energy, thereby reducing the effect of the crash on vehicle passengers as well as reducing the potential damage to the vehicle from the crash. As the tie structure forward section 524F telescopes within center section 524C, the body 522 can move rearwardly relative to the tie structure center section 524C by virtue of the movement of the slides 546 within slideway 548. After the crash, the forward tie structure section 524F may be extended relative to tie structure section 524C to resume its nominal position without extensive effort. Also, during a crash, the body 522 can move away from the point of impact on the vehicle.

It is to be appreciated that vehicle 520 can be constructed with the body 522 composed of telescoping sections to help absorb some of the energy of a crash in much the same way as the structure discussed above. Also, by this construction, the body and tie structure can be designed to telescope in unison so that relative movement is not needed between the body and tie structure at the locations that they are joined together.

Figure 30:
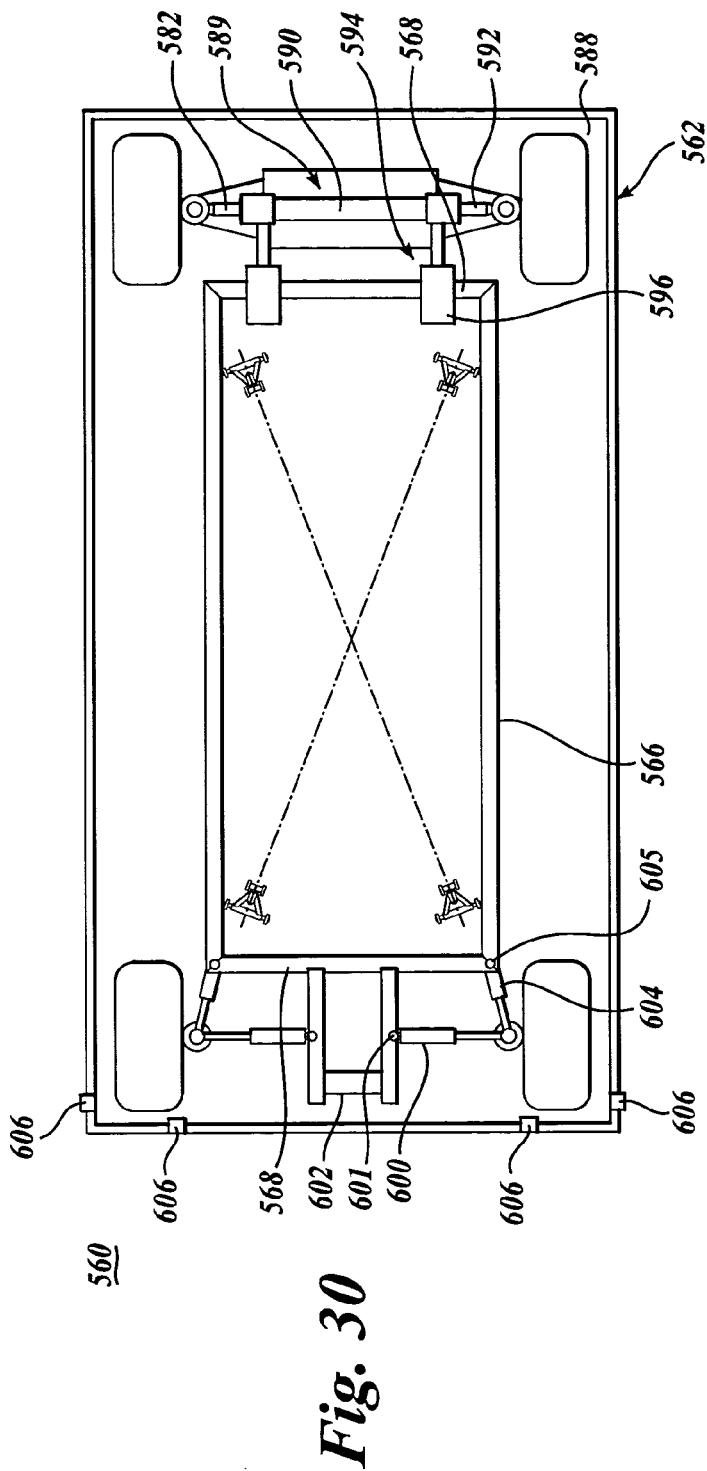
FIG. 30 is a top view of another embodiment of the present invention.
Figure 31:
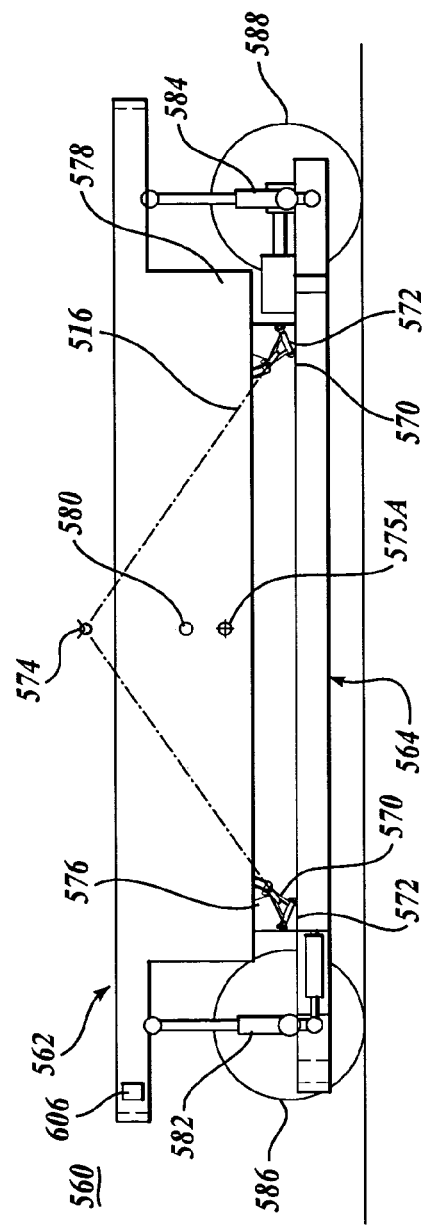
FIG. 31 is a side elevational view of FIG. 30.

FIGS. 30 and 31 schematically illustrate a vehicle 560 comprising a further embodiment of the present invention. The vehicle 560 includes a body 562 supported by an underlying tie structure 564 which may be in the form of a generally rectangular structure having longitudinal side members 566 and transverse end members 568. The body 562 may be supported above the tie structure 564 by A-arm assemblies 570 having base portion 572 pivotally mounted on the tie structure and angled so that a line extending perpendicularly to the base portion and through the apex 576 of the arm assemblies will intersect at the pitch center 574 and roll center 575 of the vehicle, which may be at different elevations, but both of which are above the center of gravity 580 of the vehicle. The apex 576 of the arm assemblies may be coupled to the body 562 about transverse axis 578 in a manner similar to the connection of the A-arm assembly 302 to body 52C, shown in FIG. 12. In this manner the intersection of axis 578 from the forward and rearward A-arm assemblies 570 intersect at the roll center 580 of the vehicle. As will be appreciated, the A-arm assemblies 570 may be constructed similarly to A-arm assemblies 302 described above.

The body 562 is also supported by forward and rearward sliding pillars 582 and 584 extending upwardly from hub assemblies of forward wheel assemblies 586 and rearward hub assemblies of rear wheel assemblies 588. The sliding pillars may include integral springs (not shown) to allow relative upright motion between the wheel hub assemblies and the body, in a well-known manner.

The tie structure 564 is adapted to move longitudinally and transversely relative to the wheel assemblies. At the rear of the vehicle a sliding axle assembly 589 allows transverse movement between the rear portion of the tie structure and the rear wheel assemblies 588. The axle assembly 589 includes a central tube structure 590 for receiving telescoping axle stub shafts 592 therein. Springs or other means may be used to restrict the relative movement between the axle stub shafts 592 and the tube structure 590. The outward end portions of the axle stub shafts are connected to the rear wheel hub assemblies of wheel assemblies 588. Longitudinal slide assemblies 594 allow for relative longitudinal motion between the tie structure 564 and the rear axle assembly 589. In this regard, the longitudinal slide assemblies include an outer tubular member 596 supported by the tie structure transverse end member 568 for receiving a slide shaft 598 extending transversely from the tube structure 590. Again, springs or other means may be utilized to limit the relative movement between the slide shaft 598 and its corresponding tube 596.

The structure at the forward end of the vehicle 560 is similar to that just described with respect to the rear end of the vehicle. In this regard, transverse slide assemblies 600 extend transversely outwardly from a king pin 601 mounted on a central forward subframe assembly 602 that extends forwardly from tie structure transverse member 568. The outward end of the slide assembly 600 is coupled to a lower portion of sliding pillar 582.

Generally longitudinally directed slide assembly 604 extends forwardly from a king pin 606 mounted at the corner portions of the tie structure 568 to also couple with the lower portion of sliding pillar 582. The king pins 601 and 606 allow the slide assemblies 600 and 604 to pivot about a vertical axis, but restrain the slide assemblies to move in a vertical direction.

The slide assemblies 600 and 604 may be actively controlled to allow relative longitudinal and transverse motion between the forward end of the tie structure and the forward wheel assemblies 586 and to control the nominal orientation of the front wheels 586. In this regard, the slide assemblies may be in the form of hydraulic linear actuators or electrical linear actuators or similar structures. Also, sensors 606 may be used to sense the orientation of the wheels 586 so as to maintain the desired alignment of the wheels. Such sensors are known in the art.

Figure 32:
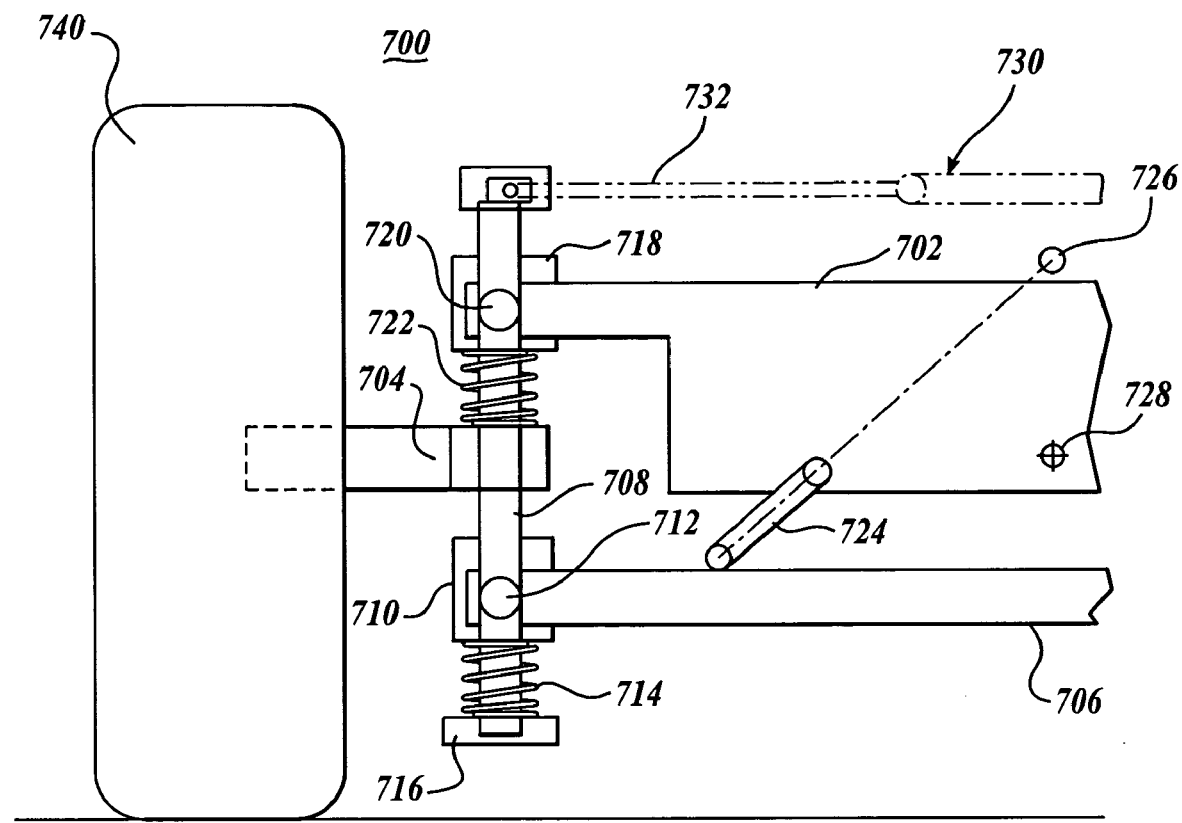
FIG. 32 is a partial front elevational view of a further embodiment to the present invention.
Figure 33:
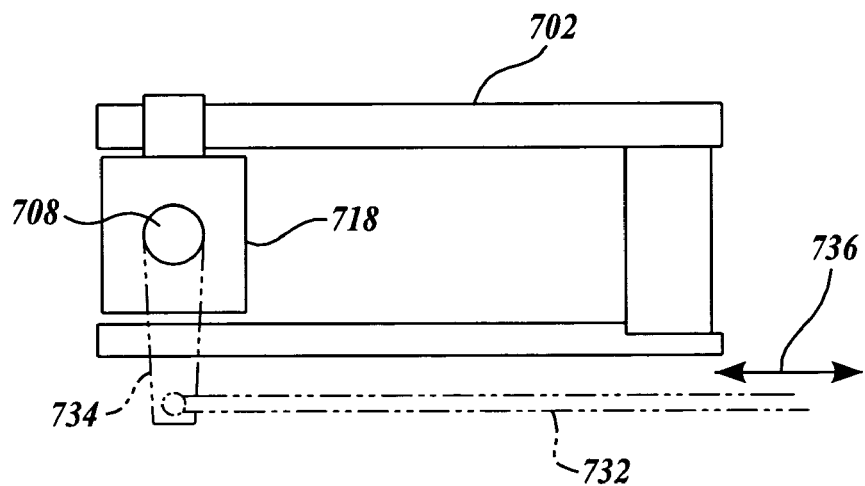
FIG. 33 is a top elevational view of a portion of FIG. 32.

FIGS. 32 and 33 illustrate vehicle 700, wherein the hub carrier 704 serves as an interconnection between the body 702 and the tie structure 706. This interconnection is accomplished by utilizing a slide rod or pillar 708 that is fixed to hub carrier 704 in an upright orientation. The tie structure 706 is coupled to a slide collar 710 that closely engages over the slide pillar 708 through the use of a pivot joint or similar means 712 to allow relative angular movement between the tie structure and the collar 710. A relatively stiff lower spring 714 is interposed between the bottom of the slide collar 710 and a stop 716 affixed to the lower end of the slide pillar 708.

A body 702 is connected to an upper slide collar 718 that closely and slidably engages over the upper portion of the slide pillar 708 through the use of a ball joint 720 or similar means, thereby to enable the body to pivot relative to the slide collar springs 722, that are relatively softer than springs 714 and are interposed between the underside of the upper slide collars 718 and the hub carrier 704 to provide spring suspension for the body.

In addition, swing arms 724 may be interposed between the tie structure 706 and the body 702 to restrict longitudinal relative movement between the body and the tie structure, as well as carrying part of the weight of the body on the tie structure in a manner similar to several of the embodiments of the present invention described above. It will be appreciated that the interconnection of lines extending upwardly from the diagonal swing arms define the roll center 726 of the body which is elevationally above the center of gravity 728 of the vehicle. As such, in the manner of the other vehicles described above, during cornering body 702 will tilt inwardly toward the center of curvature of the curve rather than outwardly in the manner of a traditional vehicle. It is to be understood that the swing arms 724 may be replaced with alternative structures, for example A-arms.

The vehicle 700 may include a steering system composed of rack and pinion assembly 730 having a tie rod 732 extending outwardly therefrom which is coupled to a steering arm 734 extending transversely from the upper end of slide pillar 708, see FIG. 33. As will be appreciated, as the steering rod 732 is moved in the direction of arrow 736, the hub carrier 704 and its associated wheel assembly 740 are caused to turn about slide pillar 708.

It will be appreciated that the slide pillar 708, slide structure 710, ball joint 712, spring 714, spring 722, ball joint 720, upper slide collar 718, and other related components, might be reduced in size so as to be able to fit within a diameter of the rim of a wheel 740. In addition to other advantages, this would reduce the bending load that hub carrier 740 would have to carry. However, such structure may limit the amount of travel of springs 714 and 722.

Another advantage of this embodiment is the achievement of positive dynamic camber. See the discussion above regarding FIGS. 20-23. Positive dynamic camber is achieved because during cornering the tie structure 706 tilts outwardly relative to the curve while the body 702 tilts inwardly into the curve to a greater extent than the outward tilt of the tie structure. As a result of such tilting of the tie structure and body, and the interconnection of the body and side rod at ball joint 720 above the roll center, the side rods tilt inwardly into the curve while providing positive dynamic camber. As explained above, this improves the traction of the vehicle during turning and cornering.

Figure 34:
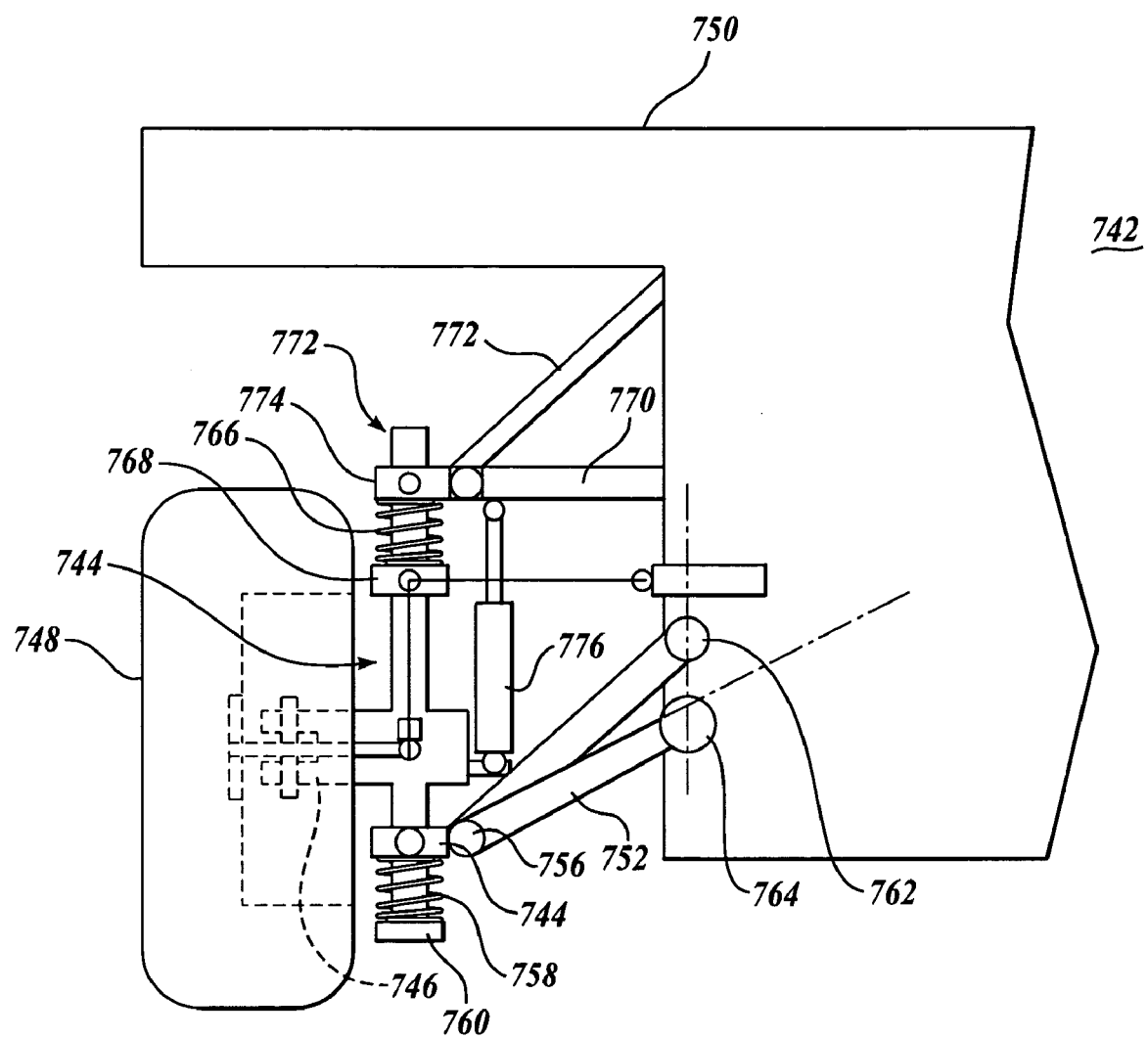
FIG. 34 is a fragmentary front elevational view of a further embodiment of the present invention.

FIG. 34 illustrates another vehicle 742 that utilizes another sliding pillar arrangement. The sliding pillar 744 may be integrally constructed with hub carrier 746 to which the vehicle wheel 748 is attached. The vehicle body 750 is supported in part by the lower A-arm assembly 752 that is coupled to a slide collar 754 that closely engages a lower portion of the pillar 744 through the use of a pivot joint 756 or similar means to allow relative angular movement between the A-arm 752 and the collar 754. Relatively stiff spring 758 is interposed between the bottom of slide collar 754 and a stop 760 affixed to the lower end of the slide pillar 744. The opposite ends of the A-arm assembly 752 are coupled to the lower portion of body 750 at pivot joints 762 and 764 which allow relative angular movement between the A-arm assembly and the body.

The upper portion of body 750 is supported by springs 766 that are relatively softer than springs 758. Such springs engage over the upper portion of sliding pillar 744, with a lower end of the springs supported by a collar stop 768 engaged over a sliding pillar 744. The upper end of the softer upper spring 766 presses against the underside of the horizontal arm 770 that extends horizontally outwardly, and is rigidly attached to body 750. A diagonal brace 772 extends upwardly and inwardly from an outer, distal portion of arm 770 to intersect with body 750. The outer end of arm 770 may be attached to a slide collar 774 which allows relative angular motion between the distal end of the arm 770 and the sliding pillar 744. In this instance, the softer spring 766 bears upwardly against the underside of the slide collar 774.

Upright control members 776 may be interposed between the wheel hub carrier 746 and arm 770. Such control members may be in the form of control springs of the type used in other embodiments of the present invention, as described above.

It is to be understood that the hub carrier 746 may be incorporated into a driven axle to drive the vehicle wheels 748. Such drive may be accomplished through hydraulic motors incorporated into the hub carriers or through torque shafts extending through the hub carriers in a manner well known, for example as utilized in the front wheels of a four-wheel drive vehicle.

In addition, it is to be understood that vehicle 742 is capable of providing the same advantages as provided by the vehicle 700 as described above, including tilting the body 750 inwardly when negotiating a curve, or pitching the body rearwardly when braking. In this regard, as with other embodiments of the present invention, the A-arm assembly 752 can be oriented so that the pitch center of the vehicle as defined by the A-arm assemblies may be at an elevation that is different from the roll center of the vehicle. Also, the A-arm assemblies can be mounted on the vehicle to be adjustable in orientation and position so as to be able to change the location of the pitch and/or roll centers during vehicle operation. Moreover, the present invention as shown in FIG. 34 also provides positive dynamic camber to the wheels 748.

Figure 36:
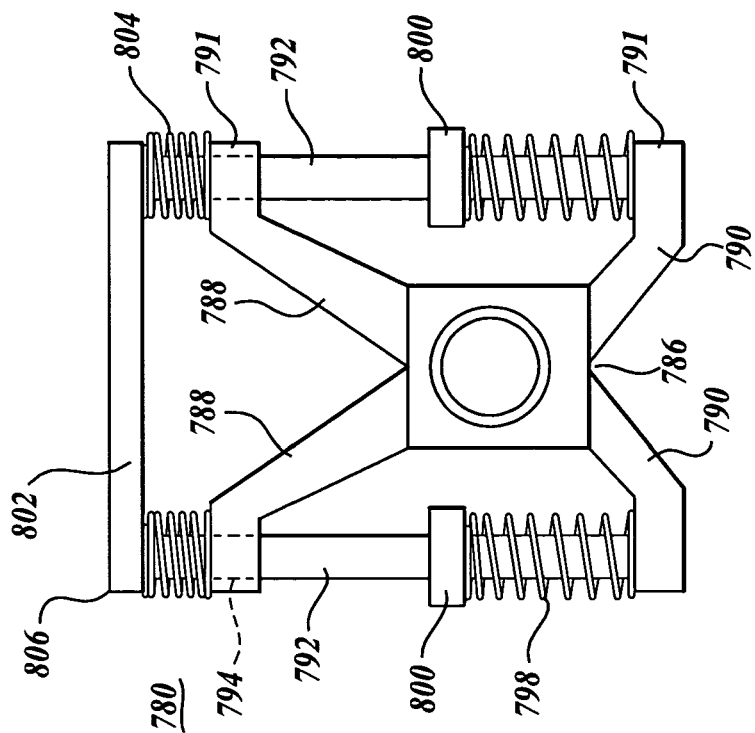
FIG. 36 is a side elevational view of FIG. 35.
Figure 35:
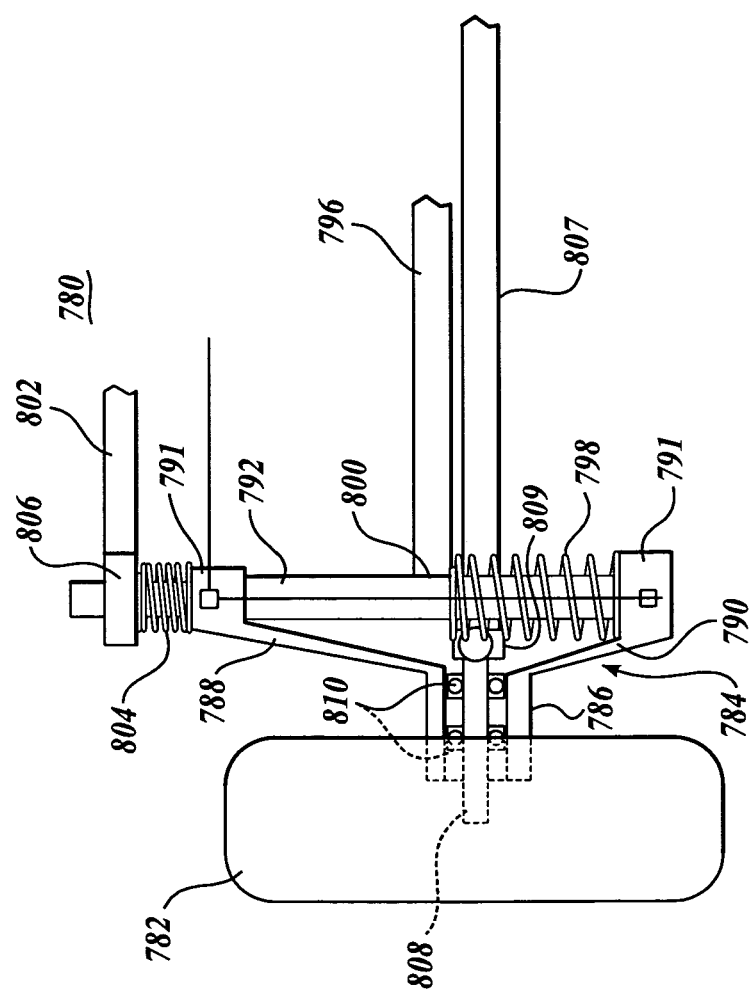
FIG. 35 is a fragmentary front elevational view of a further embodiment of the present invention.

FIGS. 35 and 36 depict a further sliding pillar system used in conjunction with vehicle 780. As shown in the figures, a double sliding pillar is utilized with each of the vehicle wheels 782. The vehicle 780 includes a hub assembly 784 having a wheel hub section 786 and a slider frame section composed of upper diagonal arms 788 that extend upwardly and diagonally outwardly from the central hub section 786. The slider frame section also includes relatively shorter lower arms 790 that extend diagonally downwardly and outwardly from the hub section 786. The distal ends of each of the arms 788 and 790 are in the form of a horizontal pad or boss 791 for supporting the upright pillars 792. The lower ends of the pillars 792 may rest on the upper portion of the corresponding pads 791 of the arms 790, whereas upright clearance openings 794 may be formed in the pads 791 of the arms 788 for reception of the pillars 792 therethrough.

The tie structure 796 may be coupled to the pillars 792 in a manner similar to that utilized in the embodiments of the present invention shown in FIGS. 32 and 33. In this regard, relatively stiff lower springs 798 may be interposed between the underside of slide collars 800 of the tie structure 796 and the upper side of the pads 791 of the lower arms 790. Likewise, the body 802 of vehicle 780 may be coupled to the pillars 792 in a manner similar to that employed with the embodiment of the present invention shown in FIGS. 32 and 33. In this regard, upper, relatively softer springs 804 are disposed between the underside of body slide collars 806 and the upper surface of the upper pads 791 located at the distal ends of the upper arms 788.

Continuing to refer to FIGS. 35 and 36, the hub assembly 784 is specially designed to be used in conjunction with drive axle 807 connected to wheel drive shaft 808 through the use of universal joint 809. Spaced apart bearings 810 are disposed between the drive axle 808 and the inside diameter of hub section 786 to anti-frictionally support the drive axle in a manner well known in the art.

As will be appreciated, the embodiment of the present invention shown in FIGS. 35 and 36 provide the same advantages as provided in the embodiments shown in FIGS. 32, 33 and 34, including the inward tilt of body 802 and outward tilt of tie structure 796 during cornering as well as the rearward tilt of body 802 and the forward tilt of tie structure 796 during hard braking. The present embodiment also provides positive dynamic camber to the wheels 782 in a manner similar to that described above.

FIG. 37 illustrates a front elevational view of a vehicle 811 in a further embodiment of the present invention, wherein vehicle 811 includes two roller cams 812 rotatably mounted on the outer ends of an axle shaft 814 extending transversely outwardly from a connector bracket 815 located along the sides at the forward and rearward end portions of body 816. The roller cams 812 ride within arcuate cam grooves 817 formed in the longitudinal tie structure 818L extending along the left-hand side of body 816, shown in FIG. 37. Although not shown, a right-hand tie structure 818 extends along the right-hand side of the body 816.

A longitudinal cam roller 820 is mounted on the outer end portion of the stub shaft 822 that extends longitudinally from the connector bracket 815, to engage within a close-fitting follower slot-824 formed in body 816. A connector bracket (not shown) similar to bracket 815, shown in FIG. 37, is disposed on the laterally opposite side of the body at the front and rear of the body so that a connector structure is positioned adjacent each corner of the body. As such, when negotiating a corner, the centrifugal force acting through the center of gravity 826 of the vehicle 811 will cause the body to tilt inwardly toward the center of the curve, and in doing so, cam rollers 820 will roll along respective cam follower slots 824. Likewise, during braking, the deceleration force pushing against the rear of the body will cause the body to pitch by relative movement of the cam rollers 812 along the cam slots 817 formed in the tie structure 818, tending to lower the rear end of the vehicle and raise the upper end of the vehicle so that a high level of load is retained on the vehicle rear wheels.

It will be appreciated that rather than incorporate the cam follower slot 817 in the tie structure 818, such slot could be incorporated into a wheel hub carrier. Alternatively, the cam roller 812 and axle shaft 814 could extend laterally inwardly from a hub carrier to engage with a cam roller slot formed in the connector bracket 815.

Figure 38:
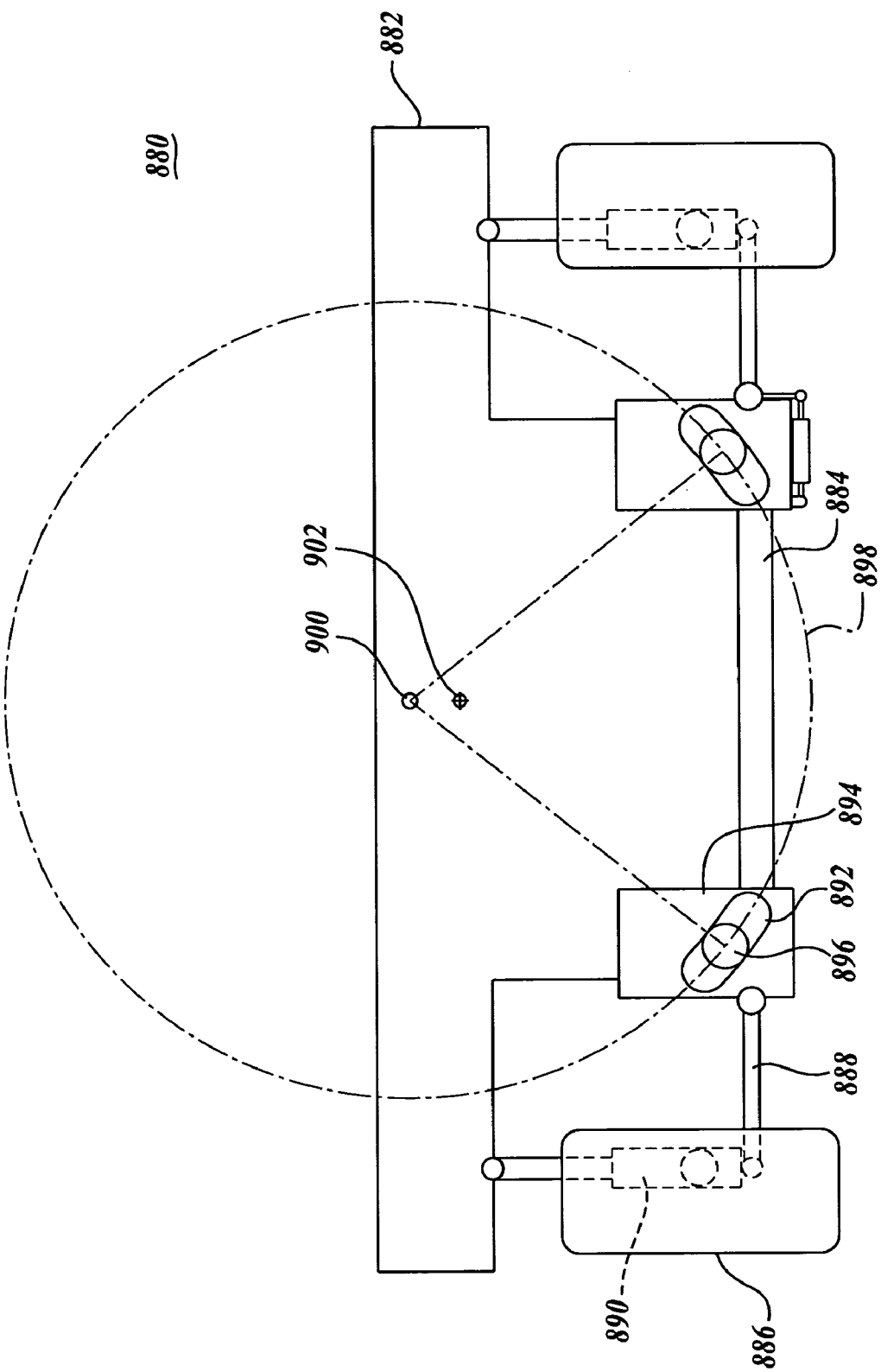
FIG. 38 is a further alternative of the embodiment of the present invention shown in FIG. 37.

FIG. 38 illustrates a further embodiment of the present invention wherein a vehicle 880 utilizes roller cams to allow the vehicle body 882 to roll relative to an underlying tie structure 884 when a side force is applied to the vehicle, for example, during cornering. As in other embodiments of the present invention, the tie structure 884 is carried by wheel assemblies 886 through the use of arm assemblies 888. The arm assemblies may be resisted by a relatively torsion bar or linear resistor in a manner described herein. Also, the body 882 may be supported by softer control springs 890 which are mounted on the wheel assemblies 886. The upper ends of the control springs 890 may be coupled to an overhead portion of the body 882.

An arcuate cam slot 892 is formed in brackets 894 located at the rearward and forward ends of the tie structure along the sides thereof. The cam slots are sized to receive cam rollers 896 mounted on the body by any convenient means, for example, utilizing stub shafts or axles (not shown). The cam slots 892 and cam rollers 896 are positioned along a circle path 898 so that the cam rollers will smoothly roll within the cam slots without binding up. It will be appreciated that the center of the circle path 898 coincides with the roll center 900 of the body 882. Because the center of gravity 902 of the vehicle is below the roll center, when the vehicle negotiates a corner, the centrifugal force imposed on a vehicle will act through the center of gravity, thereby tending to pivot the body about the roll center. As a consequence, the body will tilt toward the inside of the corner rather than towards the outside as in a typical vehicle. Moreover, as in other vehicles described above, the tie structure will tilt somewhat toward the outside of the corner (though not to the extent that the body tilts to the inside of the corner) thereby causing the roll center to also move somewhat in an outward direction and preventing the vehicle from jacking about the roll center.

It will be appreciated that the embodiment of the present invention shown in FIG. 38 can be altered to allow the vehicle to pitch instead of roll by changing the orientation of the cam slots and cam rollers 90° from that shown in FIG. 38 so that the axis of the cam rollers 896 is transverse to the length of the vehicle 880 rather than longitudinally of the length of the vehicle as shown in FIG. 38. As a further aspect of the present invention, the brackets 894 can be constructed to be adjustable relative to the tie structure 884 to alter the radius of the circle path 898. As a consequence, the extent to which the body 882 rolls relative to the tie structure per level of force imposed on the vehicle can be varied as desired. In addition, the structure of FIG. 37 can be incorporated into the vehicle 880 to enable the body 882 to both pitch and roll.

Figure 39:
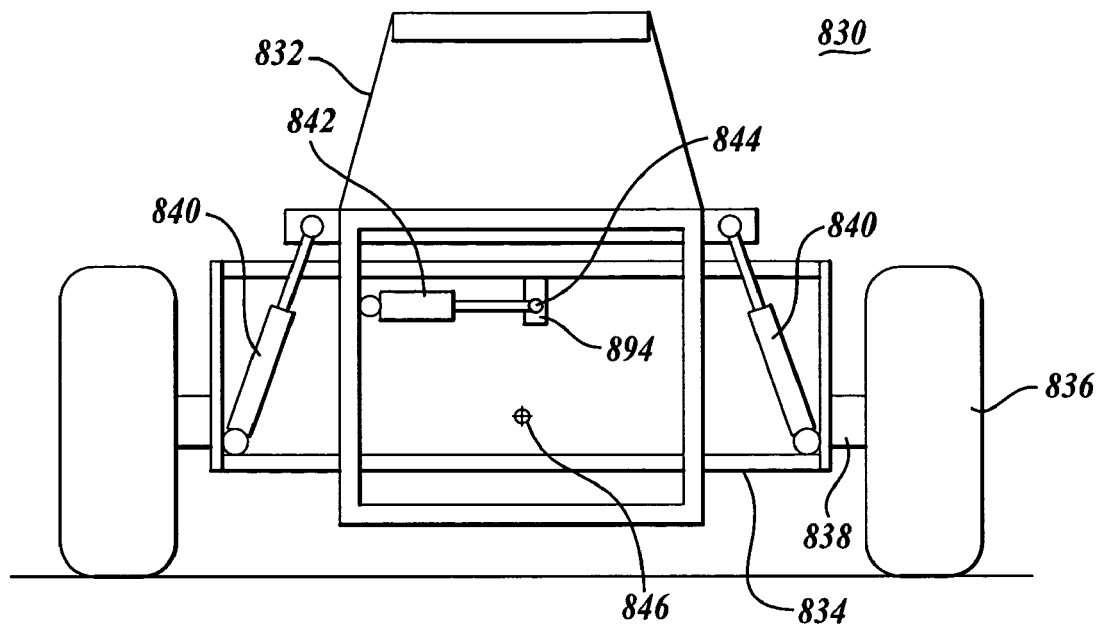
FIG. 39 is a front elevational view of a further embodiment of the present invention.

A further embodiment of the present invention is shown in FIG. 39, wherein a vehicle 830 includes a body 832 supported relative to a tie structure 834 which in turn is supported by wheel assemblies 836. The tie structure 834 may be of a rectangular box-type construction similar to those tie structures shown in FIGS. 4, 5, 7, 10 and 13. The tie structure 834 may be connected to hub assemblies 838 in a well-known manner, including in a solid axle arrangement if desired. Spring/shock absorber assemblies 840 extend diagonally, upwardly, and inwardly from the tie structure 834 to interconnect with the body 832. Ball joints may be utilized at the upper and lower ends of the spring/shock absorber assemblies 840 in a well-known manner.

A horizontal fluid strut 842 is interconnected between the tie structure and the body at an elevation corresponding to the roll center 844 of the vehicle which is at an elevation above the center of gravity 846 of the vehicle. The strut 842 is relatively stiff compared to the stiffness of the spring/shock absorbers 840. As such, during cornering the body 832 tilts inwardly into the curve being negotiated by the compression of the inside spring/shock absorber 840 and the extension of the outside spring/shock absorber 840. Simultaneously, the body 832 shifts somewhat laterally outwardly against the push/pull fluid strut 842. As a result, the rate of force transfer from the body to the tie structure is lower than in a conventional vehicle, leading to many of the same advantages as discussed above, even though, due to the horizontal orientation of the push/pull fluid strut, the roll reaction center of the vehicles is at a higher elevation than in many of the other embodiments of the present invention described herein.

The fluid strut 842 may be reactive as described above, or instead may be active to cause sideways movement of the body 832 when desired. In this regard, a fluid pump may be used to deliver fluid to the strut or remove fluid therefrom, thereby to cause the body to move laterally. Such pump may be similar to that described above. In addition, a fluid reservoir may be employed to provide fluid to the strut and receive fluid from the strut. Also, by this construction, the stiffness of the strut can be varied during travel. It is to be appreciated that the fluid strut 842 can be replaced by an electrically operated linear actuator.

Figure 40:
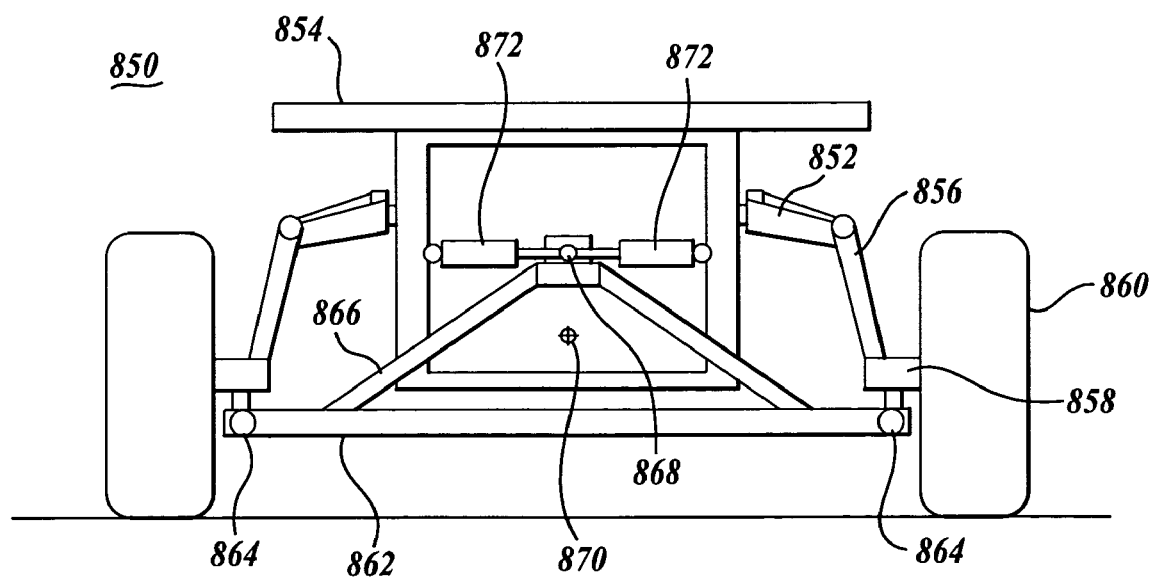
FIG. 40 is a front elevational view of a further embodiment of the present invention.

FIG. 40 illustrates a further embodiment of the present invention, wherein vehicle 850 is constructed somewhat similarly to vehicle 830, shown in FIG. 39. However, in vehicle 850, the body is supported by leading arms 852 extending transversely outwardly from the body 854 to couple with the upper end portions of struts 856 extending upwardly from hub carriers 858 of the wheel assemblies 860. It is to be appreciated that the arms 852 may be of various constructions that are well known in the art. Also, the arms 852 can be replaced by other means for supporting the body. The arms 852 can be designed to twist and/or bend to accommodate road bumps and other discontinuities, thus functioning as a suspension member.

Vehicle 850 includes a tie structure 862 connected to the hub carriers 858 by ball joints 864 or similar connection members. An A-frame structure 866 may extend upwardly from the tie structure to the elevation of the roll center 868 of the vehicle which is substantially above the elevation of the center of gravity 870 of the vehicle. The upper apex of the A-frame 866 may serve as a connection point for a transverse fluid strut assembly 872 which may be similar in construction to strut 842, shown in FIG. 39. The opposite end of the strut assembly 872 may be coupled to the body 854. It will be appreciated that vehicle 850 is capable of operating in a manner similar to vehicle 830 described above, including providing positive dynamic wheel camber. In this regard, ideally the strut assembly 872 is relatively stiff in comparison to the arms 852, thereby to limit the sideways movement of the body when cornering. Also, various types of strut assemblies can be used.

Figure 41:
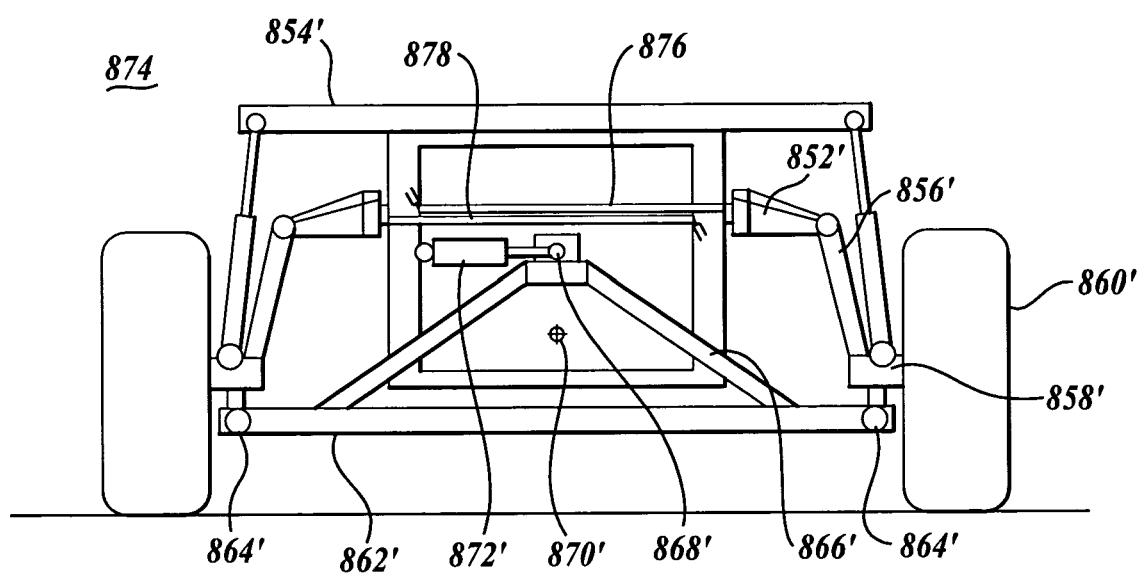
FIG. 41 is a front elevational view of a further embodiment of the present invention.

FIG. 41 illustrates a further embodiment of the present invention that is similar to the vehicle 850 shown in FIG. 40. Thus, the components of the vehicle 874 shown in FIG. 41 that are the same or similar to that shown in FIG. 40 are identified with the same part number but with the addition of a prime (') symbol. The main difference between the vehicles shown in FIGS. 40 and 41 is that vehicle 874 utilizes torsion bars 876 and 878 that extend from the inward ends of leading arms 852' across the body 854', to be anchored at the opposite side of the body. Thus, the torsion bars 876 and 878 are used to accommodate relative movement between the tie structure 862' and the body 854' caused by road bumps or other road discontinuities. This function does not have to be borne by the leading arms 852' in the manner of the vehicle 850 shown in FIG. 40.

FIGS. 42 and 43 illustrate a further embodiment of the present invention, wherein a vehicle 1050 includes a body portion 1052 supported by a pair of forward wheel assemblies 1054 and a pair of rearward wheel assemblies 1056. Referring initially to FIG. 42, the rear wheel assembly 1056 includes a drive axle 1058 that may be powered by an engine (not shown) in a well-known manner. The outward ends of the drive axle 1058 are held captive within an upright slide retainer 1060, of a rear slide assembly 1061, which serves the function of a tie structure as described in other embodiments of the present invention. The axle 1058 is vertically "centered" in the slide retainer by upper and lower compression springs 1062 and 1064, which also react against upper and lower portions of the slide retainer 1060. Each of the laterally spaced apart slide retainers 1060 are coupled to the rear portion of body 1052 by upper and lower links 1066 and 1068 which are pinned to the upper and lower end portions of the slide retainer, respectively, and also pinned to vertically spaced apart locations on the rear portion of the body 1052. A crank arm 1070 is fixed to the forward end portion of upper link 1066 so as to pivot about connection point 1072 of the upper link as the upper link 1066 pivots about such connection point. The distal end of the crank arm 1070 is pinned to the free end of shock absorber assembly 1074, which is positioned generally perpendicularly to the length of the crank arm 1070. The spring/shock absorber 1074 acts as a body spring for the vehicle 1050. In this regard, when the rear wheel assembly 1056 rises relative to the rear portion of the body 1052, the spring/shock absorber assembly 1074 is forced to compress so as to react against such relative movement.

At the forward end of the vehicle 1050, a forward slide assembly 1076 is utilized, which may be similar in construction and operation to the rear slide assembly 1061. Thus, the operation of the forward slide assembly 1076 will not be repeated here. One difference between the forward slide assembly 1076 and the rear slide assembly 1061 is that a body spring/shock absorber assembly similar to 1074 at the rear of the vehicle may not be used at the forward end of the vehicle. A torsion assembly (not shown) may be employed with one or both of the forward links 1078 and 1080.

It will be appreciated that the forward links 1078 and 1080 in the rearward direction are aligned to intersect with the pitch center 1082 of the vehicle. The same is true for the rearward links 1066 and 1068. It will also be appreciated that the pitch center 1082 of the vehicle is located at an elevation higher than the location of the center of gravity 1084 of the vehicle.

In use, when the vehicle 1050 is accelerated, a rearward force acts to the center of gravity 1084 tending to raise the rear of the vehicle since the center of gravity is below the pitch center of the vehicle. Simultaneously the pitching couple acts through the body pitch center, causing the links 1066 and 1068 to transfer the pitching couple to the ground through the rear wheel assemblies 1056. This places a downward load on the upper link 1066 and on the lower link 1068, thereby causing the rear slide assembly to move somewhat downwardly, thereby to apply downward load on the rear axle 1058 which in turn increases the load on the rear wheel assemblies for better traction. Also during the downward movement of the rear slide assembly, the body moves downwardly somewhat so that the pitch center does not serve as the pitch reaction center, thereby lessening the rearward pitching of the vehicle during this time period. It will be appreciated that during braking, the forces act instead on the front of the vehicle 1050 in a like manner.

Figure 44:
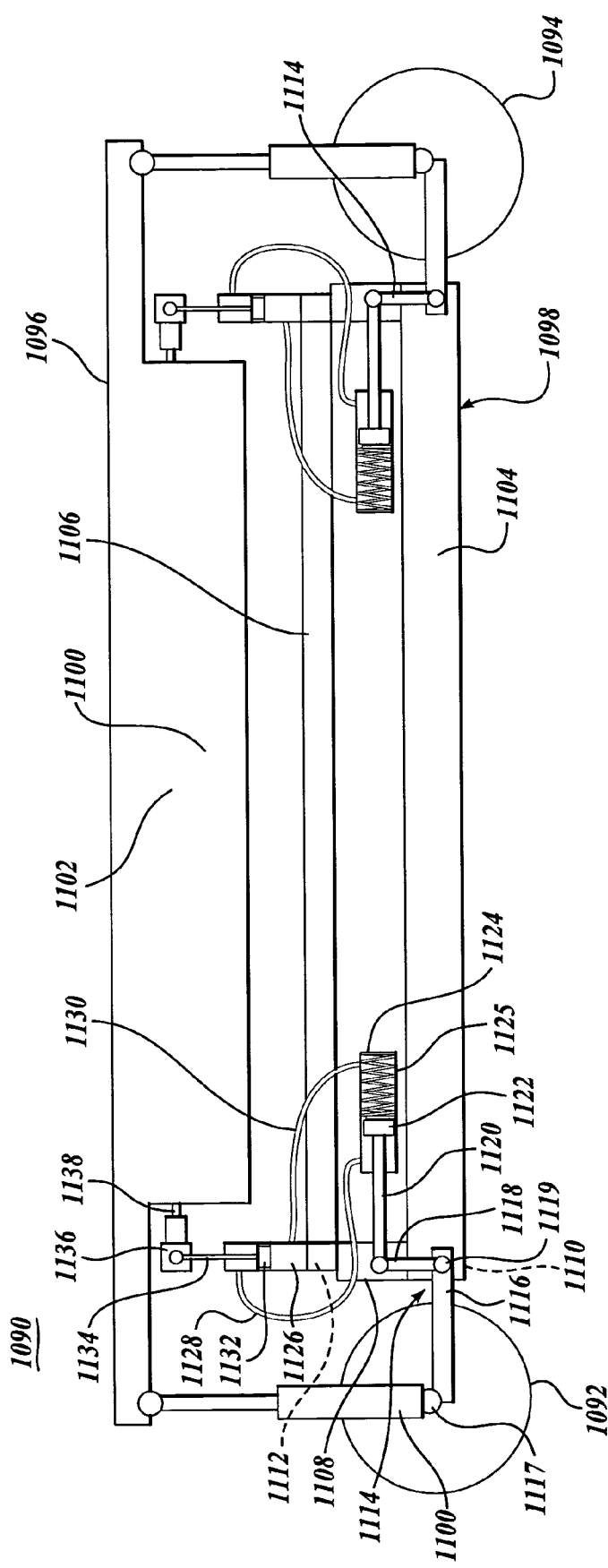
FIG. 44 is a side elevational view of a further embodiment of the present invention.

FIG. 44 illustrates a vehicle 1090 that also utilizes the dynamic forces acting on the vehicle, and the corresponding movement of suspension arms, to reduce or increase the load imposed on the vehicle's support wheels 1092 and 1094, with the magnitude of the load reduction or increase depending on the magnitude of the dynamic loads imposed on the body and the lengths of the suspension arms. The body 1096 of the vehicle is supported by body spring 1110 at each wheel assembly 1092 and 1094.

The vehicle 1090 includes tie structure 1098, which may be of a box-type construction in a manner described in conjunction with several of the embodiments discussed above. In this regard, the tie structure may include lower and upper side beams 1104 and 1106 that are vertically interconnected by corner posts 1108. The tie structure may also utilize lower and upper transverse members 1110 and 1112 that transversely interconnect the forward and rearward ends of the side beams 1104 and 1106.

The corners of the tie structure may be carried by the wheel assemblies 1092 and 1094 by use of crank arms 1114, having a generally horizontal arm 1116 and an upright arm 1118. At the intersection 1119 of arms 1116 and 1118, the crank arm 1114 is pinned to the tie structure. The free end of the horizontal arm may be connected to the wheel hub assembly 1117. The opposite end of the arm 1116 is rigidly connected to the lower end of upright arm 1118 that extends nominally upwardly from the arm 1116. The upper end of the arm 1118 is pivotally connected to the distal end of a cylinder rod 1120, with the inward end of the rod connected to a piston 1122 that slidably engages within a hydraulic cylinder 1124. A spring 1125 may be positioned between the piston 1122 and the end of the cylinder 1124 to nominally position the piston within the cylinder, for example when the vehicle is stationary. The hydraulic cylinder 1124 is in hydraulic fluid connection with an upright cylinder 1126 through hydraulic lines 1128 and 1130. The lower end of the hydraulic cylinder 1126 is fixedly attached to the structure upper side beam 1106. The upright hydraulic cylinder 1126 includes a piston 1132 connected to the lower end of a piston rod 1134, with the upper distal end of the rod coupled to a connecting collar 1136, which engages over a stub shaft 1138 extending forwardly and rearwardly from the body 1096. The coupling collar may be replaced with a U-joint assembly.

The dynamic reactive system for interconnecting the body 1096 with the wheel assemblies 1117 in FIG. 44 operates in a manner similar to the other embodiments of the present invention described herein. In this regard, when one end of the body 1096 pitches downwardly, it causes the corresponding piston 1132 to extend downwardly, in turn forcing hydraulic fluid from the bottom side of cylinder 1126 to the end of cylinder 1124 opposite rod 1120, forcing the rod outwardly relative to the cylinder which in turn causes counterclockwise rotation of crank arm 1114, tending to apply a downward force on wheel 1092, whereby causing the adjacent end portion of the tie structure to raise somewhat upwardly. At the other end of the vehicle 1090, the reactive interconnecting force acts oppositely so that hydraulic fluid is forced from cylinder 1126 through line 1128 to the side of piston 1122 corresponding to piston rod 1120. As such, when applying a strong braking force on vehicle 1090, significant load is maintained on the rear wheels of the vehicle to assist in maintaining control of the vehicle rather than skidding or sliding sideways.

The diameter of cylinder 1124 may be larger than the diameter of cylinder 1126 so that the amount of the body roll and/or pitch is more than the amount of wheel movement relative to the tie structure. Also, rather than being passive as described above, the cylinders 1124 and 1126 can be powered to provide an active suspension system for the vehicle 1090. A fluid pump, as described above can be utilized in this regard. If such an active suspension system is utilized, then the post 1100, described above, may be eliminated.

As a further matter, a torsion bar (not shown) can be utilized in conjunction with crank arms 1114 to nominally position the crank arms and also modulate the pivoting movement of the crank arms about pivot point 1119.

Figure 45:
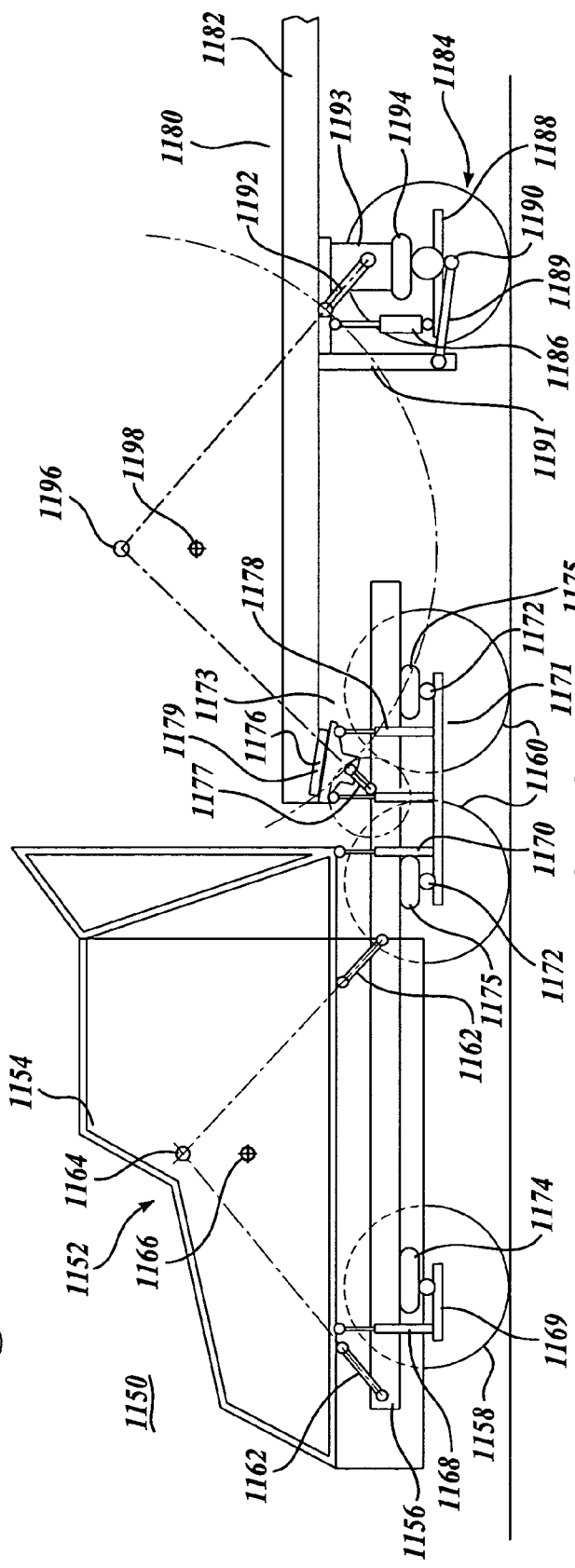
FIG. 45 is a side elevational view of another embodiment of the present invention.

FIG. 45 illustrates a further embodiment of the present invention incorporated into a semi tractor trailer 1150. The vehicle 1150 includes a tractor 1152 composed of a cab 1154 mounted on a tractor frame 1156 which also serves as a tie structure of the tractor. The tractor may be supported by conventional front steerable wheels 1158 and rear drive wheels 1160.

The cab 1154 may be supported on the tie structure 1156 by four diagonally disposed links 1162 which may be connected at their upper and lower ends to the cab and tie structure, respectively, by pivot joints, ball joints, universal joints or other types of joints. The links 1162 may be oriented so that if extended in the upper direction the links would intersect at a common point, which common point corresponds to the roll center and pitch center 1164 of the body. As illustrated in FIG. 37, the roll/pitch center 1164 is at an elevation above the center of gravity 1166 of the tractor.

The cab 1154 is also supported by adjustable front control members 1168 supported by a front wheel hub assembly 1169 and rear control members 1170, which are supported by an axle frame assembly 1171 which in turn is carried by axle members 1172. In addition, the tie structure 1156 is supported on the front hub assembly by relatively stiff, but adjustable, air shocks or pillows 1174, whereas the rear portion of the tie structure 1156 is supported on the rear of assembly 1173 by comparable air shocks or pillows 1175.

Figure 47:
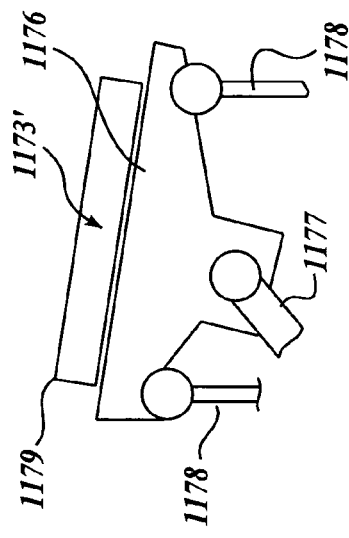
FIG. 47 is an enlarged fragmentary view of FIG. 45.
Figure 46:
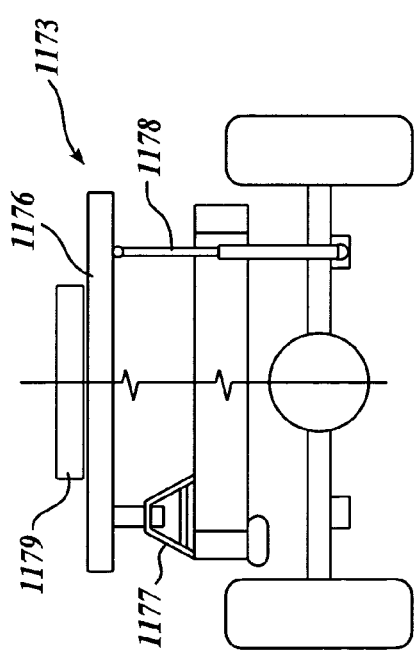
FIG. 46 is a cross-sectional view of FIG. 45 taken substantially along lines 46-46 thereof.

A fifth wheel assembly 1173 includes a base portion 1176 that is directly supported by relatively stiff adjustable spring/slider control members 1177 as well as by relatively soft linear control members 1178. A standard plate portion 1179 is supported by the base portion 1176. The spring/slider control members extend upwardly from the tractor tie structure to be pivotally coupled to the underside of the fifth wheel base portion near the fore and aft center thereof. As shown in FIG. 45, two control members 1177 may be utilized in laterally spaced-apart relationship to each other. Of course, other arrangements of the control members may be utilized. A plurality of linear control members 1178 may be utilized, as shown in FIGS. 45, 46 and 47, perhaps one at every quadrant of the fifth wheel base 1176.

As in other embodiments of the present invention described above, by the foregoing construction, when the tractor 1152 rounds a corner the centrifugal force acts on the body at the center of gravity 1166, which is below the elevation of the roll center 1164, so that the body will tilt inwardly into the corner rather than outwardly as in a typical vehicle. Correspondingly, when quickly braking, the longitudinal force acts on the tractor at the center of gravity, which is at an elevation below the pitch center 1164, thereby tending to cause the rearward portion of the cab to impose a downward force on the tie structure, thereby to maintain significant load on the rear tractor wheels 1160.

During cornering, the tie structure 1156 is allowed to tilt outwardly of the curve somewhat, but not to the extent that the cab tilts inwardly. During this outward tilt of the tie structure, the roll center is shifting, so it does not serve as the reaction center of the tractor, thereby reducing the jacking effect imposed on the tractor then cornering. Likewise, during hard braking, the tie structure tilts somewhat in the forward direction, but not nearly to the extent that the cab 1154 tilts in the rearward direction. During this tilting motion of the tie structure/tractor frame 1156, the pitch center 1164 is shifting so as to reduce the rate of force transfer through the tractor 1152, thereby reducing the pitch jacking effect imposed on the vehicle. The combined result of the rearward tilting of the cab 1154 and the somewhat forward tilting of the tie structure/tractor frame 1156 during hard braking allows for a significant load to be maintained on the rear wheels 1160 without imposing a high pitching effect on the tractor. This can result in quicker and safer braking of the tractor 1152.

The semi trailer 1150 includes a trailer portion 1180 that is constructed to function similarly to the tractor 1152. In this regard, trailer 1180 includes a load platform 1182 that is supported above a rear wheel assembly 1184. As shown in FIG. 45, a variable resistance, relatively soft control member 1186 that is supported by a subframe 1188 carried by the rear hub assembly 1190 of the semi trailer 1180. Lateral stability between the trailer bed 1182 and wheel hubs 1190 is achieved by struts 1189 extending forwardly from subframe 1188 to complete the lower end of a brace 1191 that extends downwardly from the bed 1182.

As in the linear control members 1178 used in conjunction with the tractor and fifth wheel described above, the linear control members 1186 are designed to accommodate relative linear, transfers, rolling and pitching movement between the load platform 1182 and the wheel hub assembly 1190. The rear end of the trailer frame/tie structure 1184 is supported on the hub assembly 1190 by a relatively stiff spring slider assembly 1192 that extends diagonally upwardly and forwardly from a base plate 1193 which in turn is supported above the hub assembly by an air shock 1194, which may be similar to air shocks 1174 and 1175 of the tractor 1152. The relatively stiff spring/slider assemblies 1177 and 1192 are angled upwardly and diagonally rearwardly and forwardly, respectively, so that lines extending colinearly of the length of such members would intersect at the pitch center 1196 of the trailer 1196 which is above the center of gravity of the trailer 1198. It will be appreciated that by the foregoing construction, the trailer 1180, with a load thereon, would function in a manner very similar to the cab 1152 during cornering as well as during braking and accelerating. As a result, a much more stable semi-tractor trailer is achieved than the standard semi-tractor trailers currently being utilized.

Semi trailer 1150 is illustrated and described as having a tractor with a tandem rear axle. However, the present invention could readily be incorporated with a tractor having a single rear axle. In that situation the fifth wheel assembly 1173 would be supported by a single rear axle. Such semi tractor with a single rear axle would nonetheless function in substantially the same manner as tractor 1152 described above.

It will also be appreciated that the present invention as shown in FIGS. 45-47 can be incorporated into other types of vehicles, such as rail cars, especially the structure of the fifth wheel assembly 1173 and the trailer portion 1180.

Figure 48:
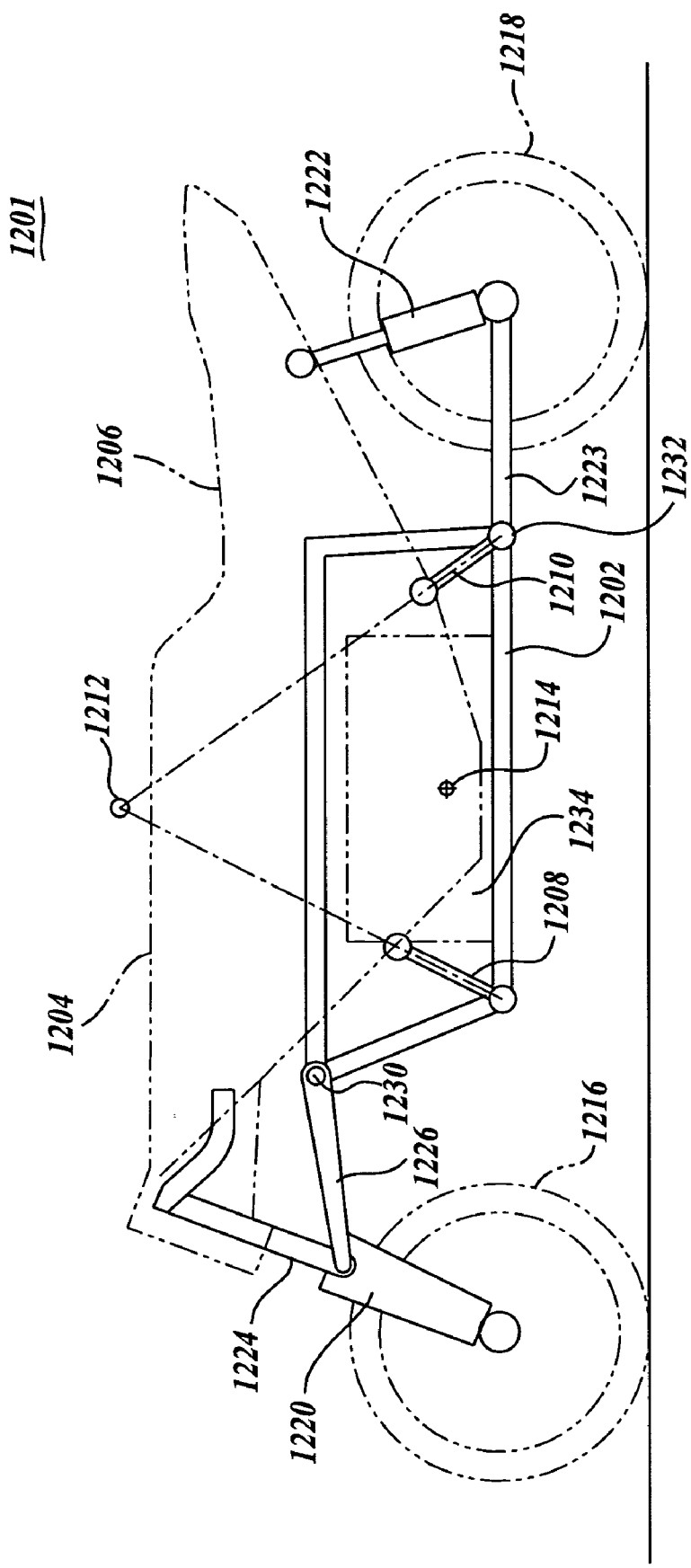
FIG. 48 is a side elevational view of a further embodiment of the present invention.

FIG. 48 illustrates the present invention as incorporated into a motorcycle type vehicle 1201. The motorcycle includes a tie structure 1202 that supports a body structure 1204 designed with a seat 1206. The body structure is supported on the tie structure by forward and rearward link pairs 1208 and 1210, on each side of the forward and rearward end portions of the tie structure. An extension of links 1208 and 1210 in the upward direction would result in their intersection at the pitch center 1212 of the motorcycle, which is substantially above the center of gravity 1214 of the cycle. The links 1208 and 1210 may be coupled to the tie structure and the body by use of pivot connections in a manner well known.

The body 1204 is also supported and stabilized relative to forward and rearward wheels 1216 and 1218 by forward and rearward relatively soft springs 1220 and 1222. Such springs are connected between the forward and rearward wheel hubs and the body in a well-known manner. Body stops (not shown) can be incorporated into the springs to limit the pitch of the body relative to the tie structure. Also, springs 1220 and 1222 can be of other construction, as is known in the art.

The tie structure 1202 is coupled to the forward fork assembly 1224 by a forward connection arm assembly 1226 and is connected to the hub section of the rear wheel 1218 by a rearward connector arm assembly 1228. A transverse forward torsion bar 1230 is interposed between the rearward portion of the forward connection assembly 1226 and the tie structure 1202, whereas a transverse rearward torsion bar 1232 or other type of spring arrangement is interposed between the forward end of the rearward connector arm assembly 1228 and the adjacent portion of the tie structure. The forward and rearward torsion bars 1230 and 1232 are relatively stiff in comparison to the body springs 1220 and 1222. Also, other types of structures can be used in place of torsion bars 1230 and 1232, for example, a crank arm and linear control member as described herein. Also, a dampener can be used in conjunction with connection arm assemblies 1226 and 1228; for example, a dampener similar to that dampener 95 shown in FIG. 1.

The motor 1234 of the motorcycle 1201 may be mounted within and supported by the tie structure 1202. The motor can be coupled to the rear wheel 1218 of the cycle in a manner well known in the art. Alternatively, an electric motor may be incorporated into the rear and/or front wheel hubs to power the motorcycle. The battery therefor can be carried by the tie structure, for example, at the location of the engine 1234.

In operation when accelerating or braking, a longitudinal force is imposed on the cycle 1201 through the center of gravity 1214 which is at an elevation well below the pitch center of the vehicle. As such, the body 1204 will tend to tilt forwardly during acceleration and tilt rearwardly during hard deceleration, thereby retaining a significant load on the front wheel 1216 during acceleration and a significant load on the rear wheel 1218 during braking. This is opposite to the typical situation in a motorcycle.

Also during braking, the torsion bars 1230 and 1232 allow the tie structure to tilt downwardly somewhat in the forward direction. Due to the torsion bars 1230 being stiffer than spring 1220, the tie structure may be able to continue moving during braking after the shifting of the body has ceased. As a consequence during this tilting motion, the pitch center 1212 is shifting, thus reducing the rate of force transfer through the cycle during braking, thereby reducing the tendency of the cycle to pivot about its pitch reaction center Conversely, during hard acceleration, the torsion bars 1230 and 1232 allow the tie structure to tilt somewhat downwardly in a rearward direction. As a consequence, the pitch center 1212 does not serve as the pitch reaction center of the cycle. As will be appreciated, through the construction of the present invention, the cycle 1201 is capable of braking and accelerating in a relatively safe manner, especially in comparison with standard, typical motorcycles.

Figure 49:
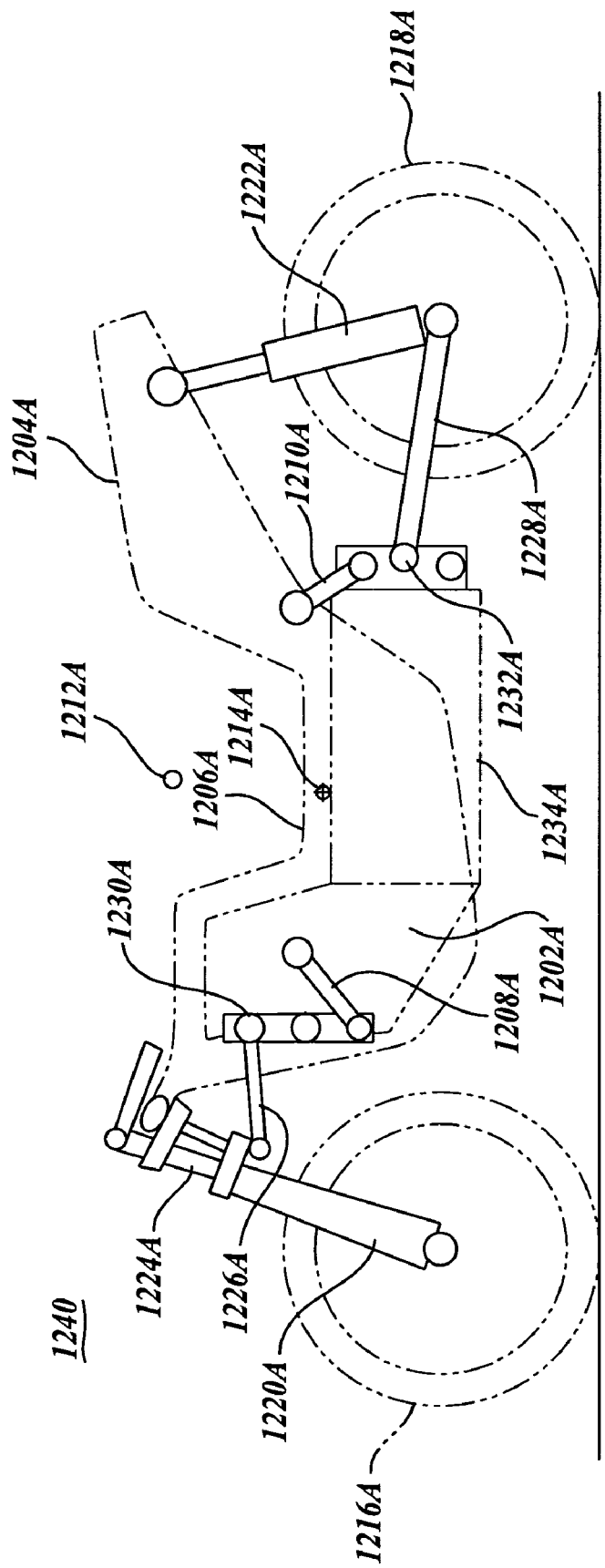
FIG. 49 is a side elevational view of a further embodiment of the present invention.

FIG. 49 illustrates a further embodiment of a motorcycle 1240 constructed in accordance with the present invention. The motorcycle 1240 is constructed similarly to motorcycle 1201. As such, the corresponding components of motorcycle 1240 are given the same part numbers as in motorcycle 1201 but with the addition of an "A" suffix. Construction function motorcycle 1240 that is the same or similar to motorcycle 1201 will not be repeated here.

One difference between motorcycle 1240 and motorcycle 1201 is that in motorcycle 1240 the engine 1234A actually functions as a part of the tie structure 1202A. In this regard, the rear links 1210A and rear connect arm assembly 1228A are mounted to the rear portion of the engine 1234A. Having the engine 1234A function as part of the tie structure 1202A reduces the complexity and weight of the motorcycle 1240.

As another feature of the present invention, the seat 1206A is located at an elevation below the top of the front and rear wheels 1216A and 1218A. This allows a relatively low overall center of gravity for the motorcycle and rider relative to motorcycles in which the rider sits higher relative to the wheels.

Figure 50:
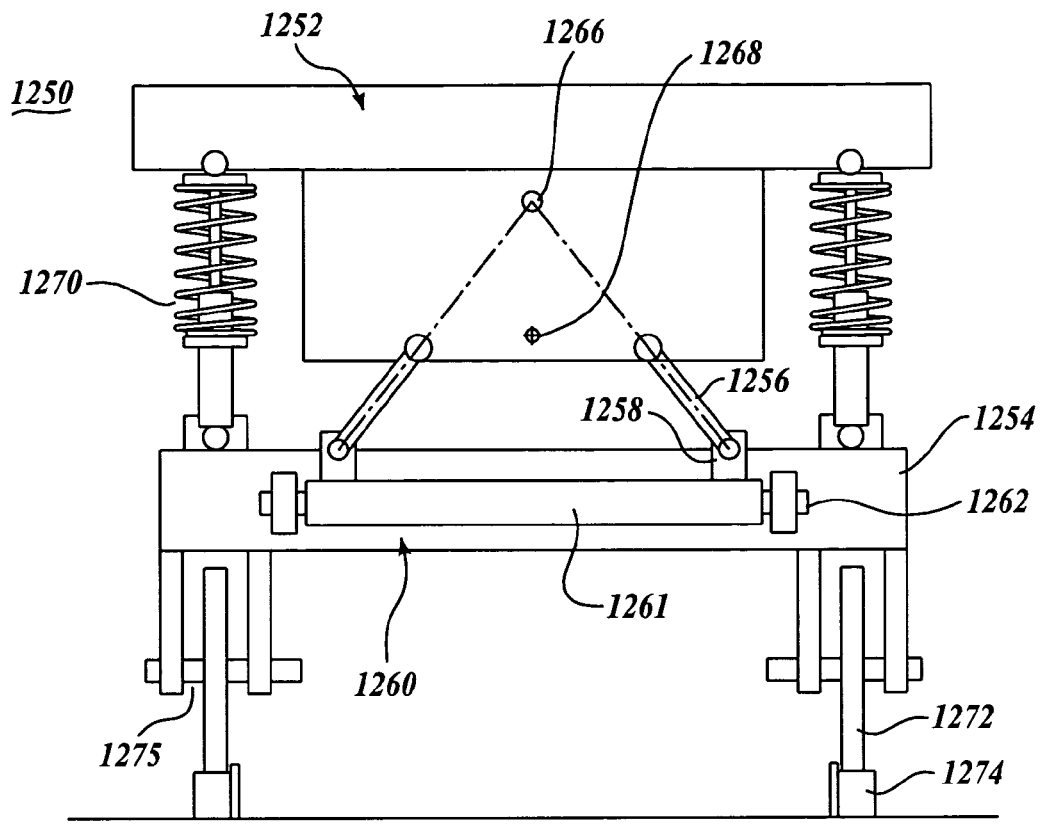
FIG. 50 is a front elevational view of the present invention integrated into a railway car.
Figure 51:
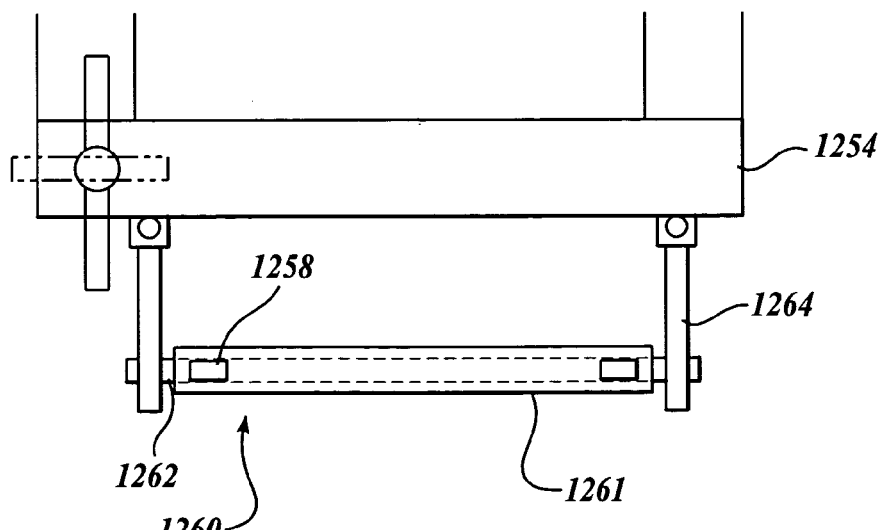
FIG. 51 is a top elevational view of FIG. 50.

FIGS. 50 and 51 illustrate the present invention being incorporated into a railway car 1250. The railway car includes a body 1252 supported above a tie structure 1260 by corner links 1256 that extend diagonally, inwardly at the front of the tie structure and diagonally, inwardly at the rear of the tie structure. The upper ends of the links 1256 may be coupled to the body using pivot connections, ball joints, universal joints or other appropriate means. The lower ends of the corner links 1256 are coupled to mounting ears 1258 that project upwardly from tie structure 1260, projecting forwardly and rearwardly from an axle structure 1254. The tie structure includes a transverse torsion bar 1262 over which an elongate collar or tube 1261 engages. Bushings can be used between the inside diameter of the tube 1261 and the outside diameter of the box 1262. Ears 1258 project upwardly from the collar. The torsion bar 1262 is coupled (for example, splined) to the outward, distal ends of arms 1264 that cantilever from the axle assembly 1254. The inward ends of the arms 1264 are coupled to the axle assembly 1254 by ball joints or similar means to allow the arms to turn about an axis extending along the length of the arms.

As most clearly shown in FIG. 50, the corner links 1256 may be diagonally disposed relative to the body 1252 so that if extended in their upwardly direction they would intersect at a point 1266 that functions as the roll center of the railway car. As apparent, such roll center is above the center of gravity 1268 of the railway car.

The weight of the body 1252 may also be carried in part by spring/shock absorber assemblies 1270 extending upwardly from the axle assembly 1254 and coupled to an overhead portion of the body 1252. The characteristics of the spring/shock absorber assembly 1270 can be varied as desired so as to select the relative amount of the weight of the body 1252 being carried by the spring/shock absorber assemblies.

The axle assembly 1254 is carried by standard railway wheels 1272 which ride on standard railway tracks 1274. The wheels 1272 can be replaced to fit different tracks. The wheels 1272 are mounted on wheel axles 1275.

In use, when the railway car 1250 is rounding a corner, the centrifugal force is applied thereto through the center of gravity 1268. Because the center of gravity is located below the roll center 1266, the body 1252 will tilt inwardly into the corner as opposed to tilting outwardly in a manner of a standard railway car. Moreover, during such tilting of the body 1252, the tie structure tilts somewhat downwardly on the outward side of the corner, but not nearly to the extent that the body 1252 is capable of tilting. This movement of the tie structure 1260 is resisted by torsion bar 1262. Moreover, due to the torsion bar 1262 being relatively stiffer than the spring/shock absorber assemblies 1270, the tilt of the body will be completed before the maximum tilt of the tie structure occurs. As a result, a rate of force transfer through the railway car 1250 is lower than would occur if the tie structure had "bottomed out" before the body had "bottomed out." As a consequence, the generation of a significant roll couple tending to roll the railway car about the outward wheels 1272 during cornering is forestalled. As such, the railway car 1250 is designed to provide some of the same advantages provided by the other vehicles described herein.

Figure 52:
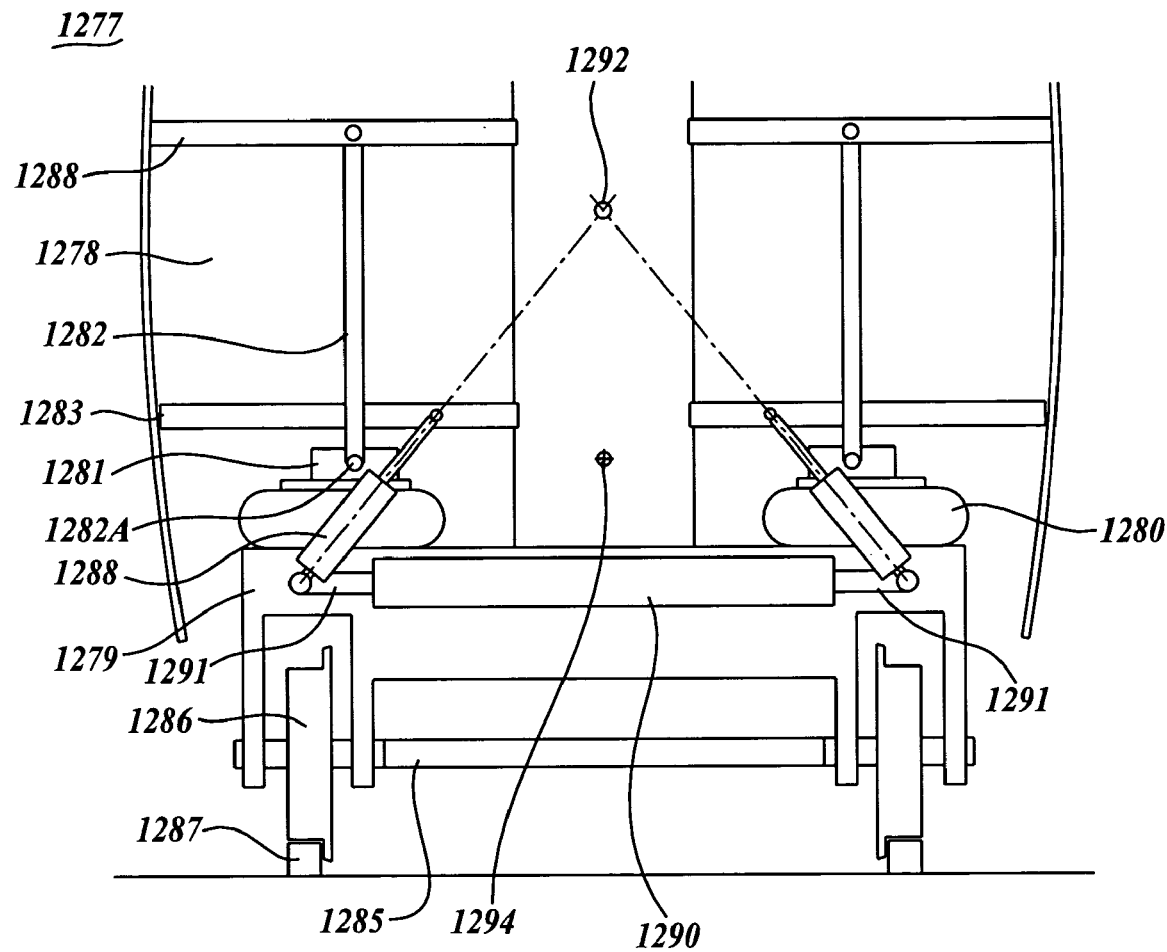
FIG. 52 is a view similar to FIG. 50 of another embodiment of the present invention.

A further embodiment of the present invention that is specifically designed for incorporation into a rail car 1277 is illustrated in FIG. 52. The illustrated rail car includes a body portion 1278 supported on an underlying tie structure/axle 1279 by relatively soft air pillow structures 1280 upon which an anchoring plate 1281 pivotally supports the underside of a load bearing column structure 1282 which is interconnected by body structural members 1283 and 1284. An axle shaft 1285 axles the tie structure 1279 to wheels 1286 which ride on conventional rails 1287.

The body 1278 is also connected to the tie structure 1279 by diagonally disposed hydraulic sliders 1288 having their upper end pinned to body structural member 1283 and their lower end pinned to the outward end of a horizontal double piston cylinder assembly 1290 mounted on the tie structure 1279. The outward end of the piston rods 1291 are pinned to the lower outboard ends of the hydraulic sliders 1288. It will be appreciated that the hydraulic sliders 1288 are oriented so that lines extending colinear thereto intersect at the lateral center of the rail car at an elevation corresponding to the roll center 1292 of the rail car, which is above the center of gravity 1294 of the rail car. Moreover, by extending or contracting the cylinder rods 1290, the vertical location of the roll center 1292 may be varied as desired, including during actual operation of the rail car.

It will be appreciated that the rail car 1277 operates in a manner similar to rail car 1250 described above, whereby when the rail car 1277 is rounding a corner, that centrifugal force is applied thereto through the center of gravity 1294. Because the center of gravity 1294 is located below the roll center 1292, the body 1278 will tilt inwardly into the corner as opposed to tilting outwardly in the manner of a standard rail car.

Figure 53:
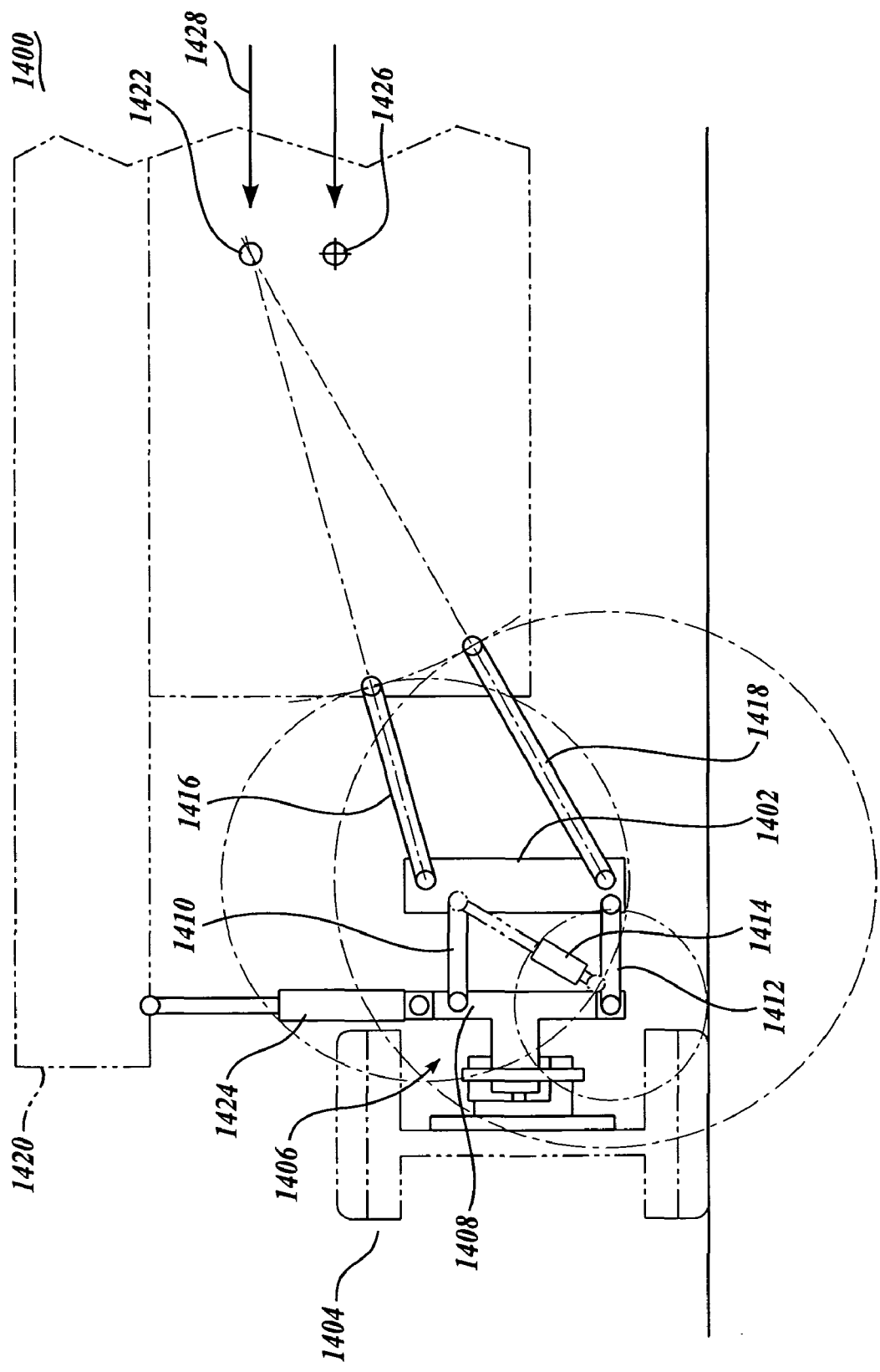
FIG. 53 is a partial front view of a further embodiment of the present invention.

FIG. 53 illustrates a further embodiment of the present invention wherein vehicle 1400 employs a tie structure 1402 in the form of an upright structure adjacent each of the wheel assemblies 1404 of the vehicle. The vehicle includes a steerable hub carrier assembly 1406 integrated into the wheel assembly 1404. The hub carrier assembly includes an upright inboard post portion 1408 which is coupled to a further inboard upright tie structure post 1402 by parallel upper and lower arms 1410 and 1412. Also, a relatively stiff strut or spring assembly 1414 extends upwardly and diagonally inwardly from the lower end of hub carrier post 1408 to an upper portion of the tie structure 1402, perhaps at the same location that the upper arm 1410 couples to the tie structure. Preferably the strut/spring assembly is double acting, so as to resist movement of the tie structure in both the upward and downward directions relative to the hub carrier assembly. It will be appreciated that the spring assembly 1414 supports the tie structure 1402 relative to the hub carrier assembly 1406, and links 1416 and 1418 couple the tie structure to the adjacent portion of the vehicle body 1420. As shown in FIG. 53, the inboard ends of the links 1416 and 1418 are oriented so that lines extending colinearly with the links 1416 and 1418 intersect at the roll center 1422 of the vehicle. Also, relatively softer spring assemblies 1424 extend upwardly from hub carrier post 1408 to couple with an overhead portion of the body 1420.

It will be appreciated that the present invention shown in FIG. 53 allows the body 1420 to tilt inwardly into a curve during cornering while allowing a controlled amount of outward movement and tilt of the tie structure 1402 so that the roll center 1422 also moves outwardly, thereby preventing the vehicle from jacking about the reaction center as roll center is moving outwardly. In this regard, when cornering the centrifugal force on the vehicle 1400 acts through the center of gravity 1426 which is below the roll center 1422, thereby causing the body 1420 to tilt inwardly into the curve. At the same time, the force being imposed on the roll center 1422 in the direction of arrow 1428 imposes compression loads on links 1416 and 1418, which load is resisted by spring assembly 1414. As a result, the tie structure post 1402 tends to move downwardly. This downward motion of the tie structure post allows the roll center 1422 of the vehicle to move slightly downwardly as the vehicle is cornering, thereby preventing the vehicle from jacking about the reaction center during movement thereof. As will be appreciated, the present invention as shown in FIG. 53 provides the same advantages of other embodiments of the present invention without requiring a tie structure of a significant structure.

Figure 54:
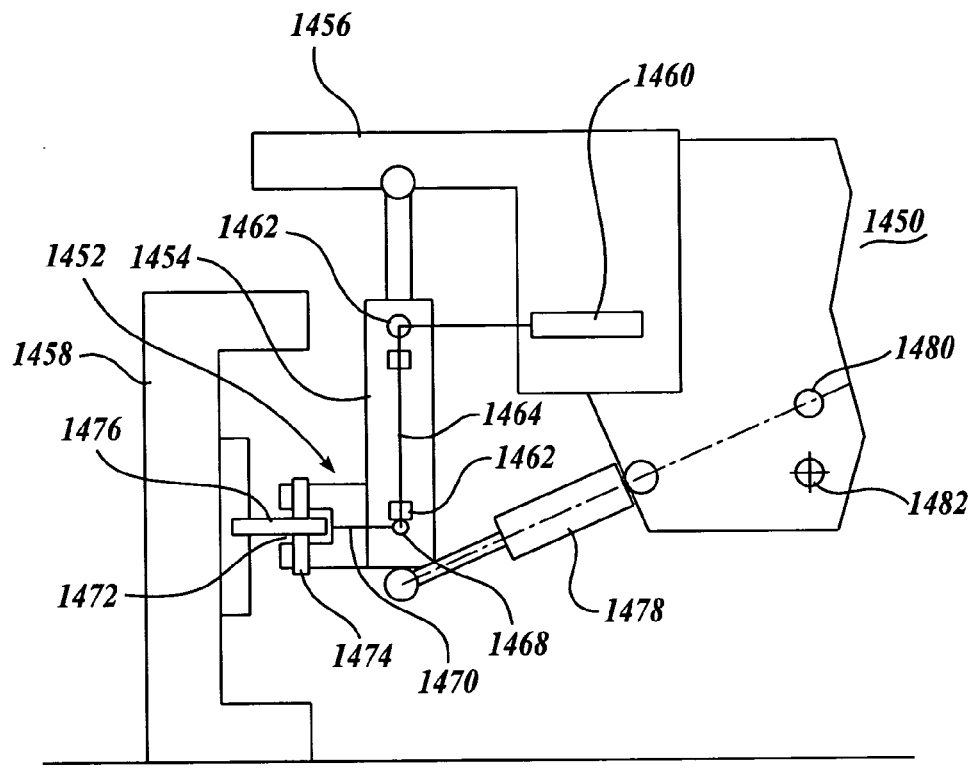
FIG. 54 is another partial front view of a further embodiment of the present invention.

FIG. 54 illustrates a further embodiment of the present invention, wherein a vehicle 1450 includes a hub carrier assembly 1452 which is attached to the lower end of a MacPherson strut assembly 1454. The upper end of the strut assembly 1454 is coupled to an overhead portion of the vehicle body 1456 in a well-known manner. A drive axle (not shown) can be incorporated into the hub carrier assembly 1452 to drive the wheel assembly 1458 in a well-known manner. Also, the wheel assembly 1458 may be steerable using a steering system similar to that described with respect to FIG. 34, above. In this regard, an actuator assembly 1460 is connected to the upper arm 1462 of a pivot arm assembly 1464 which is pivotally mounted along the height of the MacPherson strut 1454. The upper arm 1462 extends forwardly (out of the paper) from the upper end of the pivot arm assembly 1464 for coupling to the laterally outward end of the actuator assembly 1460. Thus, as the actuator assembly 1460 extends and retracts, the pivot arm assembly 1464 is caused to pivot about a vertical axis. A lower arm 1468 extends forwardly (out of the paper) from the lower end of the pivot arm assembly 1464 to couple with a lateral steering arm 1470 that extends laterally from the lower arm to couple with an arm 1472 that extends forwardly (out of the paper) from steering knuckle 1474 which is integral with wheel spindle 1476. In this way, steering is accomplished through a remote system that is actuated by this steering wheel through a hydraulic or electrical system (which is not shown but is well known in the automotive industry). It will be appreciated that other steering systems can be utilized in place of the steering system of FIG. 54 without departing from the spirit or scope of the present invention.

A relatively stiff spring slider assembly 1478 (preferably double acting) is interconnected between the lower end of the MacPherson strut assembly 1454 and an inward portion of the vehicle body 1456. The spring/slider assembly 1478 is positioned so that a line extending colinearly therefrom passes through the roll center 1480 of the vehicle, which is located somewhat above the center of gravity 1482 of the vehicle. It will be appreciated that the spring slider assembly 1478 can be passive and thus reacting to lateral forces applied to the vehicle, or can be active so as to control the roll of the vehicle as desired.

It will be appreciated that vehicle 1450 shown in FIG. 54 provides the same advantages as vehicle 1400 shown in FIG. 53. In this regard, during cornering, centrifugal force imposed on the vehicle 1450 acts through the center of gravity 1482, which is below the roll center 1480, thereby tending to cause the body 1456 to rotate inwardly during cornering about the roll center. At the same time, the centrifugal force on the body is transmitted to the wheel assembly 1458 through the roll center 1480 and through the spring/slider assembly 1478, thereby causing compression of the spring/slider assembly and thus allowing a certain amount of lateral and downward movement of the body 1456 toward the outside of the curve. During this lateral movement, the body roll center 1480 does not serve as the reaction center about which the vehicle would typically jack, thereby reducing the jacking effect imposed on the vehicle during cornering as in the other embodiments of the present invention.

Figure 55:
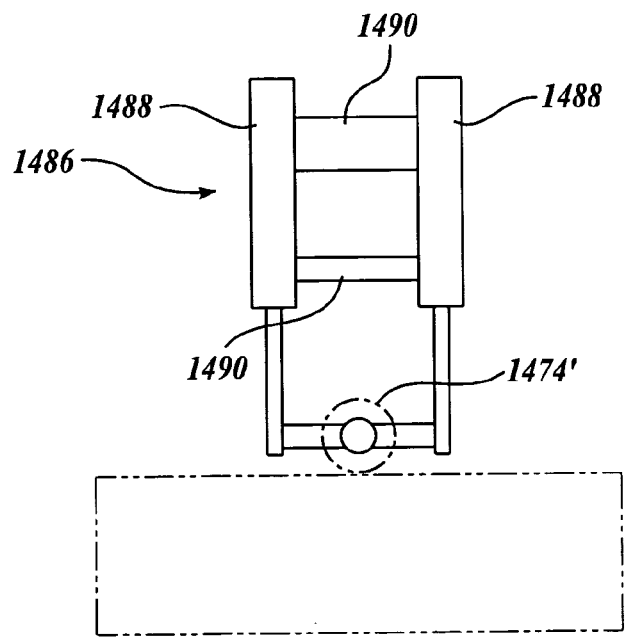
FIG. 55 is a partial top view of another embodiment of the present invention.

FIG. 55 shows an alternative embodiment of the spring/slider assembly 1478 of FIG. 54. In FIG. 55, the spring/slider assembly 1486 includes two spring/slider units 1488 that are in parallel relationship to each other, being separated by transverse connecting brackets 1490. It will be appreciated that the construction of the spring/slider assembly 1486 shown in FIG. 55 can provide increased stability of the vehicle body relative to the steering and suspension system in the fore and aft direction. In all other respects, the present invention shown in FIG. 55 may be similar to or the same as shown in FIG. 54.

Figure 56:
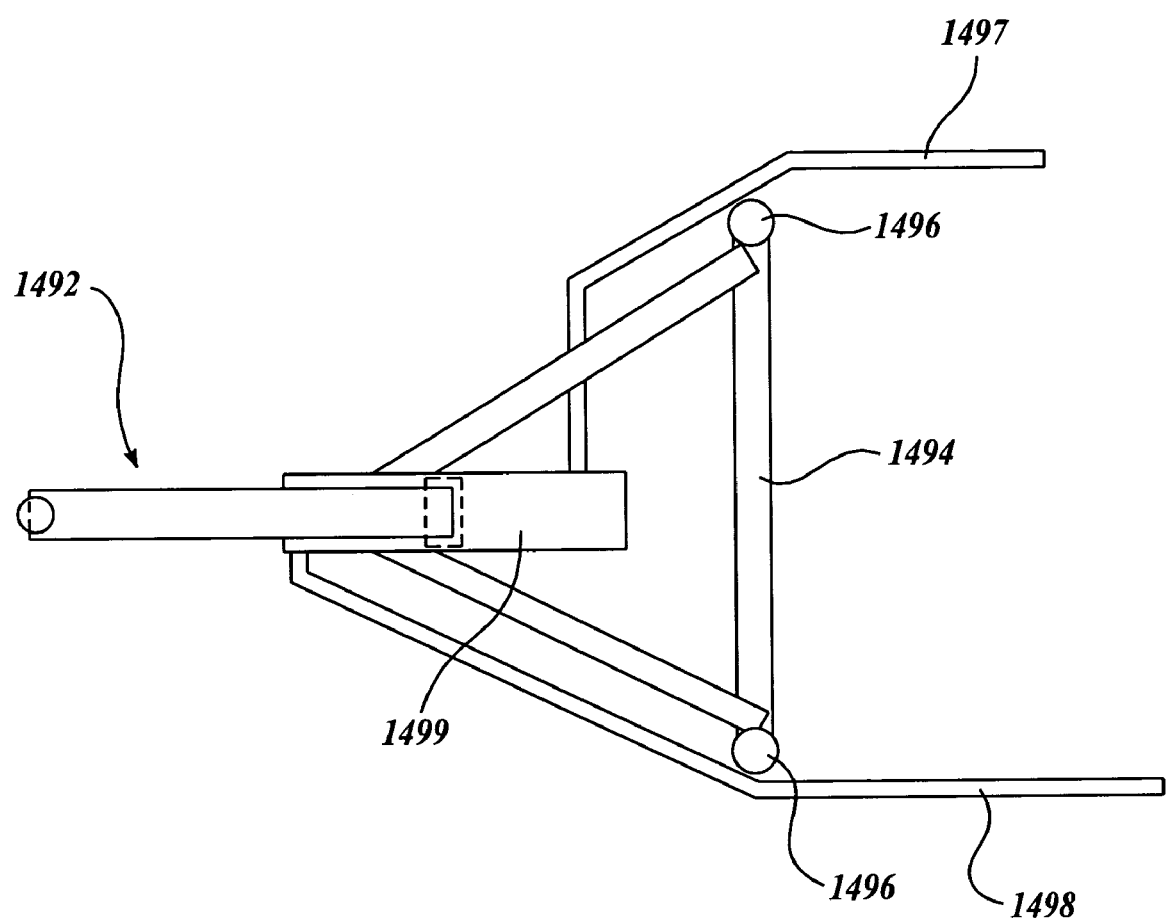
FIG. 56 is a fragmentary top elevational view of FIG. 55.

FIG. 56 shows a further alternative embodiment of the slider/strut assembly 1478 of FIG. 54. In the slider/strut assembly 1492 of FIG. 56, the inboard end thereof is attached to an A-arm assembly 1494 which is coupled to the vehicle (not shown) at ball joints 1496 or similar joints. Also shown in FIG. 56, control lines 1497 and 1498 interconnect with opposite ends of the cylinder portion 1499 of the spring/slider assembly 1492 so as to provide active control for the spring/slider assembly. In this regard, the lines 1497 and 1498 may be connected to a fluid supply system (not shown). It can be appreciated that rather than being actuated by a fluid, the spring/slider assembly 1492 may be electrically controlled in a manner that is well known. It will also be appreciated that a structure shown in FIG. 56 provides the same advantages as that shown in FIG. 54, and operates in substantially the same manner. The use of the A frame 1494 enables the strut/slider assembly to be connected to the body at more than one location, thereby spreading out the load on the body when force is transferred between the body and the spring/slider assembly.

Figure 57:
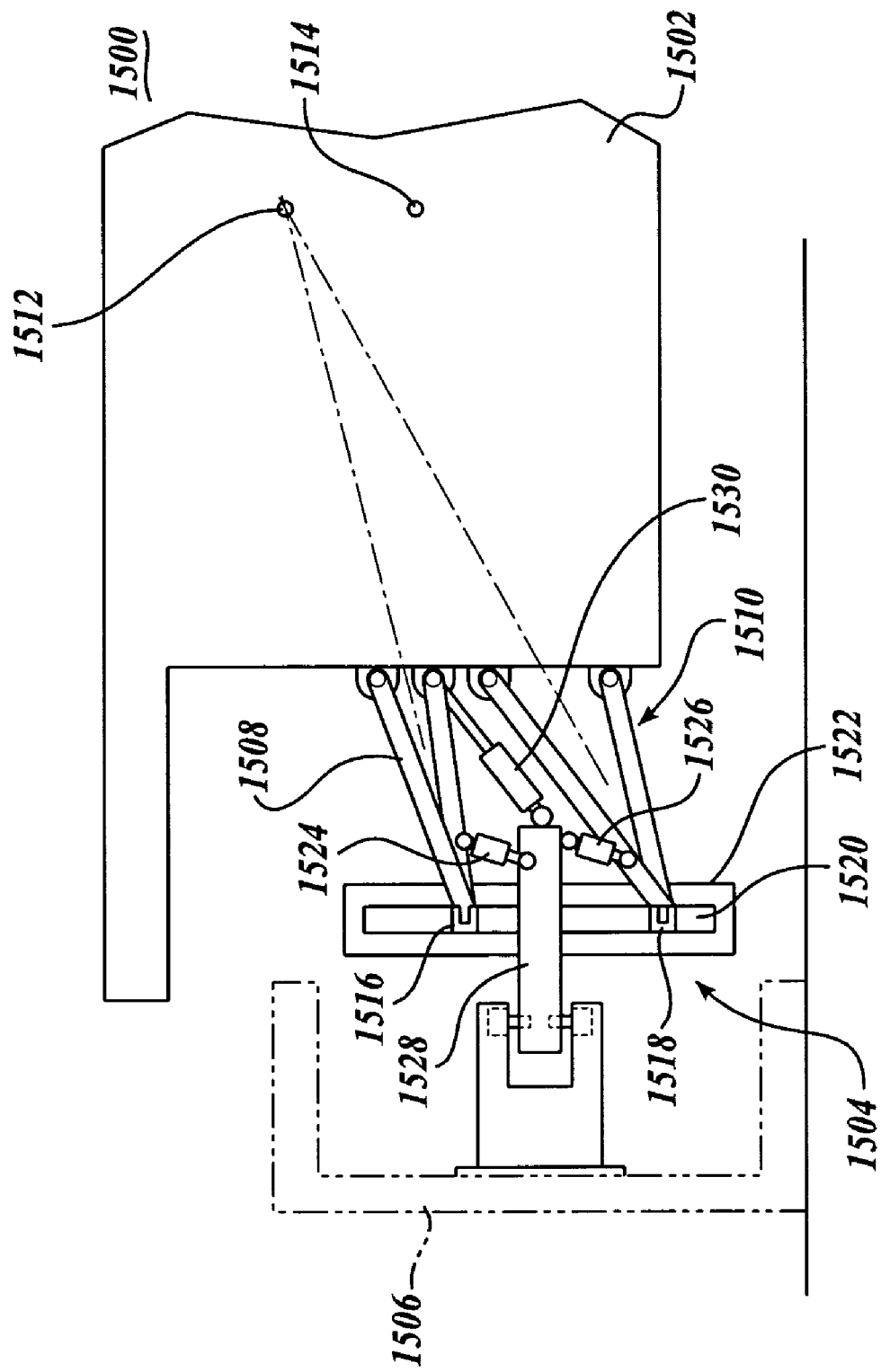
FIG. 57 is a fragmentary front view of a further embodiment of the present invention.
Figure 58:
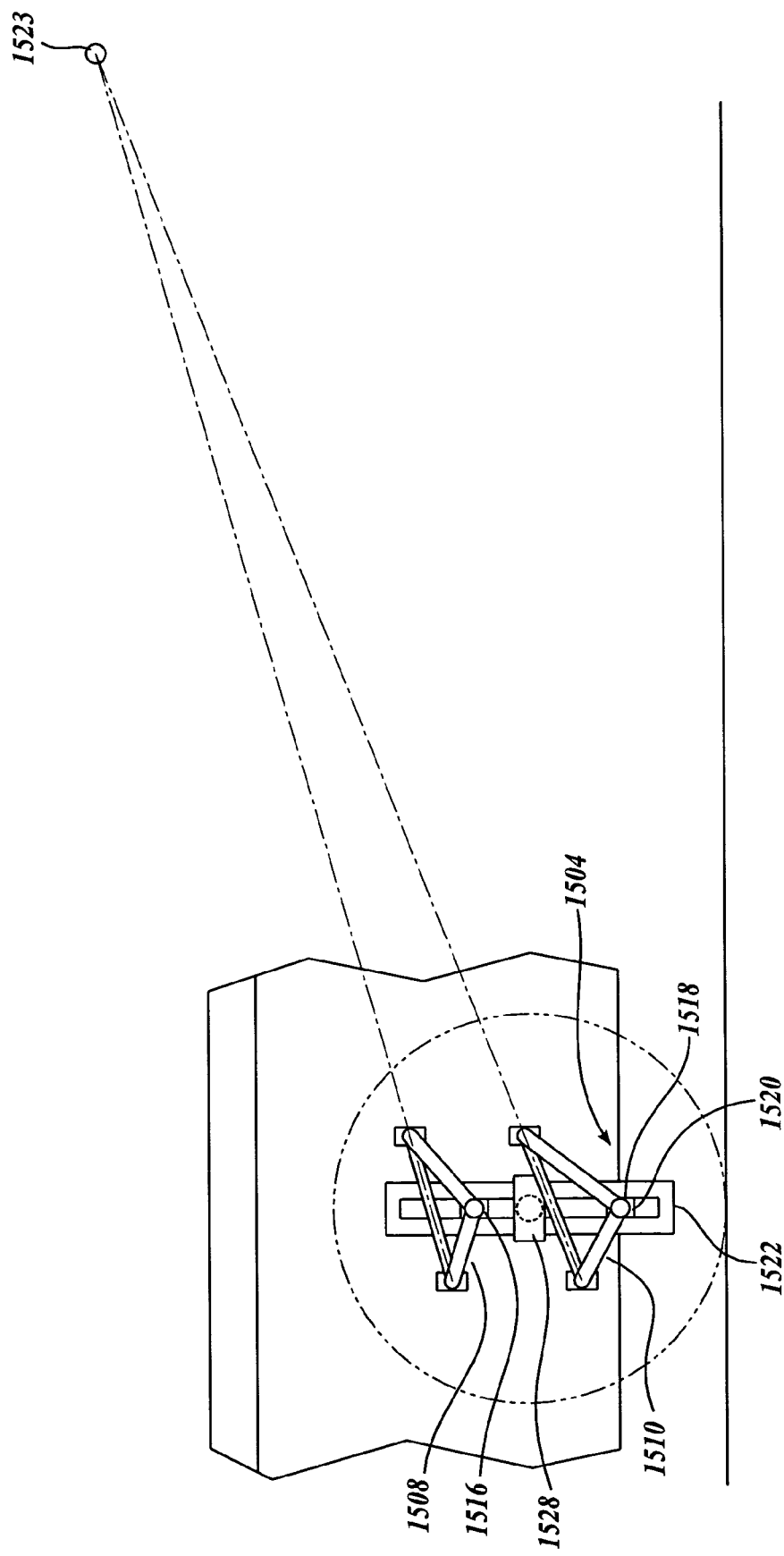
FIG. 58 is a fragmentary side view of FIG. 57.

FIGS. 57 and 58 illustrate a further embodiment of the present invention wherein vehicle 1500 includes a body 1502 supported on a combination hub carrier and slider assembly 1504 coupled to wheel assembly 1506. The wheel assembly 1506 may be adapted to be steered relative to the hub carrier/slider 1504 by various systems, including those described above. Pairs of upper and lower A-arms 1508 and 1510 interconnect the body 1502 to the hub carrier/slider assemblies. As shown in FIG. 57, the A-arms 1508 and 1510 are oriented in the diagonally upwardly and laterally inwardly direction so that lines extending therefrom that bisect the two arms of each A-arm assembly intersect at the roll center of the vehicle 1512 which is above the center of gravity of the vehicle 1514. The laterally inward ends of the A-arm assemblies 1508 and 1510 may be coupled to the body with ball joints or other types of joints. The laterally outward ends of the A-arm assemblies 1508 and 1510 are coupled to sliders 1516 and 1518 that are constrained to slide up and down a slideway 1520 formed along the height of a post portion 1522 of the hub carrier/slider assembly.

Referring to the fragmentary side elevational view shown in FIG. 58, the A-arm assemblies 1508 and 1510 are oriented in the fore and aft direction of the vehicle 1500 so that lines extending through the connections of the A-arm assemblies to the body intersect at the pitch center 1523 of the vehicle.

As described in other embodiments of the present invention, for example, the embodiment shown in FIGS. 10 and 11, orienting the A-arm assemblies in this manner allows the vehicle to pitch about its pitch center during acceleration and braking, but in the opposite direction of a standard vehicle.

Relatively soft springs 1524 and 1526 extend between the inward hub portion 1528 of the hub carrier/slider assembly 1524 and one or both of the arms of the A-arm assemblies 1508 and 1510. The springs 1524 and 1526 are able to support the inward ends of the A-arm assemblies relative to the slideway 1520 while allowing the A-arm assemblies to move up and down within the slideway. A stiffer linear control unit 1530 is pivotally coupled to the inward end of the hub portion 1528 and also coupled to the body 1502, for example at, or close to, the location that the upper A-arm assembly 1508 is coupled to the body. The control unit 1530 (preferably double acting) resists the lateral movement of the body relative to the hub carrier/slider assembly 1504.

The embodiment of the present invention shown in FIGS. 57 and 58 functions very similarly to other embodiments of the present invention. In this regard, during cornering the centrifugal force acting on the vehicle 1500 acts through the center of gravity 1514. The longitudinal forces acting on the vehicle during braking or accelerating also act through the center of gravity 178 of the vehicle 1514. As such, during cornering, the body 1502 will tilt inwardly toward the center of the curve. Correspondingly during braking, the body will tend to tilt downwardly in a rearward direction and during accelerating the body will tend to tilt downwardly at the forward end of the vehicle. This is contrary to the conventional direction of vehicle body roll during cornering or vehicle body pitch during acceleration or braking.

Moreover, during cornering, the centrifugal force acting on the vehicle are transmitted to the ground through the roll center 1512 through the hub carrier/slider assembly 1504 and to the wheel assemblies 1506. As such, the adjacent portion of the body 1502 shifts somewhat downwardly and outwardly, with the sliders 1516 and 1518 sliding down slideway 1520, causing the inward ends of the A-arms 1508 and 1510 to lower relative to the hub carrier/slider assembly 1504. This movement of the body is resisted by the control unit 1530 which only allows a certain amount of such body movement. However, such movement is sufficient to prevent the roll center 1512 to serve as the reaction center of the vehicle, thereby reducing the jacking effect imposed on the vehicle during cornering.

The same effect is achieved during braking or accelerating, wherein during braking the body 1502 tends to shift somewhat in the forward direction and during acceleration the body tends to shift somewhat in a rearward direction relative to the hub carrier/slider assembly. Thus, during such braking or accelerating the pitch center of the vehicle does not serve as the reaction center causing the body to dive during braking or squat during accelerating, as described above in other embodiments of the present invention. However, one difference in the embodiments of the present invention shown in FIGS. 54-58 is that no tie structure per se is required in order to achieve the advantageous operating characteristics of the vehicles 1450 and 1500. Rather, such effect is achieved by the construction and orientation of the suspension system components of these vehicles.

While the preferred embodiments of the invention have been illustrated and described, it will be appreciated that various changes can be made therein without departing from the spirit and scope of the invention. Also, it is to be appreciated that the present invention may be utilized in a wide range of vehicles, including passenger vehicles, SUVs, all-terrain vehicles, racing vehicles, dragsters, motorcycles, trucks, pickups, tractors as well as rail cars. Although the present invention has been illustrated in terms of wheeled vehicles, the present invention may also be incorporated into track vehicles, for instance military personnel carriers and tanks.

The embodiments of the invention in which an exclusive property or privilege is claimed are defined as follows:

1. A vehicle suspension system for a vehicle having a body, the body having a pitch center and a roll center, the vehicle having at least one surface engaging vehicle support assembly, the vehicle having a reaction center, comprising:
   (a) at least one tie structure interposed between the vehicle support assembly and the body of the vehicle to serve as the path for the forces imposed on the vehicle that travel between the pitch or roll center and the support assembly, wherein the tie structure is selected from the group consisting of:
      (i) a singular tie structure interposed between the vehicle support assembly and the body;
      (ii) a tie structure at the front of the vehicle interposed between the front portion of the vehicle and a front vehicle support assembly and/or interposed between the rear portion of the vehicle and a rear vehicle support assembly; and
      (iii) a tie structure at each of the vehicle support assemblies interposed between a corresponding vehicle support assembly and the body;
      (iv) a tie structure interposed between the body and multiple vehicle support assemblies; and
      (v) a tie structure at individual vehicle support assemblies and interposed between a corresponding vehicle support assembly and the body at one location of the vehicle and at another location of the body, a tie structure interposed between the body and multiple vehicle support assemblies;
   (b) a first interconnecting system for interconnecting two or more of the: (i) vehicle support assembly, (ii) the tie structure(s), and (iii) the body so as to allow one of the pitch center, roll center and pitch and roll center, such center being located at an elevation above the reaction center of the vehicle, to move in the direction of the forces that are imposed on the vehicle, thereby to preclude the applicable roll center, pitch center, or pitch and roll center from serving as the reaction center of the vehicle;
   (c) a second interconnecting system for interconnecting the tie structure(s) and the body about the pitch center or the roll center, both centers being located at elevations above the reaction center of the vehicle, whereby upon forces being imposed on the vehicle during operation of the vehicle, the body rotates around the center(s) of rotation relative to the tie structure, in the direction opposite to the direction of the forces acting on the vehicle in pitch or roll; and
   (d) a load control system for generating a resistance to the movement of the pitch or roll center(s) which is greater than the resistance generated by the load control system to the movement of the center of gravity of the vehicle due to forces applied to the vehicle during operation of the vehicle.

2. A vehicle suspension according to claim 1, wherein the load control system having a dampening system to dampen the movement of the pitch center, the roll center, the center of gravity, and the support assembly relative to the ground.

3. A vehicle suspension system according to claim 1, wherein:

the first interconnection system comprising a pivot arm assembly associated with each of the ground engaging vehicle support assemblies, the pivot arm assemblies being pivotally coupled to the tie structures as well as to the vehicle support structures; and the load control system acting between the pivot arm assembly and the tie structure to enable the pivot assembly to nominally support the tie structure(s).

4. A vehicle suspension system according to claim 3, wherein the load control system is operably interconnected between corresponding laterally spaced apart pivot arm assemblies.

5. A vehicle suspension system according to claim 4, wherein a biasing load is applied to the pivot arm that must be overcome to permit the tie structure to move relative to the pivot arm.

6. A vehicle suspension system according to claim 4, the load control system comprises a relatively stiff resistance mechanism to limit the rotation of the pivot arm assembly relative to the tie structure; and further comprising relatively compliant load control subsystem carried by the pivot arm assembly and interconnected with the body to control the movement of the body relative to the tie structure(s).

7. A vehicle suspension system according to claim 6, wherein the load control system comprises a crank structure mounted on the body, a push rod pivotally connected to the crank structure and pivotally connected to the pivot arm assembly of the first interconnection system.

8. A vehicle suspension system according to claim 7, further comprising a second linear actuator connected to the crank arm assembly to limit the rotation of the crank arm assembly during vehicle operation.

9. A vehicle suspension system according to claim 3, wherein the end portions of the pivot arm assembly are coupled to the tie structure to be movable relative to the tie structure in a direction generally laterally relative to the length of the body, including during cornering of the vehicle.

10. A vehicle suspension system according to claim 1, wherein the second interconnection system comprising a plurality of first rollers engaging within first guide ways defined by the tie structure, the first guide ways shaped to allow the first rollers or the first guide ways to move as the body moves in either the pitch and/or roll directions, thereby to define the pitch and/or roll center of the body.

11. A vehicle suspension system according to claim 10, wherein the first rollers and/or the first guide way is mounted on the tie structure, the body, or between the tie structure and the body, thereby to define the roll and pitch centers of the body.

12. A vehicle suspension system according to claim 10, wherein said second interconnection system further comprising a second set of rollers that engage corresponding the second guide ways located within the body, the body second guide ways shaped to allow the second rollers or the second guide ways to move relative to the body during tilting of the body in the pitch and/or roll directions.

13. A vehicle suspension system according to claim 10, wherein the configuration of the guide ways may be adjusted to change the location of the pitch and/or roll centers.

14. A vehicle suspension system according to claim 1, further comprising:

an axle interconnecting laterally spaced apart vehicle support assemblies;

the first interconnection system interconnecting the tie structure with the axle, said first interconnection system permitting relative movement between the tie structure (s) and the axle during acceleration and braking of the vehicle.

15. The vehicle suspension system according to claim 14, wherein the tie structures are slideable relative to the axle, and the second interconnection system resiliently couples the tie structures to the axle while resisting movement of the tie structure relative to the axle.

16. A vehicle suspension system according to claim 14, wherein the second interconnection system having an upper connection structure connecting an upper portion of the tie structure with the body and a lower connection structure interconnecting the lower portion of the tie structure with the body.

17. A vehicle suspension system according to claim 1, wherein the first interconnection system interconnecting the tie structure to the vehicle support assemblies and also interconnecting the body to the vehicle support assemblies, wherein the first interconnection system is movable in the upright direction to enable the body to move in at least one of the pitch and roll directions relative to the tie structure in the direction opposite to the direction of forces applied to the vehicle during cornering and braking.

18. A vehicle suspension system according to claim 17, wherein the load control system comprising first springs coupled between the first interconnection system and the body and the second springs coupled between the first interconnection system and the vehicle support assemblies, wherein the second springs are stiffer than the first springs.

19. A vehicle suspension system according to claim 17, wherein said first interconnection system comprising an upright pillar structure, the pillar structure having an upper portion slidably coupled to the body, and a lower portion slidably coupled to the tie structure.

20. A vehicle suspension system according to claim 19, wherein the second interconnection system comprising a first spring disposed between the body and vehicle support assembly and a second spring disposed between the pillar structure and the tie structure.

21. A vehicle suspension system according to claim 20, wherein the second spring is stiffer than the first spring.

22. A vehicle suspension system according to claim 20, further comprising the steering system connected to the pillar structure to rotate the pillar structure and thereby turn the hub carriers relative to the tie structure.

23. A vehicle suspension system according to claim 1 further comprising a steering system coupled to the support assembly to turn the support assembly relative to the tie structure about a steering axis, with the tie structure remaining rotationally stationary relative to the vehicle.

24. A vehicle according to claim 1, wherein the vehicle support assembly includes a hug carrier, and wherein the tie structure and the hub carrier of the vehicle support assembly are an integral structure.

25. A vehicle suspension system according to claim 24, wherein the second interconnection system comprises a plurality of A-arm structures interconnected between the body and the tie structure, the A-arm structures vertically movable relative to the tie structure.

26. A vehicle suspension system according to claim 25, wherein the tie structure comprises an upright slide structure slidably engageable with the outboard ends of the A-arm structures.

27. A vehicle suspension system according to claim 26, wherein the second interconnection system further comprises load controllers interconnected between the A-arm structures and the corresponding vehicle support assemblies.

28. A vehicle suspension system according to claim 1, wherein the second interconnection system comprising a plurality of pivot arm structures interconnected between the body and the tie structure, the pivot arm structures coupled to the tie structure about a singular axis and the pivot arm structures coupled to the body about a single pivot axis, the pivot arm structures orientated relative to the body to be in alignment with a center of rotation of the body.

29. A vehicle according to claim 28, wherein the pivot arm structures coupled to the body and/or tie structure about two axes, the pitch axis and the roll axis of the-body.

30. A vehicle suspension system according to claim 29, wherein the pivot arm structures are coupled to the tie structure and body to be adjustable in orientation and position to change the location of the center of rotation of the body.

31. A vehicle suspension system according to claim 1, further comprising a tie structure moving system interposed between the tie structure and the vehicle support assemblies, whereby the tie structure and body are capable of moving relative to the vehicle support assemblies in at least one of the longitudinal and transverse directions.

32. A vehicle suspension system according to claim 31, wherein the pitch and/or roll centers are moveable relative to the vehicle support assemblies by the action of the tie structure moving system.

33. A vehicle suspension system according to claim 1, wherein the second interconnection system comprising a slide system along which the body is movable relative to the tie structure upon a force applied to the body.

34. A vehicle suspension system according to claim 1, further comprising a slide system comprising a slideway carried by one of the tie structure, the body or between the body and the tie structure.

35. A vehicle suspension system according to claim 33, wherein the slide system comprises a powered subsystem for powering the movement of the body relative to the tie structure.

36. A vehicle suspension system according to claim 33, wherein the second interconnection system further comprises a resistor acting on the slideway system to resist relative movement between the body and tie structure.

37. A vehicle suspension system according to claim 1, wherein the first interconnection system comprising a slide system along which the tie structure is slidable relative to the support assembly to cause the pitch and roll centers to move in the direction with force applied to the vehicle.

38. A vehicle suspension system according to claim 1, wherein the second interconnection system characterized by pivot arm structures spaced apart from each other, each of the pivot arm structures having a first portion pivotally coupled to the tie structure and each having a second portion pivotally acting on the adjacent portion of the body, the pivot arm structures enabling the body to tilt relative to the tie structure about a longitudinal axis of the vehicle and enabling the body to pivot relative to the tie structure about a transverse axis of the vehicle.

39. A vehicle suspension system according to claim 38, wherein the second interconnection system supporting the body relative to the tie structure to allow the body to move longitudinally and/or laterally relative to the tie structure upon an impact force of sufficient level being applied to the body.

40. A vehicle suspension system according to claim 1, wherein the second interconnection system comprising a plurality of link structures having a first end portion pivotally connected to the tie structure and a second end portion pivotally connected to the body, said link structure is oriented relative to the tie structure to extend toward a common point along the longitudinal or the latitudinal axis of the body.

41. A vehicle suspension system according to claim 40, wherein the link structures comprise pivot arm assemblies having a base portion and an apex portion, and wherein the apex portions of the pivot arm structures extend toward a common point in relationship to at least one other pivot arm structure.

42. A vehicle suspension system according to claim 40, wherein said first interconnection system comprising a pivot arm assembly interconnecting a corresponding wheel support assembly and an adjacent portion of the tie structure; and further comprising a torsion arm interconnecting and acting between two adjacent pivot arms assembly.

43. A vehicle suspension system according to claim 40, wherein said link structures are adjustable in length.

44. A vehicle suspension system according to claim 1, wherein the load control system further comprising powered actuators to sense movement of the body, tie structure and/or vehicle support assembly to restore the body, tie structure and/or vehicle support assembly to desired position after and in reaction to the movement of one or more of the body, the structure and vehicle support assembly during operation of the vehicle.

45. A vehicle suspension system according to claim 1
(a) wherein said first interconnection system comprising pivot arms extending outwardly from the tie structure and coupled to the vehicle support assemblies, a crank arm extending laterally from the pivot arm at a location distal from the location that the pivot arm is coupled to the vehicle support assemblies and an actuator to manipulate the crank arms and a load controller thereby to raise and lower the tie structure relative to the vehicle support assemblies;
(b) wherein portions of the second interconnection system defining at least one axis along which the body is pivotal relative to the tie structure, the second interconnection system comprising lift load controllers disposed between the tie structure and the body, said lift load controllers operable to raise and lower the adjacent portions of the body relative to the tie structure; and
(c) further comprising a coordination system whereby when the body lowers relative to the tie structure, a force is applied to a corresponding support assembly causing the adjacent portion of the tie structure to rise.

46. A vehicle suspension system according to claim 45:
wherein the load controllers of the first interconnection system comprising fluid actuators;
wherein the lift load controllers acting between the tie structure and the body comprising fluid actuators; and
wherein the coordination system interconnecting the tie structure load controllers with the lift load controllers whereby the retraction of the tie structure actuators results in corresponding extension of the lift load controllers, and extension of the tie structure load controllers results in corresponding retraction of the lift load controllers.

47. A vehicle suspension system of claim 1, comprising:
(a) a front and a rear support assembly;
(b) the tie structure interposed between the front and rear support assemblies;
(c) the first interconnection system interconnecting the tie structure with the front and rear support assemblies, said first interconnection system comprising a front torsion bar assembly disposed between the front support assembly and the adjacent portion of the tie structure and a rear torsion bar assembly disposed between the support and the adjacent portion of the tie structure;

(d) the second interconnection system interconnecting the body to tie structure, said second interconnection system comprising link arms extending upwardly from longitudinally spaced apart locations of a tie structure with the upper ends of the link arms pinned to the body, said link arms disposed towards each other in the upward direction towards an intersection point that serves as a pitch center; and (e) the load control system comprising load controllers disposed between the wheel assemblies and the body, said load control means having a spring rate that is lower than the spring rate of the front and rear torsion bar assemblies.

48. A vehicle suspension system according to claim 47, further comprising a drive train, wherein the drive train functions as part of the tie structure.

49. A vehicle suspension system according to claim 47, further comprising a drive train mounted on the tie structure.

50. A vehicle suspension system according to claim 47, comprising a front fork assembly, wherein the front torsion bar assembly is disposed between the front fork assembly and the adjacent portion of the tie structure.

51. A vehicle suspension system according to claim 1:
(a) further comprising a hub carrier associated with each vehicle support assembly;
(b) a separate tie structure associated with each hub carrier and located adjacent a corresponding hub carrier;
(c) wherein the second interconnection system comprises a plurality of pivot arms coupled between the tie structure and corresponding portions of the body, said pivot arms oriented in a direction corresponding to the roll or pitch center of the vehicle.

52. A vehicle suspension system according to claim 51, wherein the pivot arms of the first interconnection system are vertically spaced apart relative to the tie structure.

53. A vehicle suspension system according to claim 51, wherein the tie structure comprises an upright structure disposed inwardly adjacent the hub carrier.

54. A vehicle suspension system according to claim 53, wherein the second interconnection system comprising a plurality of pivot arms extending between the hub carrier and the tie structure upright structure and a relatively stiff second load controller coupled between the hub carrier and the upright structure.

55. A vehicle suspension system according to claim 1:
(a) comprising a hub carrier associated with each vehicle support assembly;
(b) comprising a separate tie structure associated with each hub carrier and located adjacent a corresponding hub carrier;
(c) wherein the first interconnecting system interconnects the tie structures and the body to establish a longitudinal roll axis and/or a transverse pitch axis at a location above the center of gravity of the body whereupon forces imposed on the vehicle during operation of the vehicle cause the body to roll about its longitudinal axis and/or pitch about its transverse axis in the direction opposite the direction of the force acting on the vehicle;

(d) wherein the second interconnection system interconnects the tie structures to the hub carriers;
(e) wherein the load control system is coupled between the hub carriers and the body; and
(f) wherein the second interconnection system and the load control system cooperate to establish the roll axis and/or the pitch axis of the body above the reaction center of the vehicle to enable the roll axis and/or the pitch axis to move in the direction of the forces imposed on the vehicle during operation of the vehicle, thereby to preclude the roll axis and/or the pitch axis from serving as the reaction center of the vehicle.

56. A vehicle suspension system according to claim 55, wherein the first interconnection system comprising a plurality of pivot arms coupled between the tie structure and corresponding portions of the body, said pivot arms oriented in a direction corresponding to the roll center of the vehicle.

57. A vehicle suspension system according to claim 1, wherein at least one of the first interconnection system and the second interconnection system may be characterized by a powered system to cause relative movement between the tie structure and vehicle support assemblies and/or between the tie structure and the body.

58. A vehicle suspension system according to claim 1, wherein the load control system characterized as being powered to actively move or limit the movement of the body relative to the vehicle support assemblies and/or the tie structure.

59. A vehicle suspension system according to claim 1, wherein the body is pivotal relative to the tie structure about a longitudinal axis and about a transverse axis, the longitudinal and transverse axis being at different elevations relative to the support assembly.

60. A vehicle suspension system according to claim 1, wherein at least one of the longitudinal and transverse axis being above the center of gravity of the vehicle.

61. A vehicle suspension system according to claim 1, wherein the first interconnection system, the second interconnection system, and/or the load control system, operate to tilt the body inwardly during cornering, thereby resulting in the vehicle support assemblies being tilted somewhat inwardly during vehicle cornering to achieve a positive dynamic camber of the vehicle support assemblies.

62. A vehicle suspension system according to claim 1, further comprising a drive train for powering the vehicle, said drive train either constituting a portion of or located within the tie structure, the support assembly, or the body.

63. A vehicle suspension system according to claim 1, further comprising a surface structure carried by the body and/or tie structure, said surface structure comprising a surface over which air flows during vehicle travel to apply a load having a downward component to the body and/or tie structure during vehicle travel.

64. A vehicle suspension system according to claim 1, wherein the body is disposed within the perimeter of the tie structure.

65. A vehicle suspension system according to claim 1, wherein the second interconnecting system comprising a trunion structure carried between the body and the tie structure; thereby to permit the body to move generally longitudinally and generally laterally of the tie structure relative to support assembly.

66. A vehicle suspension system according to claim 65, wherein the sliders are pre-loaded relative to the trunion structure to resist movement of the sliders relative to the trunion structure.

67. A vehicle suspension system according to claim 1, wherein the tie structure is longitudinally expandable and contractible.

68. A vehicle suspension system according to claim 67, wherein the tie structure composes the forward section, rearward section, and its central connection section, the central connection section being telescopically engageable with the tie structure forward section and a tie structure rearward section.

69. A vehicle suspension system according to claim 1, wherein the second interconnection system applies resistance to the pitch and roll of the body.

70. A vehicle suspension system of claim 1 integrated into a trailer of a tractor-trailer combination, the tractor of the tractor-trailer combination having a frame and a rear drive axle and the trailer having a rear axle:
  (a) wherein the body is in the form of a load-carrying platform of the trailer;
  (b) the tie structure composed of the tractor frame and a rearward section associated with the rear axle of the trailer;
  (c) further comprising a fifth wheel interposed between the load-carrying platform and the tie structure;
  (d) the first interconnection system interconnecting the forward tie structure section with the tractor rear drive axle and interconnecting the rearward tie structure section with the trailer rear axle;
  (e) the second interconnection system interconnecting the forward tie structure section with the fifth wheel and interconnecting a rear portion of the load-carrying platform with the rear tie structure section; and
  (f) the load controllers disposed between the fifth wheel and the forward tie structure section and disposed between the rear portion of the load-carrying platform and the rear tie structure section.

71. The vehicle suspension system according to claim 70, wherein the fifth wheel is mounted on suspension system supported by a tie structure carried by the tractor rear axle.

72. The vehicle suspension system of claim 1 integrated into a trailer having an axle, wherein:
  (a) the body is in the form of a load-carrying element supported by the support assembly;
  (b) the second interconnection system comprising forward pivot arms interconnecting a tie structure with the load-carrying element, and rearward pivot arms interconnecting a tie structure with the load-carrying element, the forward and rearward pivot arms enabling the load-carrying element to pivot relative to a tie structure about a transfer pitch axis and about a longitudinal roll axis in a direction opposite to the direction that cornering forces and braking forces are applied to the load-carrying element; and
  (c) the load controllers disposed between the load-carrying element and the tie structure.

73. The vehicle suspension system of claim 72, wherein the trailer is connectable to a hitch assembly, the hitch assembly mounted on a suspension system to enable the body to move in the direction of the forces that are applied to the body during vehicle operation.

74. A vehicle suspension system according to claim 1 incorporated into a railway car, having a car body and an axle structure, wherein:
  (a) the tie structure is interposed between the car body and the axle structure;
  (b) the first interconnection system connecting the tie structure to the axle structure;
  (c) the second interconnection system, interconnecting the tie structure to the car body; and
  (d) the load controllers disposed between the axle structure and the car body.

75. A vehicle suspension system according to claim 74, wherein the tie structure composed of a structure selected from the group consisting of: a torsion bar assembly connected to the axle structure; and the substantially nominally horizontal double piston cylinder assembly connected to the axle structure.

76. A vehicle suspension system according to claim 75, wherein the load controllers selected from the group consisting of: spring/shock absorber assemblies extending upwardly from the axle assembly and coupled to an overhead portion of the body; and air pillow structures supporting load-bearing column structures interconnected to upper portions of the body.

77. A vehicle suspension system according to claim 1, wherein the load control system interposed and interconnecting the body with the support assembly and/or the structure being load adjustable, and the load control system acting between the support assembly and the tie structure being load adjustable.

78. A vehicle suspension system according to claim 1, wherein the first interconnecting system, the second interconnecting system, and the load control system being coordinated whereby when a wheel support assembly raises relative to the remainder of the vehicle, the tie structure is raised and the body lowered relative to the raised portion of the tie structure, tending to keep the body relatively level, and when the vehicle support assembly lowers relative to the vehicle, the tie structure lowers and the body tends to raise relative to the portion of the tie structure lowering, thereby tending to keep the body relatively level.

79. A vehicle suspension system according to claim 1, wherein a load control system is integrated into at least a portion of the second interconnecting system, whereby the location and orientation of the second connection system defines the pitch centers and/or roll center.

80. A vehicle suspension system according to claim 1, further comprising a body moving system interposed between the tie structure and the body, the body moving system having a first subsystem carried by the body and a second subsystem engageable with the first subsystem and carried by the tie structure, whereby the body is capable of moving relative to the tie structure in at least one of the directions longitudinally and transversely relative to the tie structure in response to impact loads imposed on the vehicle.

81. A vehicle suspension system according to claim 80, further comprising at least one occupant seat and a seat moving system positioned between the occupant seat and the body to permit the occupant seat to move relative to the body upon a sufficient impact load being applied to the vehicle.

82. A vehicle suspension system according to claim 81, wherein the seat moving system comprising a slide system positioned between the occupant seat and the body to permit the occupant seat to slide in a controlled manner relative to the body upon a sufficient impact load being applied to the vehicle.

83. A vehicle suspension system according to claim 82, wherein the seat slide system further comprising a sensor system to sense the acceleration or deceleration of the vehicle and upon a threshold level of acceleration or deceleration being sensed, the sensing system causing the seat side system to slide the seat in the direction in which the vehicle is accelerating or decelerating.

84. A vehicle suspension system according to claim 80, wherein the body moving system comprising a slideway structure carried by either the body or the tie structure and a slider structure slidably engageable with the slideway structure and carried by the other of the body or the tie structure.

85. A vehicle suspension system according to claim 80, wherein the body moving system permits the body to detach from the tie structure upon an impact load of sufficient magnitude being applied to the vehicle.

86. A vehicle suspension system according to claim 1, further comprising quick-release connectors for connecting the vehicle body to the tie structure for supporting the body, wherein the tie structure can be utilized with bodies of different shapes or configurations.

87. A vehicle suspension system according to claim 80, further comprising an actuating system connected between the body and the tie structure to apply a load to the body upon application of a sufficient impact force on the tie structure to move the body relative to the tie structure in a direction away from the location of the impact force applied to the tie structure.

88. A vehicle suspension system according to claim 87, wherein the actuating system receives a signal relative to the location and magnitude of the impact force applied to the tie structure, and whereupon the actuating system applies a load to the body in relationship to the signal received by the actuating system.

89. A vehicle suspension system according to claim 88, wherein said vehicle further comprising at least one bumper and the actuating system connected between the tie structure and the said at least one bumper.

90. A vehicle suspension system according to claim 88, wherein the actuating system includes a fluid actuator interconnected between the tie structure and the body.

91. A vehicle suspension system according to claim 87, wherein the tie structure may continue moving toward the direction that the impact load is applied to the tie structure while the body moves relative to the tie structure in a direction away from the location that the impact load is applied to the tie structure; and further comprising at least one occupant seat and a seat moving system positioned between the occupant seat and the body to permit the occupant seat to move in the direction of the impact load applied to the tie structure.

92. A vehicle suspension system according to claim 80, wherein the actuating system comprises a linkage system interposed between the body and the tie structure to force the body to move relative to the tie structure in a direction away from the location that the impact load is applied to the tie structure.

93. A vehicle suspension system according to claim 92, wherein the vehicle further comprising at least one bumper assembly, and said linkage system interposed between the at least one bumper assembly and the tie structure.

94. A vehicle suspension system according to claim 1, wherein the tie structure comprising an axle of the vehicle.

95. A vehicle suspension system according to claim 1, wherein during the pitching or rolling of the vehicle, the body, and/or the tie structure imposing a load on the vehicle suspension system toward the ground, even during high speed cornering and braking.

96. A vehicle suspension system according to claim 1, further comprising at least one occupant seat, wherein said at least one occupant seat is located in the vehicle body and/or on the vehicle body.

97. A vehicle suspension system according to claim 1, wherein the first interconnecting system comprises a resilient element.

98. A vehicle suspension system according to claim 1, wherein the vehicle support assembly is a steerable vehicle support assembly.

99. A vehicle suspension system according to claim 1, wherein the load control system is interposed and interconnects the body, the vehicle support assembly and/or the tie structure(s).

* * * * *